(12) United States Patent
Kimener

(10) Patent No.: US 10,377,587 B2
(45) Date of Patent: *Aug. 13, 2019

(54) TRAILER STABILIZER AND RESTRAINT

(71) Applicant: Stabilock, LLC, Loveland, OH (US)

(72) Inventor: Thomas Terrance Kimener, Loveland, OH (US)

(73) Assignee: Stabilock, LLC, Loveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,221

(22) Filed: Apr. 20, 2018

(65) Prior Publication Data

US 2018/0237237 A1    Aug. 23, 2018

Related U.S. Application Data

(63) Continuation of application No. 15/240,583, filed on Aug. 18, 2016, now Pat. No. 9,969,575.

(60) Provisional application No. 62/206,869, filed on Aug. 19, 2015.

(51) Int. Cl.
| | |
|---|---|
| *B60S 9/00* | (2006.01) |
| *B65G 69/00* | (2006.01) |
| *B60D 1/66* | (2006.01) |
| *B60S 9/12* | (2006.01) |
| *B60S 9/20* | (2006.01) |
| *B62D 53/00* | (2006.01) |

(52) U.S. Cl.
CPC ........... *B65G 69/003* (2013.01); *B60D 1/665* (2013.01); *B60S 9/12* (2013.01); *B60S 9/20* (2013.01); *B62D 53/00* (2013.01)

(58) Field of Classification Search
CPC .......... B65G 69/003; B60S 13/00; B60S 9/12; B60S 9/20; B60D 3/00; B60D 1/665; B60D 1/322; B60D 3/184; B60D 53/00
See application file for complete search history.

(56) References Cited

U.S. PATENT DOCUMENTS

| | | | | | |
|---|---|---|---|---|---|
| 3,254,900 | A | * | 6/1966 | Allen | B60N 2/143 180/14.1 |
| 3,995,876 | A | * | 12/1976 | Ronne | B60D 3/00 280/476.1 |
| 4,973,206 | A | * | 11/1990 | Engle | B61D 47/005 180/19.2 |
| 5,348,331 | A | * | 9/1994 | Hawkins | B60D 1/322 280/455.1 |
| 5,407,221 | A | * | 4/1995 | Haire | B62D 53/0864 280/432 |
| 7,270,201 | B1 | * | 9/2007 | Cryer | B60S 13/00 180/19.2 |
| 8,286,997 | B2 | | 10/2012 | Kimener et al. | |

(Continued)

OTHER PUBLICATIONS

Jan. 23, 2019 Office action from the Canadian Patent Office in counterpart application.

(Continued)

*Primary Examiner* — Hau V Phan

(74) *Attorney, Agent, or Firm* — Dorton & Willis, LLP; Ryan Willis

(57) ABSTRACT

A trailer restraining device comprising a portable frame having mounted thereto a tail hook and a king pin receiver that includes at least one of a receiver hydraulic cylinder, a receiver pneumatic cylinder, a receiver electric actuator, and a receiver winch.

20 Claims, 41 Drawing Sheets

(56) References Cited

U.S. PATENT DOCUMENTS

| | | | |
|---|---|---|---|
| 9,969,575 B2* | 5/2018 | Kimener | B60D 1/665 |
| 2004/0022731 A1* | 2/2004 | Bogdanov | A61K 49/0032 |
| | | | 424/9.6 |
| 2007/0040353 A1* | 2/2007 | Dallaire | B60Q 1/305 |
| | | | 280/476.1 |
| 2007/0252358 A1* | 11/2007 | Cunefare | B62D 53/0878 |
| | | | 280/432 |
| 2008/0095598 A1* | 4/2008 | Cotton | B65G 69/003 |
| | | | 414/401 |
| 2010/0266375 A1* | 10/2010 | Ion | B65G 69/003 |
| | | | 414/401 |
| 2013/0078078 A1* | 3/2013 | Andre | B61D 3/184 |
| | | | 414/809 |

OTHER PUBLICATIONS

May 30, 2018 Office action from the Canadian Patent Office in counterpart application.

* cited by examiner

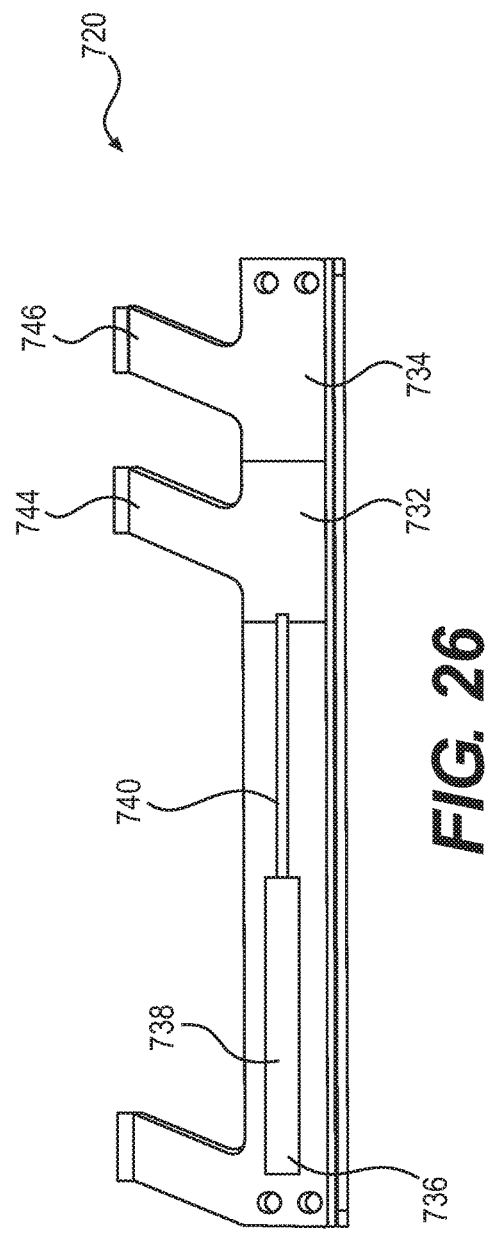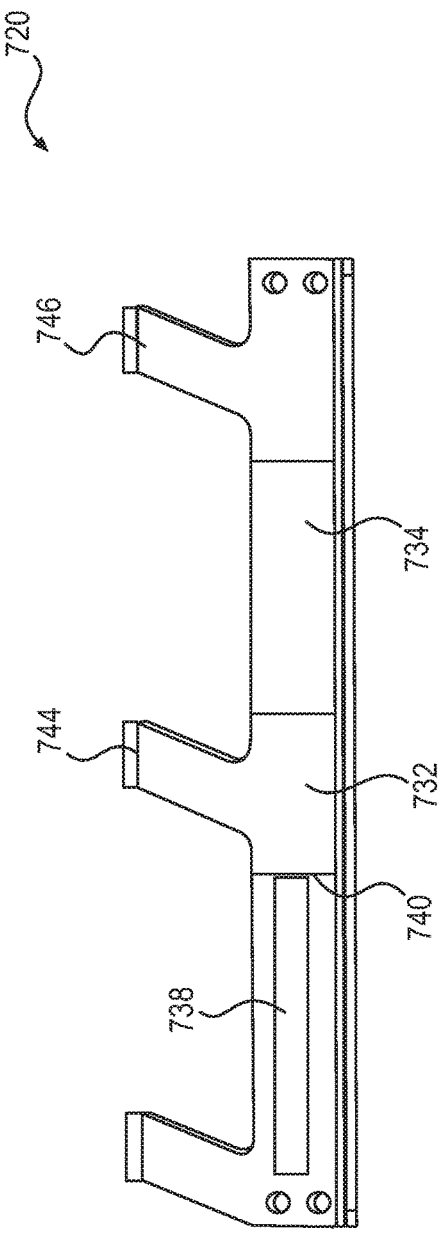

TRAILER STABILIZER AND RESTRAINT

CROSS REFERENCE TO RELATED APPLICATIONS

The present application is a continuation of U.S. Nonprovisional patent application Ser. No. 15/240,583, filed Aug. 18, 2016, which claims the benefit of U.S. Provisional Patent Application Ser. No. 62/206,869, titled, "TRAILER STABILIZER AND RESTRAINT," filed Aug. 19, 2015, the disclosure of each of which is incorporated herein by reference.

RELATED ART

Field of the Invention

The present disclosure is directed to stabilizing and restraint devices that are coupled to parked semi-trailers at a loading dock or similar location and, more specifically, to stabilizing devices and associated methods of stabilizing and/or leveling a parked semi-trailer.

BRIEF DESCRIPTION OF THE DRAWINGS

FIG. 26 is a profile view of a first alternate exemplary embodiment of a ground mount, with the repositionable carriage shown in the fully extended, rearward position.

FIG. 27 is a profile view of the first alternate exemplary ground mount of FIG. 26, shown with the repositionable carriage in the fully retracted, forward position.

DETAILED DESCRIPTION

Figure 1:
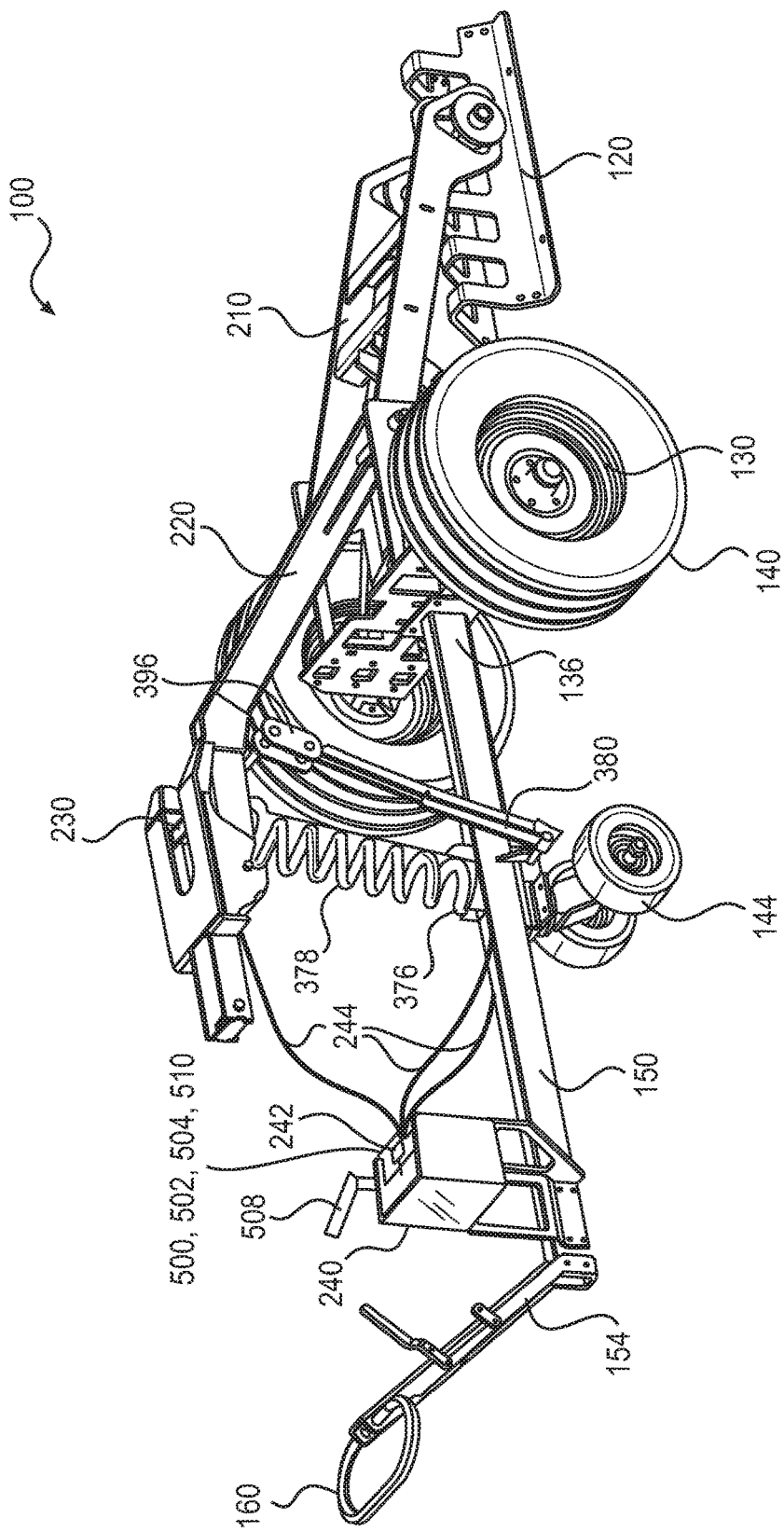
FIG. 1 is an elevated perspective view of a first exemplary embodiment of a trailer restraint and first exemplary ground mount in accordance with the instant disclosure.
Figure 2:
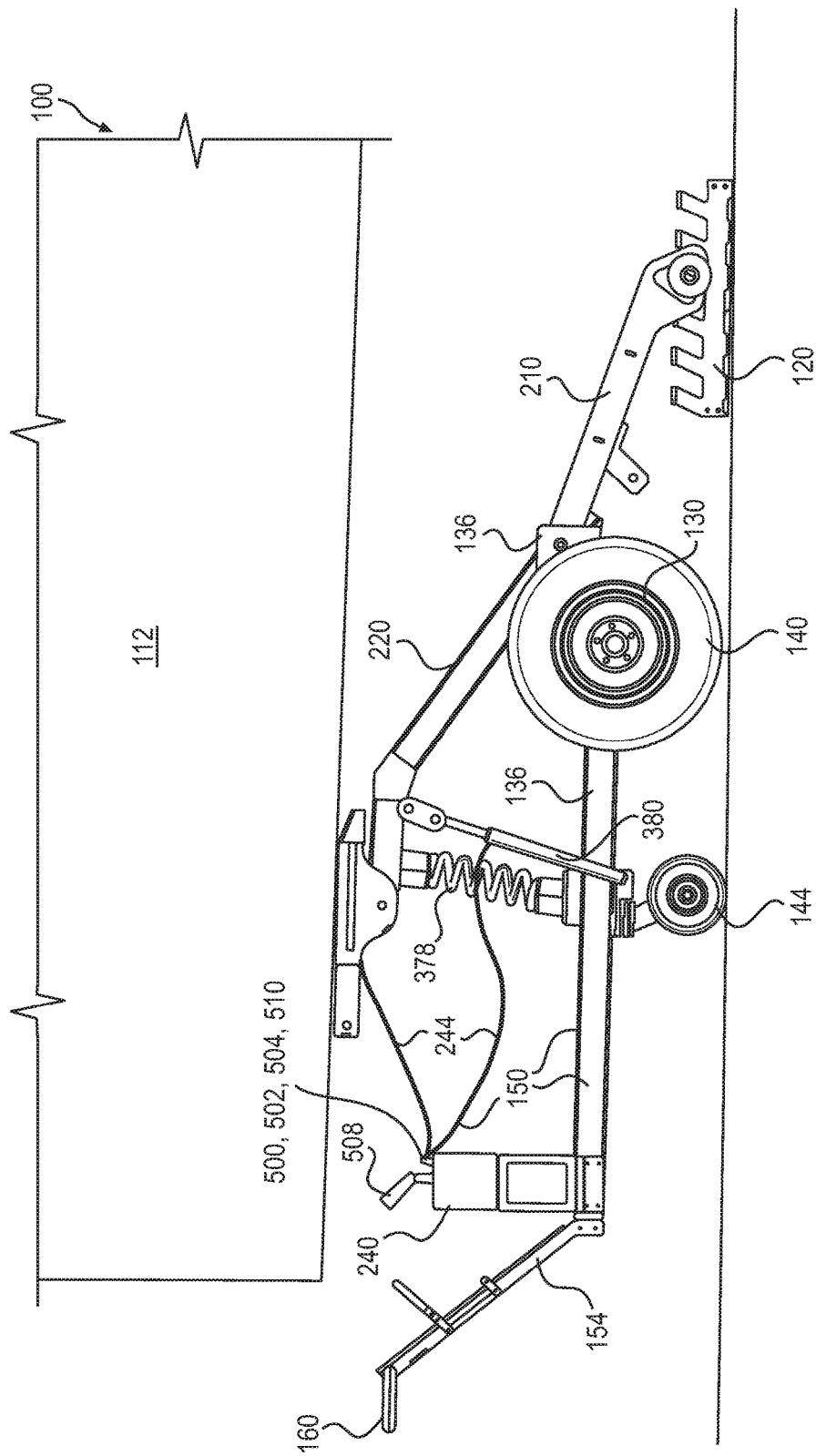
FIG. 2 is a profile view of the first exemplary restraint and ground mount of FIG. 1 shown positioned under a parked semi-trailer in a restraining position.

The exemplary embodiments of the present disclosure are described and illustrated below to encompass exemplary semi-trailer restraints and stabilizers. Of course, it will be apparent to those of ordinary skill in the art that the embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Referencing FIGS. 1-19, a first exemplary trailer restraint 100 in accordance with the instant disclosure is configured to engage a king pin 110 of a parked semi-trailer 112 and concurrently engage a ground mount 120 to limit movement of the semi-trailer. In exemplary form, the first exemplary trailer restraint 100 may be utilized to restrain a parked semi-trailer 112 at a loading dock 114 while the trailer is being loaded or unloaded.

The first exemplary trailer restraint 100 is portable by way of a pair of wheels 130 mounted to an axle and wheel hubs 132, where the axle is mounted to a frame 136. In exemplary form, the wheels 130 may be standard eighteen inch diameter and have a five lug pattern. Those skilled in the art will understand that larger or smaller wheels may be used in lieu of those described in exemplary form, in addition to having lug patterns or fastening mechanisms that differ from the exemplary wheels 130 described. Each wheel 130 includes a corresponding tire 140 that may be solid or inflated with fluid (e.g., air, nitrogen, etc.). In addition to the axle and wheel hubs 132, the first exemplary trailer restraint 100 also includes a caster wheel 144 mounted to the frame 136.

In this exemplary embodiment, the frame 136 includes a longitudinal backbone tube 150 fabricated from rectangular steel and having a wall thickness of a quarter of an inch. The caster wheel 144 is mounted to the underneath side of the longitudinal backbone tube 150 proximate the tube's longitudinal midpoint (from proximal to distal). A proximal end of the backbone tube 150 is mounted to a handle rail 154, which is fabricated from a piece of block C-shaped steel having a wall thickness of a quarter of an inch. In this exemplary embodiment, the proximal end of the backbone tube 150 is welded to the distal end of the handle rail 154 so that the handle rail is angled approximately one hundred and twenty degrees with respect to the backbone tube. Near the proximal end of the handle arm 154 are corresponding orifice that receive a metal handle bar 160 that may be rigidly or pivotally connected to the handle rail 154. By way of example, the metal handle bar 160 is fabricated from steel tubing having been formed into an oval shape. As will be discussed in more detail hereafter, the handle bar 160 is grasped by a user in order to reposition the first exemplary trailer restraint 100 using either a pulling or a pushing action. But a hydraulic circuit 200 is provided to reposition other aspects of the first exemplary trailer restraint 100.

An exemplary hydraulic circuit 200 in accordance with the instant disclosure is utilized to reposition a ground hook 210, an engagement neck 220, and a king pin stop 230 associated with the engagement neck. A fluid reservoir 240 is mounted to the longitudinal rectangular tube 150 proximate its proximal end. This fluid reservoir 240 is in selective fluid communication with the hydraulic cylinders operatively coupled to the ground hook 210, the engagement neck 220, and the king pin stop 230 by way of a series of valves 242 and hydraulic fluid lines 244. A more detailed explanation of the hydraulic circuit 200 follows a description of the other components of the first exemplary trailer restraint 100.

Figure 5:
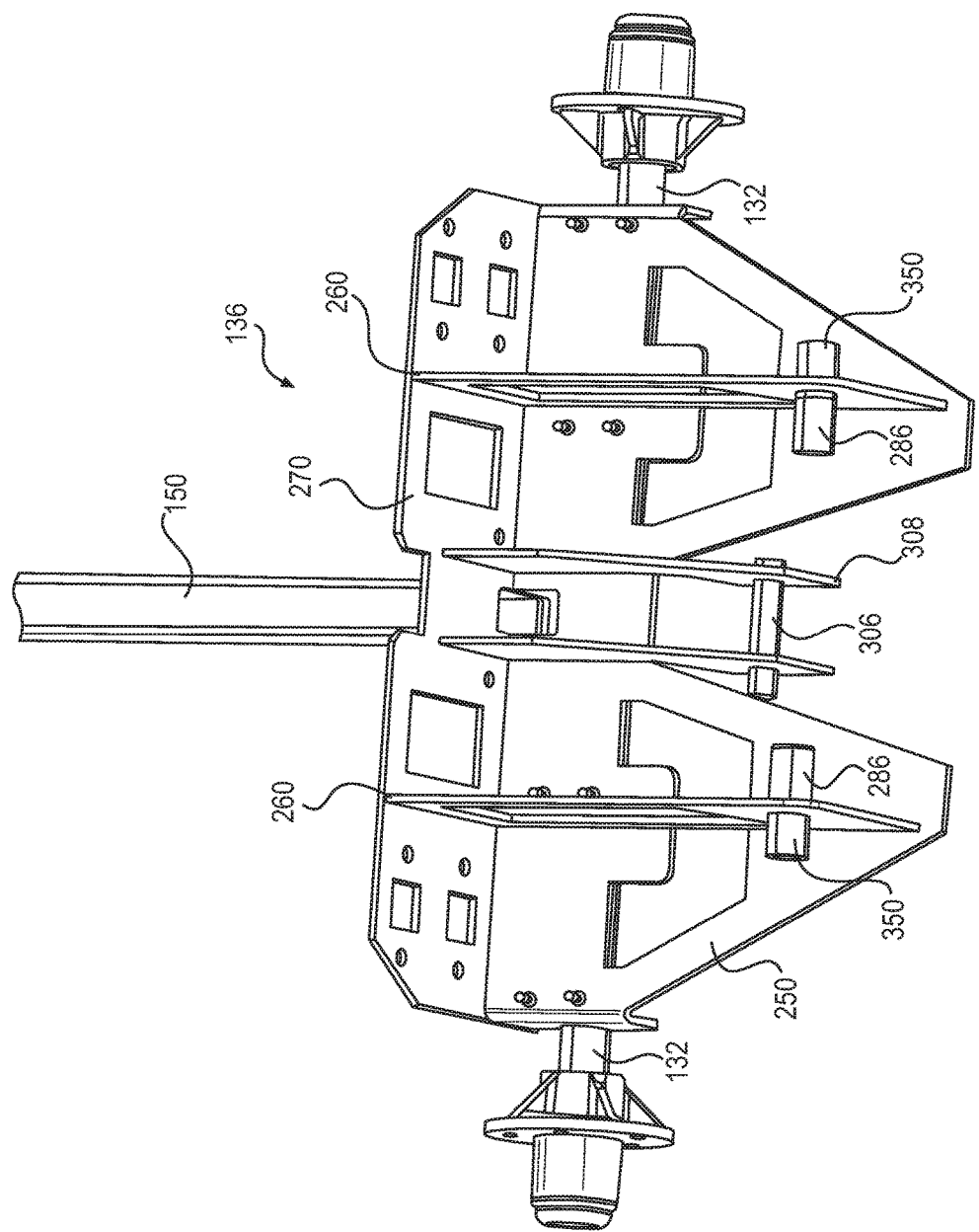
FIG. 5 is an elevated perspective view of the exemplary frame of the first exemplary restraint of FIG. 1.

Referring to FIGS. 1 and 5, the frame 136 of the first exemplary trailer restraint 100 provides a chassis to which the ground hook 210, an engagement neck 220, and the axle and wheel hubs 132 are mounted. In the case of the ground hook 210 and the engagement neck 220, each is repositionably mounted to the frame 136. In order to provide this repositionable feature, the frame 136 includes a horizontal plate 250 extending laterally to cover a lateral majority of the axle 132 (but not the wheel hubs). The horizontal plate 250 is mounted to a pair of vertical supports 260 that are spaced apart from one another in a lateral direction. In particular, the vertical supports 260 are identical and are oriented perpendicularly with respect to the horizontal plate 250. In addition, the vertical supports 260 are oriented in parallel to one another to extend both vertically and in the proximal-to-distal direction. A proximal vertical support 270 is concurrently mounted to the horizontal plate 250 and to the pair of vertical supports 260. More specifically, the vertical support 270 extends perpendicularly with respect to the horizontal plate 250 and perpendicularly with respect to the pair of vertical supports 260. In exemplary form, the plate 250 and supports 260, 270 are fabricated from metal plate material that is welded together. Each vertical support 260 includes a hole extending therethrough that is vertically and laterally aligned with the counterpart hole extending through the opposing vertical support, where both holes are sized to receive a shaft 280, where the shaft rigidly mounted to the engagement neck 220 and rotationally repositionable with respect to the ground hook 210. The ground hook 210 is pivotally mounted to the shaft 280, which allows the ground hook to pivot around a central axis of the shaft. In this exemplary embodiment, the ground hook 210 is rigidly mounted to a pair of bearings 286, which are also mounted to the shaft 280.

Figure 3:
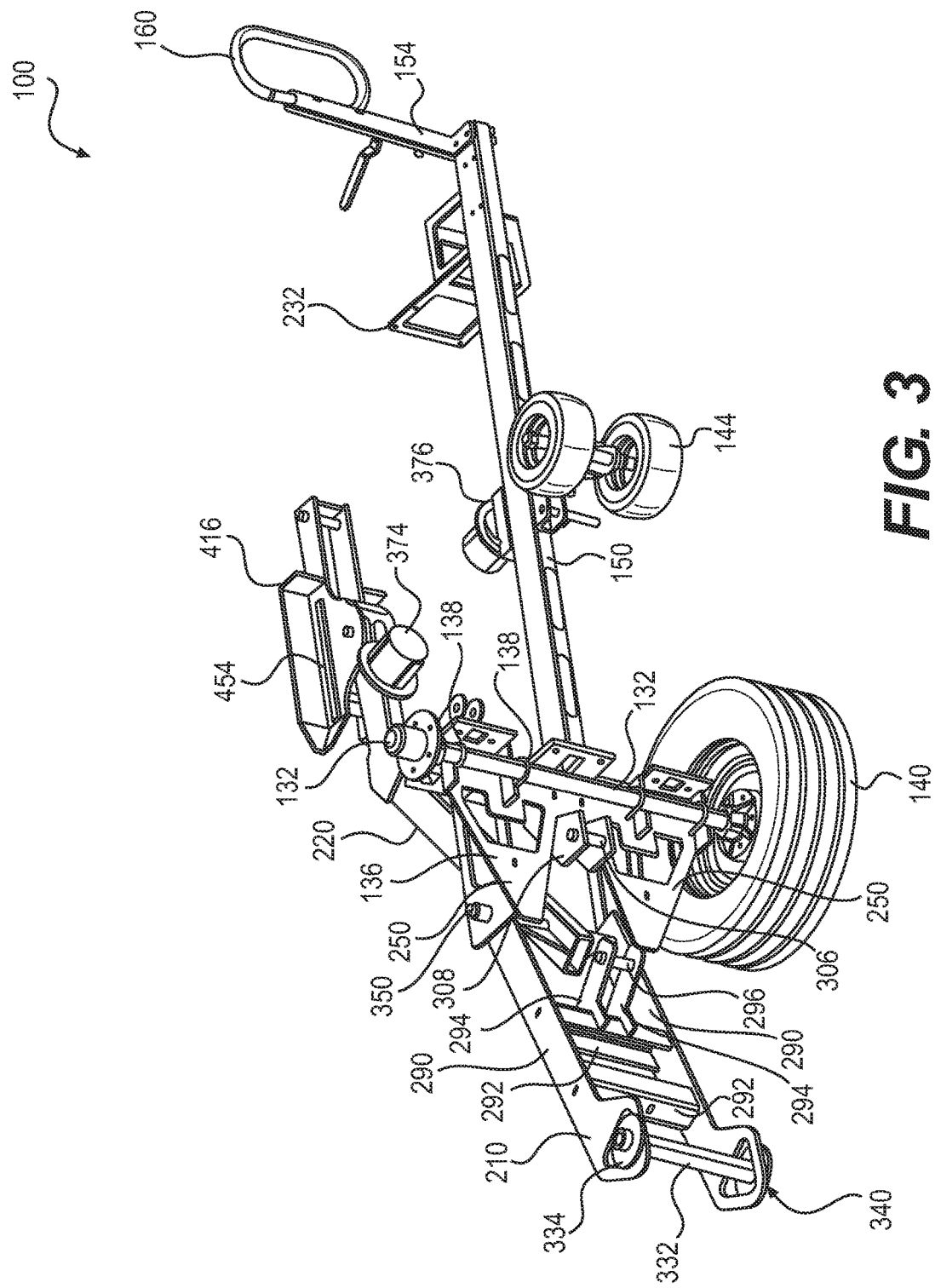
FIG. 3 is a bottom perspective view of the first exemplary restraint of FIG. 1, shown without a wheel and tire, without a coil spring, and without an associated hydraulic circuit.
Figure 4:
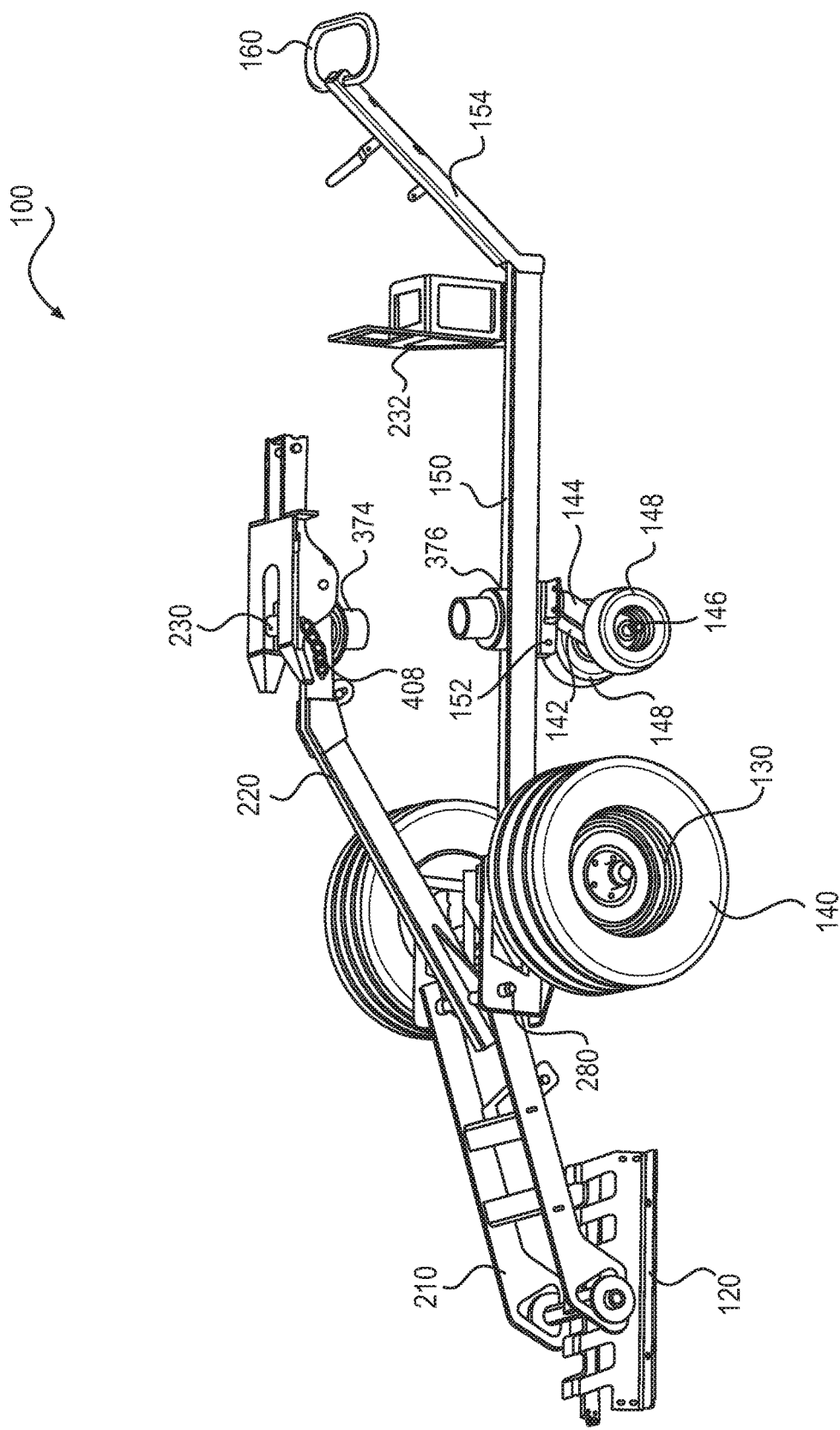
FIG. 4 is an elevated perspective view of the first exemplary restraint of FIG. 1, shown without a wheel and tire, without a coil spring, and without an associated hydraulic circuit.
Figure 6:
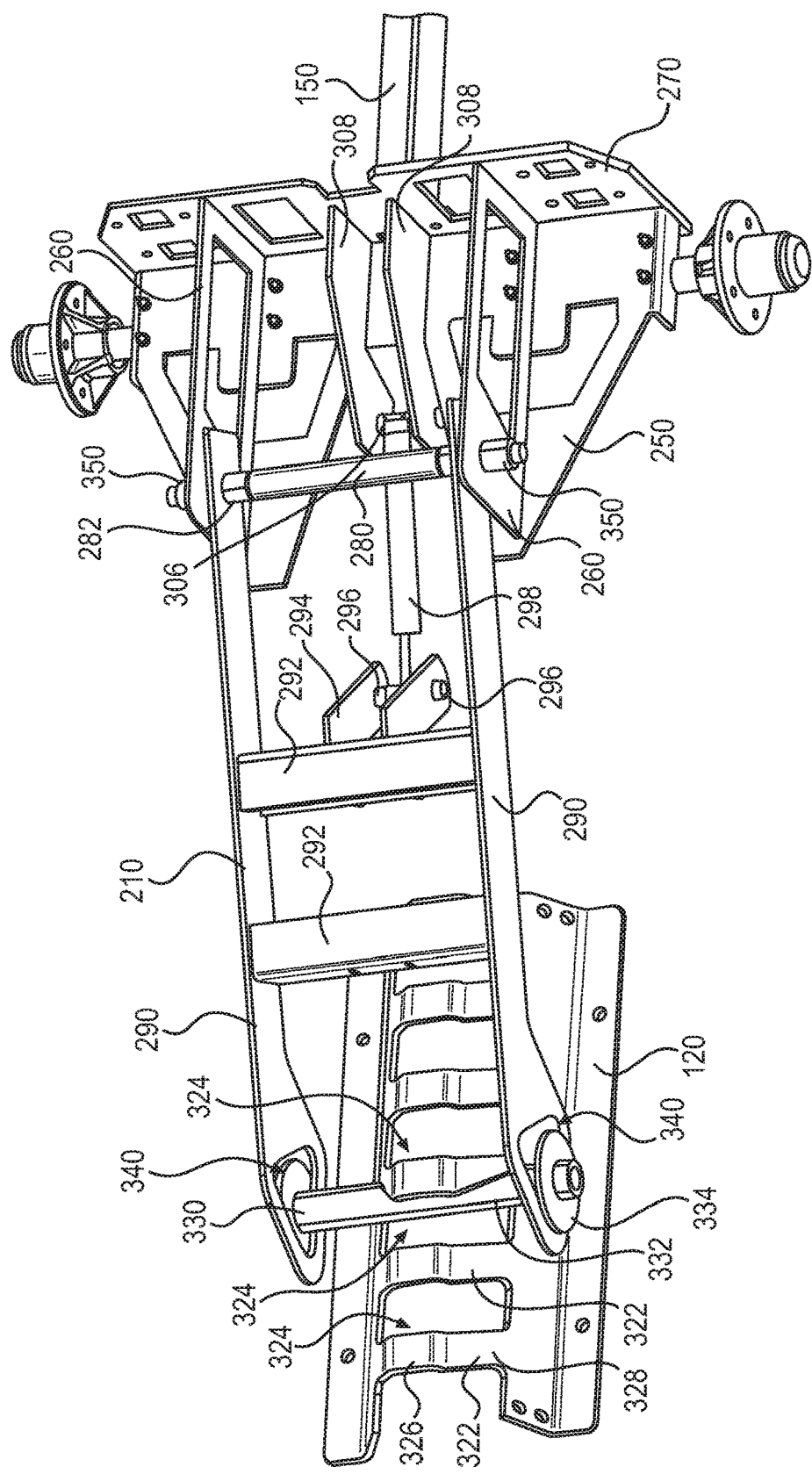
FIG. 6 is an elevated perspective view of the exemplary frame, ground hook, and ground mount of the first exemplary restraint of FIG. 1.
Figure 7:
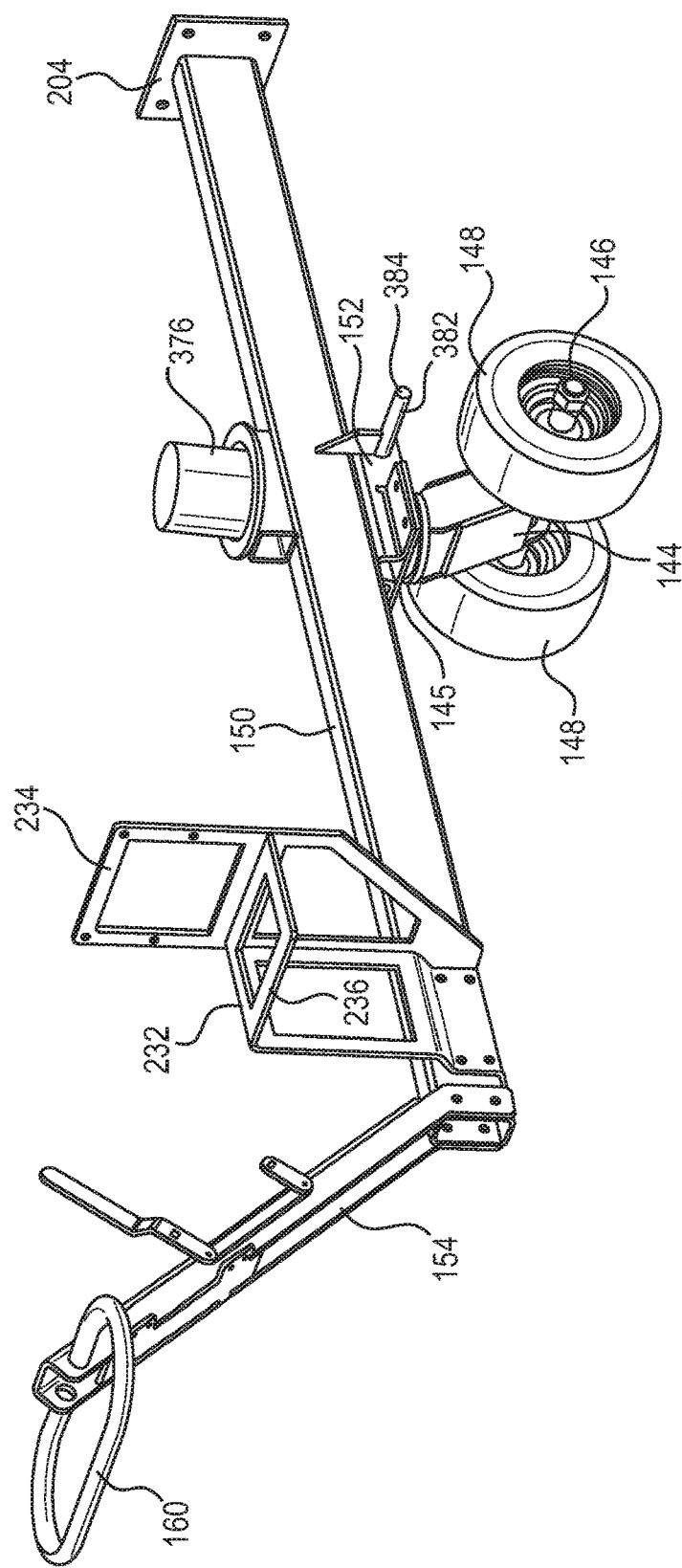
FIG. 7 is an elevated perspective view of the components mounted to the backbone tube of the first exemplary restraint of FIG. 1.
Figure 8:
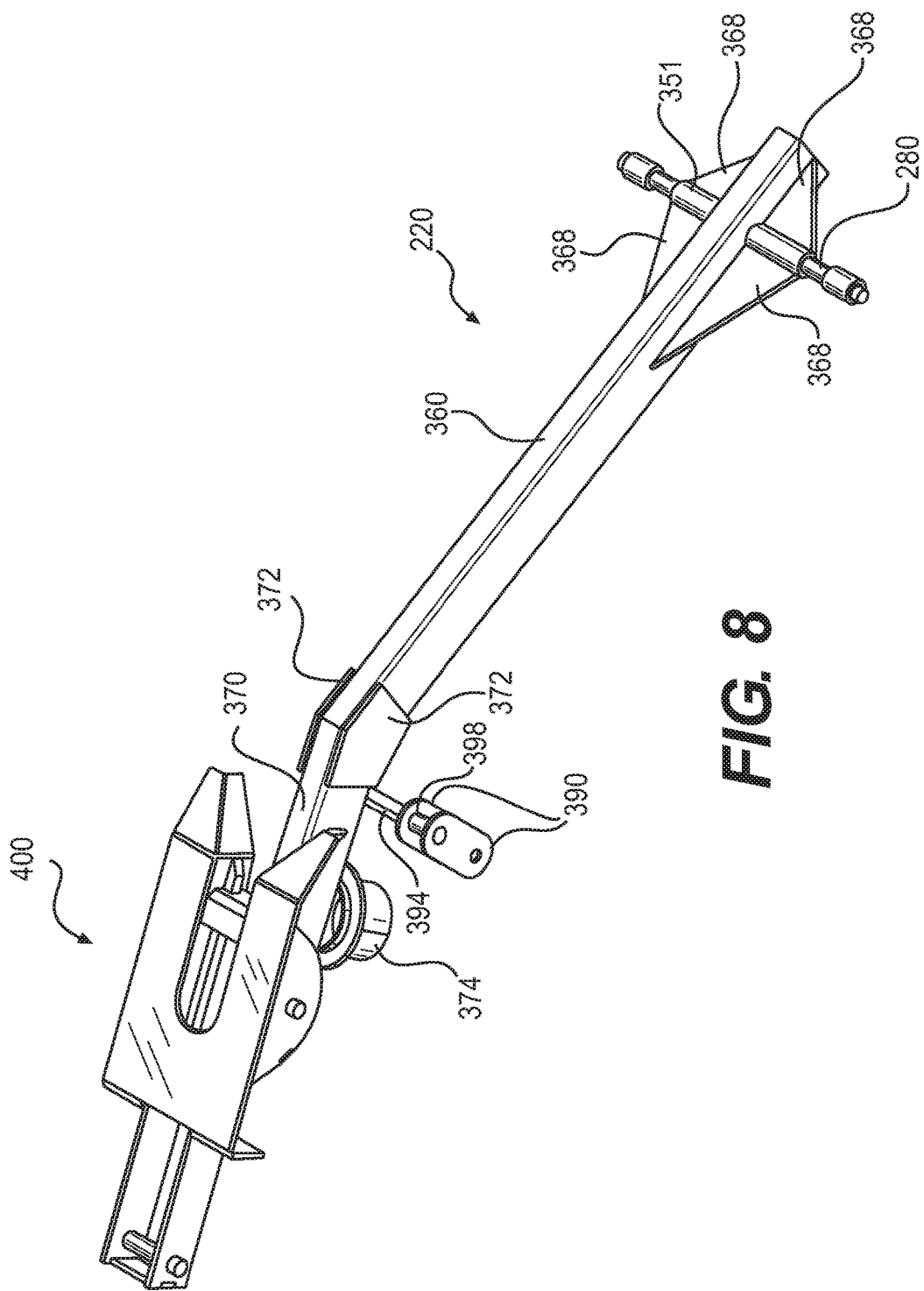
FIG. 8 is an elevated perspective view of the components mounted to the engagement neck and components of the king pin receiver of the first exemplary restraint of FIG. 1.
Figure 9:
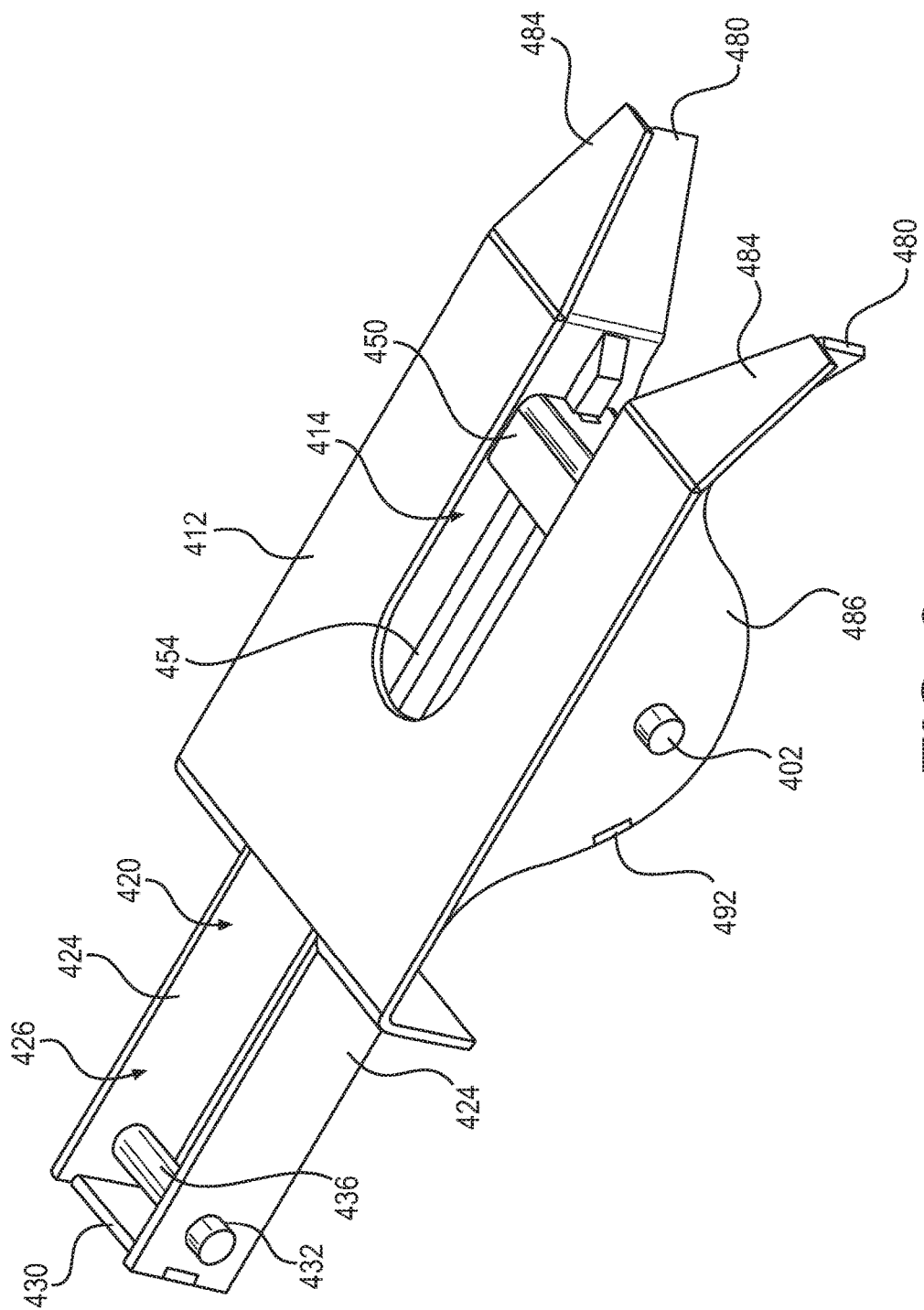
FIG. 9 is an elevated perspective view of the exemplary king pin receiver of the first exemplary restraint of FIG. 1.
Figure 10:
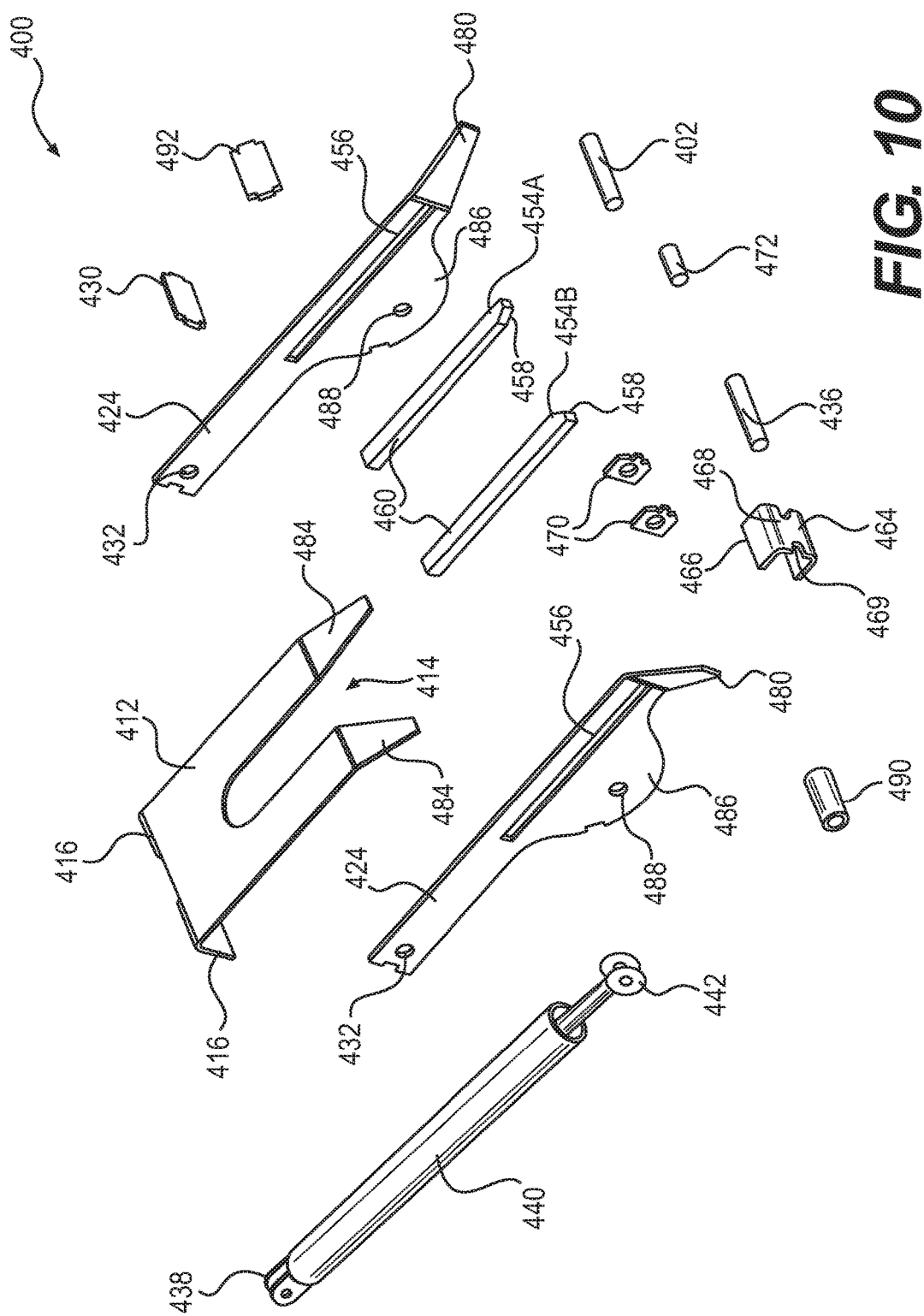
FIG. 10 is an exploded view of the exemplary king pin receiver of the first exemplary restraint of FIG. 1.
Figure 11:
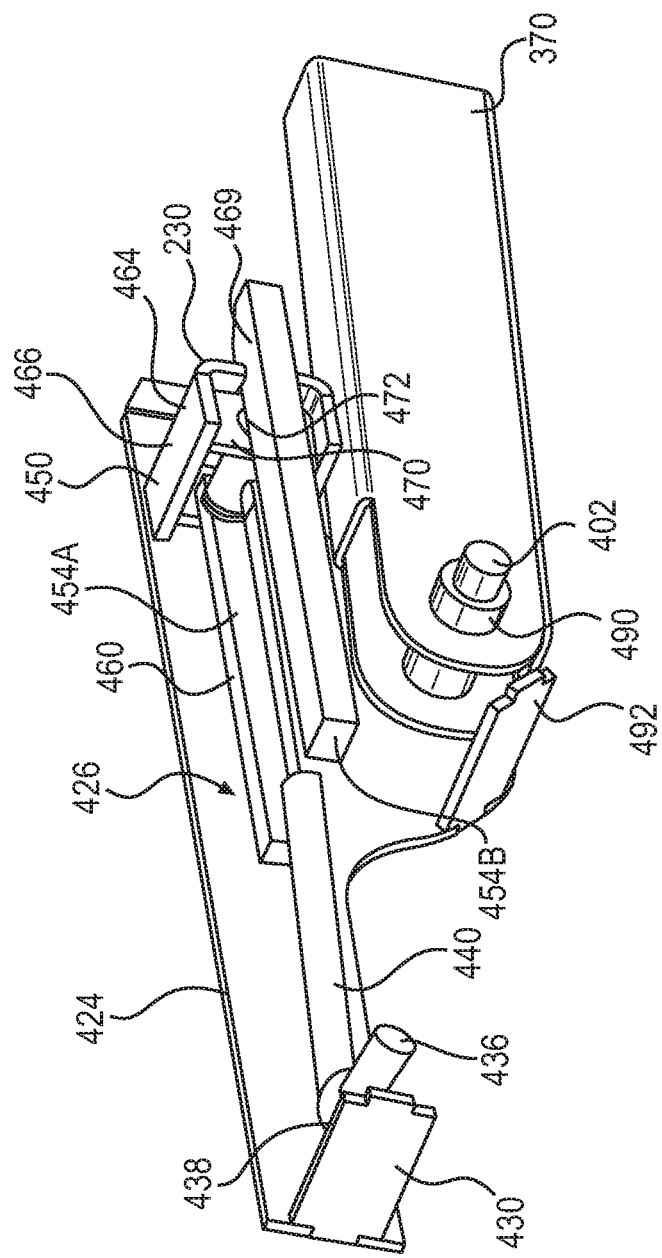
FIG. 11 is an elevated perspective, reveal view of the exemplary king pin receiver of the first exemplary restraint of FIG. 1.
Figure 12:
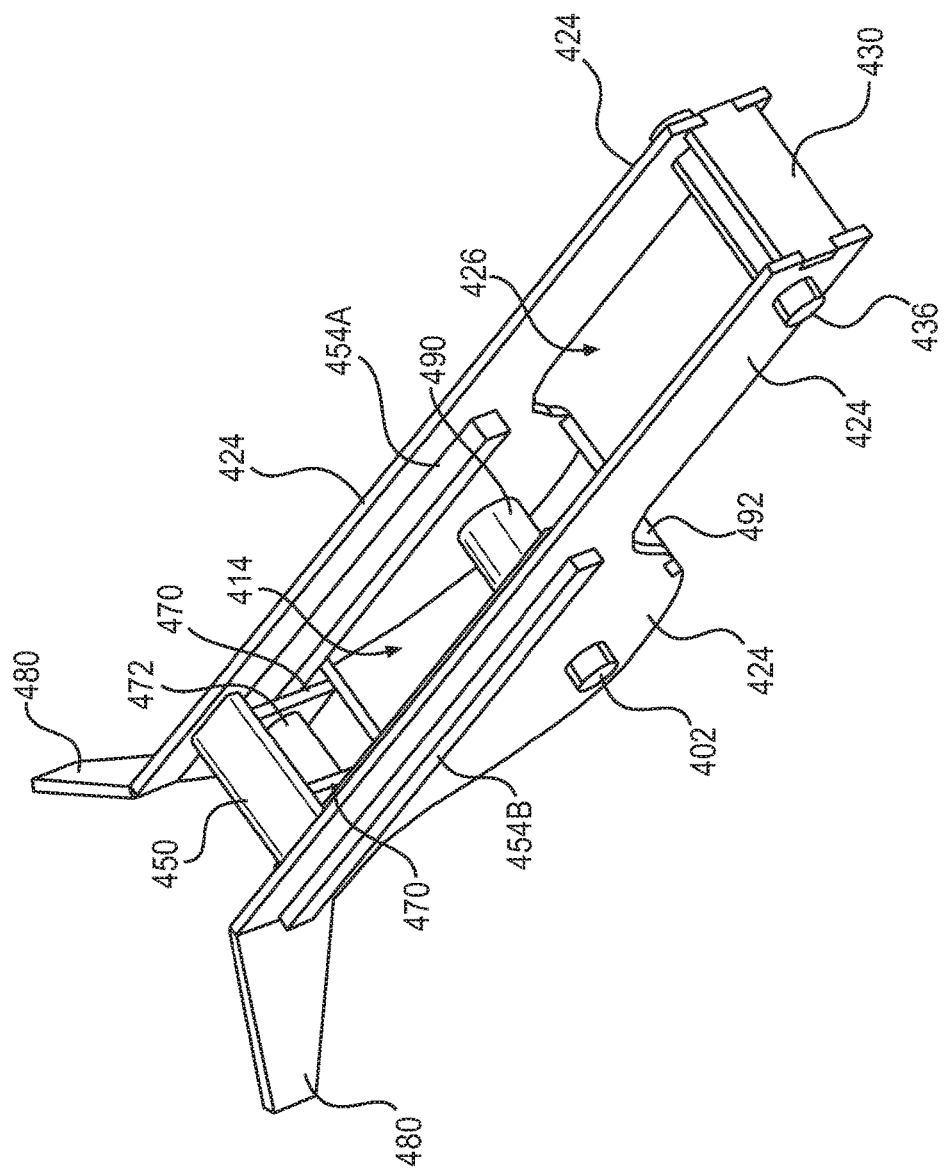
FIG. 12 is a bottom perspective view of the exemplary king pin receiver without the hydraulic cylinder and top plate.

Turning to FIGS. 3, 5, and 6, the ground hook 210 comprises two lateral rails 290 having an identical shape and being spaced apart from one another in the lateral direction by way of two cross-members 292 that are welded to the lateral rails, though additional or fewer cross-members may be utilized. A first of the cross-members 292 includes a bracket 294 and corresponding pin 296 configured to pivotally couple to a first hydraulic cylinder 298 of the exemplary hydraulic circuit 200 to the first cross-member. An opposite end of the first hydraulic cylinder 298 is pivotally mounted to a pin 306 extending through another bracket 308 mounted to the horizontal plate 250 and the vertical support 270. In this fashion, extension of the first hydraulic cylinder 298 is operative to raise the ground hook 210, while retraction of the first hydraulic cylinder 298 is operative to lower the ground hook 210 toward the ground mount 120 (i.e., ground cleat).

In exemplary form, the ground mount 120 is secured to the ground (e.g., pavement, concrete, or other surface) using screws, bolts, or any other fastening mechanism (not shown) or method. The exemplary ground mount 120 includes a plurality of raised ribs 322 that are interposed by corresponding recesses 324. In this exemplary embodiment, the raised ribs 322 have a vertically elevated portion that is angled with respect to a base portion, which is mounted to the frame of the ground mount 120. In this fashion, the raised ribs 322 are angled from distal to proximal (an incline on the raised ribs 322 exists from proximal to distal), as are the corresponding recesses 324 in order to receive and retain a floating catch 330 of the ground hook 210.

In exemplary form, the floating catch 330 of the ground hook 210 comprises a cylindrical rod 332 with stoppers 334 mounted at opposing ends thereof. The cylindrical rod 332 is sized to be received within a corresponding opening 340 extending through each the two lateral rails 290. By way of example, the openings 340 are rounded triangular openings substantially larger than the greatest cross-sectional dimension of the rod 332 to allow the rod to move within the openings 340 within a predetermined play range. Moreover, the stoppers 334 inhibit the rod 332 from being pulled completely out of one or both of the openings 340 so that the rod continues to span between the lateral rails 290 regardless of its position within the openings. In other words, the oversized nature of the openings 340 allows for vertical, proximal-to-distal, and horizontal angular adjustments of the rod 332 with respect to the two lateral rails 290, while maintaining the rod so as to span across the lateral rails. Accordingly, the ground hook 210 and its cylindrical rod 332 need not be precisely aligned over the ground mount 120 either from an angular perspective or from a proximal-to-distal perspective in order for the cylindrical rod to be captured between corresponding raised ribs 322 of the ground mount given the play between the cylindrical rod and the two lateral rails 290 when the ground hook is lowered toward the ground mount by retracting the hydraulic cylinder 298 and pivoting the lateral rails with respect to the shaft 280 using the bearings 286.

In addition to guiding pivoting motion of the ground hook 210, the shaft 280 also utilizes a set of bearings 350 that are respectively mounted to opposing exterior sides of the pair of vertical supports 260 in order to rotate with respect to the vertical supports. As discussed previously, the engagement neck 220 is mounted to the shaft 280 so that as the shaft rotates with respect to the vertical supports 260, so too does the engagement neck.

In exemplary form, the engagement neck 220 includes a hollow tube 351 that is sized to receive and circumscribe the shaft 280. More specifically, the hollow tube 351 and the shaft 280 are each fabricated from metal and are welded to one another so that rotation of the shaft causes the hollow tube to rotate with the shaft. In this exemplary embodiment, the hollow tube 351 and shaft 280 extend through corresponding circular openings through opposing walls of a longitudinal rectangular tube 360 fabricated from steel and having a wall thickness of a one-eighth of an inch. A hollow tube 351 extends through a distal end of the longitudinal rectangular tube 360 and is welded thereto in a transverse orientation with respect to the longitudinal dominant dimension of the longitudinal rectangular tube. In other words, rotation of the shaft 280 is accompanied by corresponding rotation of the hollow tube 351 and the longitudinal rectangular tube 360. In order to provide additional support between the hollow tube 351 and the longitudinal rectangular tube 360, two pairs of gussets 368 are mounted to opposing sides of the longitudinal rectangular tube and to corresponding sections of the hollow tube.

Opposite the distal end, a proximal end of the longitudinal rectangular tube 360 is mounted in-line to a second longitudinal rectangular hollow tube 370 fabricated from steel and having a wall thickness of a one-eighth of an inch. The interface surfaces of the longitudinal rectangular tubes 360, 370 are formed so that the longitudinal rectangular tube 360 is angled approximately 135 degrees with respect to the second longitudinal rectangular tube 370. Two side plates 372 are mounted to opposing sides of the longitudinal rectangular tubes 360, 370 to bookend the joint. By way of example, the joint between the longitudinal rectangular tubes 360, 370 may be welded or otherwise fastened together, in addition to the side plates being welded or otherwise fastened to the longitudinal rectangular tubes 360, 370 so that rotational motion of the longitudinal rectangular tube 360 is translated into similar motion of the second longitudinal rectangular tube 370.

The rotational motion of the engagement neck 220 with respect to the frame 136 may be floating. In particular, a spring retainer 374 is mounted to the underside of the second longitudinal rectangular tube 370. A complementary spring retainer 376 is also mounted to the top side of the longitudinal rectangular tube 150 proximate the caster 144. In exemplary form, each spring retainer 374, 376 comprises a hollow cylinder with a peripheral flange extending axially and circumferentially from a base of the cylinder. The hollow cylinder is sized to act as a guide and retainer for a coil spring 378 that interposes the spring retainers 374, 376. Consequently, the peripheral flange of each spring retainer 374, 376 acts as a stop to prohibit motion of the coil spring when around the hollow cylinder. When not actively repositioned, the engagement neck 220 floats over the longitudinal rectangular tube 150 so that if a load is applied to the top of the engagement neck, the coil spring 378 compresses until its compression force equalizes the load applied or the spring is fully compressed, whichever occurs first. In contract, in certain circumstances, it may be desirable to actively reposition the engagement neck 220 and retain the engagement neck in a fixed position with respect to the frame 136 by overcoming the bias of the coil spring 378.

The first exemplary trailer restraint 100 also includes a neck repositioning hydraulic cylinder 380 operative coupled to the engagement neck 220 to reposition (by way of rotation) the engagement neck to overcome the bias exerted by the coil spring 378. As will be discussed in more detail hereafter, the floating feature of the engagement neck of the first exemplary trailer restraint 100 may be advantageous when coupling the engagement neck to a king pin of a parked semi-trailer 112. And, when a user desires to reposition the first exemplary trailer restraint 100 from underneath the parked semi-trailer, lowering and pivoting of the engagement neck 220 may be advantageous to more easily remove the trailer restraint from underneath the parked semi-trailer 112 post deployment.

In exemplary form, a first end of a housing of the hydraulic cylinder 380 is mounted to an appendage 384 extending laterally from the longitudinal rectangular tube 150. More specifically, the first end of the hydraulic cylinder 380 includes a pair of bearings that circumscribe a cylindrical projection 382 associated with the appendage 384, thereby allowing rotation of the hydraulic cylinder with respect to the appendage. An opposite, second end of the hydraulic cylinder 380 is mounted to a shackle 390, which includes a pair of parallel plates. Each of the parallel plates includes two holes extending therethrough to accommodate throughput of two bolts 394, 396. The first bolt 394 is mounted to the underside side of the second longitudinal rectangular tube 370 just forward of the plates 372 and extends laterally outward therefrom generally perpendicular to the longitudinal axis of the second longitudinal rectangular tube. The first bolt 394 extends concurrently through the corresponding holes of the shackle 390 and a hollow cylindrical bushing 398 in order to maintain spacing between the shackle plates as the shackle is rotated with respect to the first bolt. The second bolt 396 extends concurrently through a second set of corresponding holes of the shackle 390 and the second end of the hydraulic cylinder 380 and allows rotation of the second end of the hydraulic cylinder with respect to the second bolt and shackle. Consequently, retraction of the hydraulic cylinder 380 is operative to actively overcome, via fluid pressure, the bias of the coil spring 378 in order to pivot and lower the height of the engagement neck 220. Conversely, the hydraulic cylinder 380 may be depressurized to reposition the engagement neck 220 using the bias of the coil spring 374 to pivot and raise the engagement neck with respect to the frame 136. In such a circumstance, the engagement neck 220 floats and pivots with respect to the frame 136 so that external forces acting upon the engagement neck (e.g., having the engagement neck 220 contacted by a parked semi-trailer 112 when pushed thereunder) may be operative to overcome the bias of the coil spring 378 to lower the height of the engagement neck.

A proximal portion of the engagement neck 220 includes a king pin receiver 400 that is configured to receive a king pin of a parked semi-trailer 112 as part of restraining the parked semi-trailer. In exemplary form, the king pin receiver 400 is pivotally coupled to the second longitudinal rectangular tube 370 near its proximal end using a pivot pin 402 concurrently extending through corresponding holes through the second longitudinal rectangular tube and the king pin receiver. In this exemplary embodiment, a governor 408 restricts that amount of pivoting travel that is possible between the king pin receiver 400 and the second longitudinal rectangular tube 370. More specifically, the governor 408 comprises a series of chain links with a first end of the chain links being mounted to the second longitudinal rectangular tube 370 and a second end of the chain links being mounted to the king pin receiver 400. In this manner, when taut, the chain links prohibit further pivoting motion of the king pin receiver 400 with respect to the second longitudinal rectangular tube 370 in the direction that caused the chain links to become taut. Conversely, when slack, the chain links allow limited pivoting motion of the king pin receiver 400 with respect to the second longitudinal rectangular tube 370 until reaching the limit of the pivotal movement when the chain links become taut or when the king pin receiver contacts the top of the second longitudinal rectangular tube 370. By way of example, the governor 408 is intended to restrict pivotal motion of the king pin receiver 400 with respect to the second longitudinal rectangular tube 370 so that at a maximum height of the second longitudinal rectangular tube, the king pin receiver is no more than plus twenty degrees rotated beyond horizontal level (as measured from the top plate surface of the king pin receiver) and no less than negative forty five degrees rotated beyond horizontal level. Conversely, by way of example, the governor 408 is intended to allow pivotal motion of the king pin receiver 400 with respect to the second longitudinal rectangular tube 370 so that at a minimum height of the second longitudinal rectangular tube, the king pin receiver is no more than plus fifty degrees rotated beyond horizontal level (as measured from the top plate surface of the king pin receiver) and no less than negative five degrees rotated beyond horizontal level. Those skilled in the art will understand that by changing the link size of the governor 408 chain and/or the number of chain links utilized, one may easily change the degree of pivotal motion available between the king pin receiver 400 and the second longitudinal rectangular tube 370.

Turning specifically to FIGS. 8-12, the structure of the king pin receiver 400 includes a top, planar plate 412 having an elongated opening 414 that is configured to accommodate through put of a trailer king pin. A proximal end of the plate 412 is mounted to a pair of appendages 416 extending generally perpendicularly with respect to the plate and away from the plate toward the ground. In exemplary form, the appendages 416 may comprise extensions of the plate 412 having been bent or folded with respect to the plate to take on a perpendicular orientation. In such a circumstance, prior to bending of the appendages 416, an opening is formed between the appendages to accommodate the lateral spacing of a longitudinal box 420 mounted to the plate 412 and appendages 416. The longitudinal box 420 includes a set of parallel rail plates 424 that are identically shaped and equidistantly spaced apart from one another to create a through trough 426 that is aligned with the elongated opening 414 extending through the top plate 412, the underside of which bounds part of the trough. A proximal end of the longitudinal box 420 is partially enclosed by an end wall 430, mounted to and spanning between the parallel rail plates 424, that operates as an end wall delineating a portion of the trough 426. Adjacent the end wall 430, the parallel rail plates 424 each include an opening 432 configured to receive a pin 436, where the pin is mounted to the parallel rail plates by welding, for example. In exemplary form, the pin 436 embodies a cylindrical shape and includes a diameter sized to be received within a corresponding end 438 of a hydraulic cylinder 440 of the king pin stop 230.

An opposite end 442 of the hydraulic cylinder 440 is mounted to a sled 450, which is also part of the king pin stop 230, which traverses along corresponding track 454 that protrudes outward from opposite, interior faces of the parallel rail plates 424 along the trough 426. In exemplary form, the track 454 includes two mirror image track segments 454A, 454B that each extend through a corresponding opening 456 in each of the parallel rail plates 424. Each track segment 454A, 454B comprises an elongated, linear bar having a rectangular cross-section, with the distal end of the bar embodying a taper 458. And each track segment 454A, 454B includes a planar top surface 460 and an opposite bottom surface that project outward from the interior surface of the parallel rail plates 424 a uniform distance along the longitudinal length of each track segment, but for the distal end that is tapered. And each track segment 454A, 454B is oriented to extend longitudinally in parallel to the other track segment at approximately the same vertical height so that the two track segments are directly opposite one another and extend longitudinally in parallel to partially delineate the trough 426. In this manner, the sled 450 rides upon the planar top surface 460 when repositioned by extension or retraction of the hydraulic cylinder 440.

In exemplary form, the sled 450 comprises a rounded-over, block C-shaped plate 464 that includes a top surface 466, a bottom surface, and a front surface 468 that extends between the top and bottom surfaces. In exemplary form, the top and bottom surfaces 466 having a lateral width that is slightly less than the distance between the parallel rail plates 424, which is substantially constant along their longitudinal length. The length of the top and bottom surfaces 466 of the block C-shaped plate 464 may be arbitrary, but is generally uniform and large enough to form a covering over the end 442 of the hydraulic cylinder 440 that is mounted to the sled 450. The front surface 468 of the C-shaped plate 464 that extends between the top and bottom surfaces 466 also includes a lateral width that is slightly less than the distance between the parallel rail plates 424, but for two rectangular openings 469 formed therethrough that are large enough to accommodate the rectangular cross-section of each of the track segments 454A. 454B. The shape of the C-shaped plate 464 delineates a proximal cavity that includes a pair of vertical braces 470 extending vertically and parallel to one another, and also inset with respect to the track segments 454A. 454B when assembled. A corresponding hole extending through each of the braces 470 is sized to accommodate a pin 472, which is circumscribed by one end 442 of the hydraulic cylinder 440. In this manner, as the hydraulic cylinder 440 is repositioned from a retracted position to an extended position, and vice versa, the sled 450 is correspondingly repositioned longitudinally along the planar top surface 460 of the track 454 in order to vary the dimensions of the elongated opening 414 that can accept a king pin of a parked trailer. In exemplary form, the track 454 extends longitudinally and proximally beneath the top, planar plate 412 (i.e., beyond the stopping point or boundary of the elongated opening 414) so that the sled 450 may be repositioned when the hydraulic cylinder 440 is fully retracted underneath the top, planar plate 412 and outside of the bounds of the elongated opening 414 toward a proximal end of the king pin receiver 400.

Opposite the proximal end, the king pin receiver 400 includes a distal portion that is tapered and flared outward to facilitate more easily directing a trailer king pin into the elongated opening 414 and directing the king pin receiver 400 underneath the forwardmost portion of the parked trailer. In particular, a first trapezoidal extension 480 is mounted to each distal end of each parallel rail plate 424 in order to act as a lateral funnel that tapers toward the trough 426 to direct a king pin into the trough. In addition a second trapezoidal extension 484 is mounted to the distal ends of the top, planar plate 412 (and mounted to the first trapezoidal extensions 480 upon complete assembly). In this manner, each second trapezoidal extension 484 acts as a ramp to reduce the vertical height leading to the top, planar plate 412. Accordingly, the front or forwardmost portion of a trailer may initially contact one or both of the second trapezoidal extension 484, thereby causing the nose of the parked trailer to ride upon one or both of the second trapezoidal extension 484 and cause the king pin receiver 400 to be vertically repositioned beneath the front nose of the parked trailer 112.

Each parallel rail plate 424 also includes a flange 486 having an opening 488 extending therethrough that is sized to receive an end of the pivot pin 402. By way of example, the pivot pin 402 is welded to both parallel rail plates 424 and extends through a proximal opening in the second longitudinal rectangular tube 370, which is sized to receive a pivot bushing 490. The pivot bushing 490 comprises a hollow cylinder sized to receive the pivot pin 402 and allow rotation between the pivot pin and the second longitudinal rectangular tube 370. Consequently, the king pin receiver 400 is pivotally coupled to the second longitudinal rectangular tube 370. In order to provide additional structural integrity to the king pin receiver 400, a box plate 492 is mounted to and spans between the flanges 486 of the parallel rail plates 424.

Figure 13:
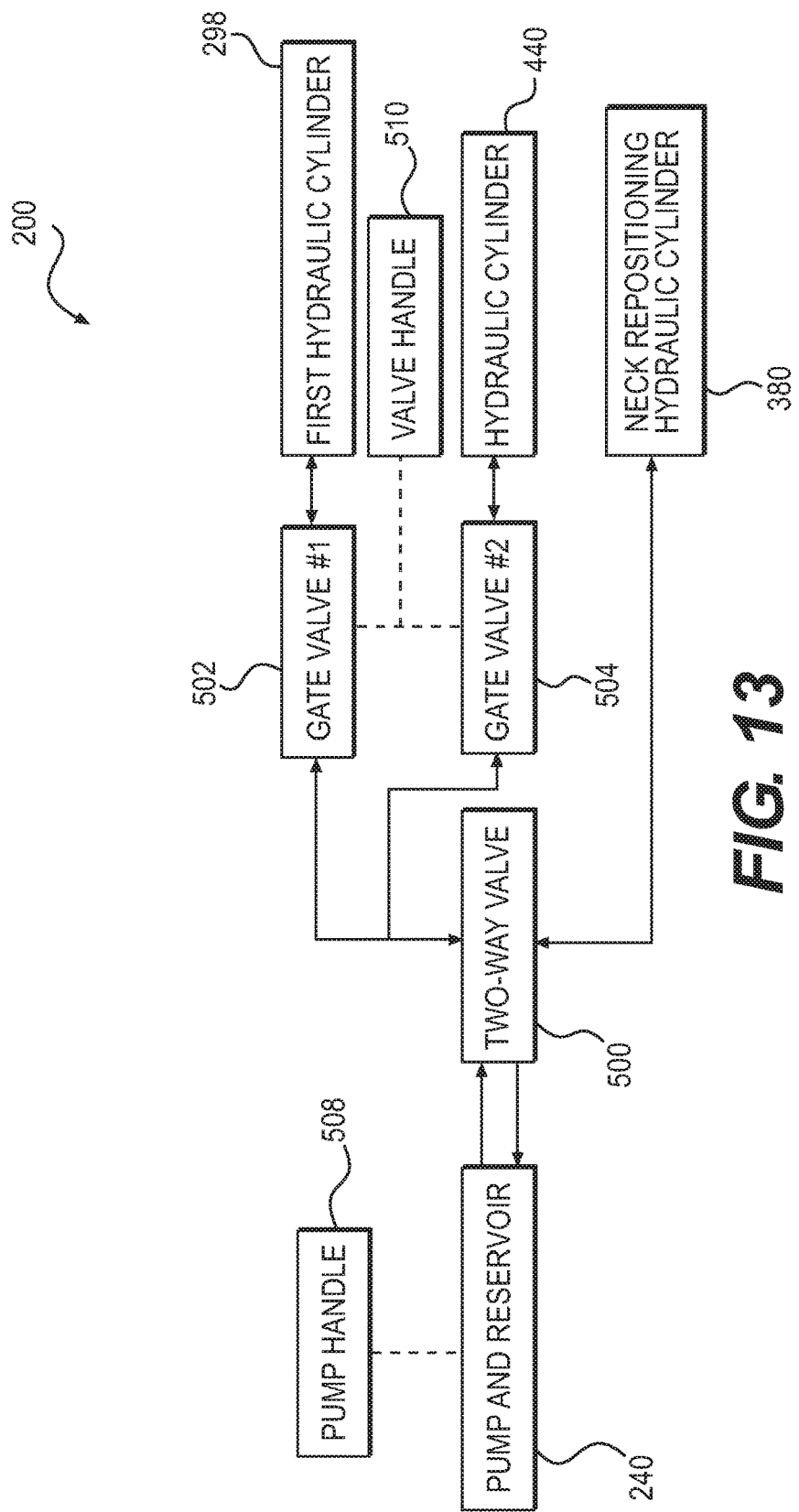
FIG. 13 is a first exemplary schematic diagram of the exemplary hydraulic system comprising part of the first exemplary restraint of FIG. 1.
Figure 14:
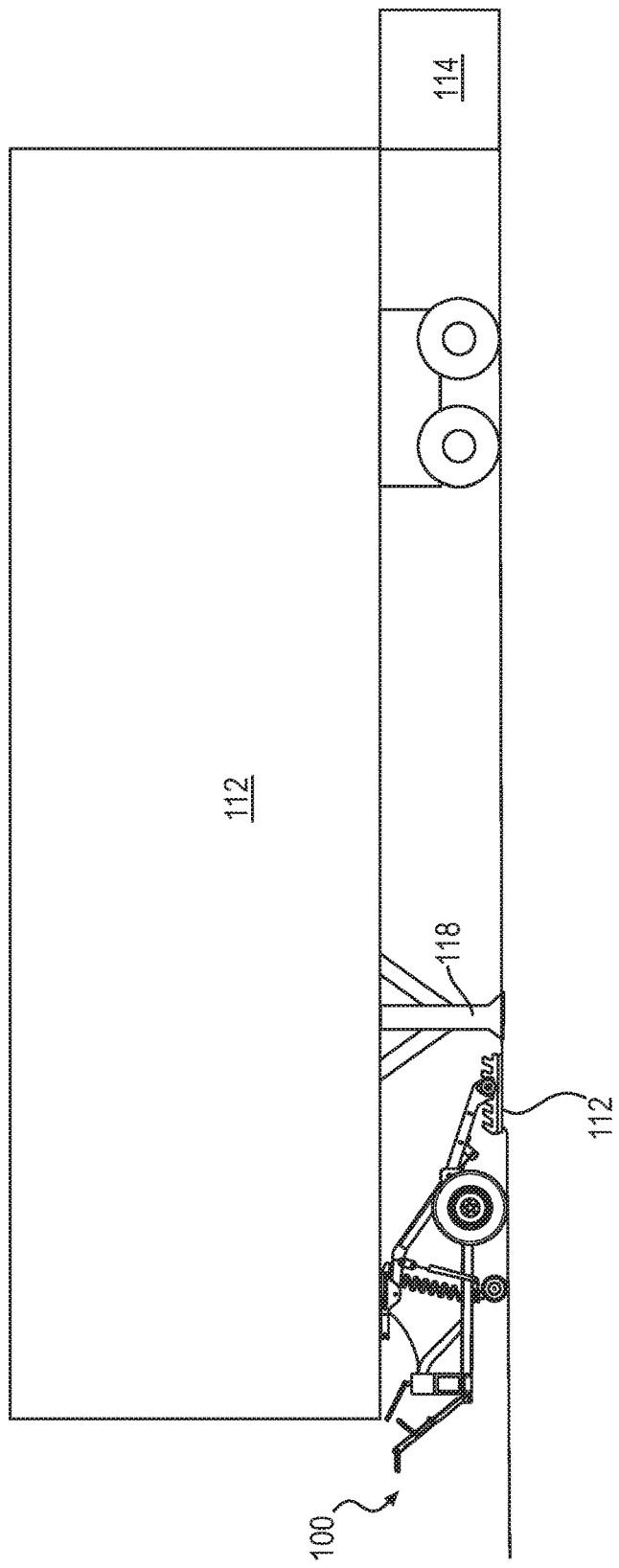
FIG. 14 is a profile view showing the first exemplary restraint of FIG. 1 mounted to a semi-trailer, where the semi-trailer is positioned at a loading dock for loading/unloading.

Referring to FIG. 13, the exemplary hydraulic circuit 200 will be described in greater detail. As discussed previously, the exemplary hydraulic circuit 200 directs pressurized fluid to cause repositioning of the ground hook 210, the engagement neck 220, and the king pin stop 230 by way of movement of a pump handle 508 associated with the pump and reservoir 240. The heart of the hydraulic circuit 200 is the fluid pump and reservoir 240 that is fluidically coupled to a two-way valve 500 via one or more hydraulic lines. The two-way valve 500 is repositionable between a first position and a second position.

The first position establishes fluid communication between the discharge side of the pump and reservoir 240 and the neck repositioning hydraulic cylinder 380 via hydraulic lines. Accordingly, movement of the pump handle 508 to pump fluid from the reservoir 240 and send this hydraulic fluid through the two-way valve 500 and to the neck repositioning hydraulic cylinder 380 is operative to retract (i.e., decrease length) the neck repositioning hydraulic cylinder, thereby overcoming the coil spring 378 bias and lowering the king pin receiver 400. Also, the first position establishes fluid communication between the inlet side of a pair of gate valves 502, 504 and the inlet side (reservoir vent side) of the pump and reservoir 240. When the gate valves 502, 504 are open, this first position allows higher pressure fluid associated with the hydraulic cylinders 298, 440 to be vented back to the reservoir through the two-way valve 500. But when the gate valves 502, 504 are closed, this first position does not provide fluid communication between the reservoir 240 and the hydraulic cylinders 298, 440.

Conversely, the second position of the two-way valve 500 establishes fluid communication between the discharge side of the pump and reservoir 240 and an upstream side of the pair of gate valves 502, 504 and via hydraulic lines. When the gate valves 502, 504 are open and in communication with the discharge side of the pump and reservoir 240, movement of the pump handle 508 pumps fluid from the reservoir, through the two-way valve 500, and on to the hydraulic cylinders 298, 440, which is operative to extend (i.e., increase length) the hydraulic cylinders and raise the ground hook 210 and push against the parked semi-trailer 112 king pin. Also, the second position of the two-way value 500 establishes fluid communication between the inlet side of the neck repositioning hydraulic cylinder 380 and the inlet side (reservoir vent side) of the pump and reservoir 240 to allow higher pressure fluid associated with the neck repositioning hydraulic cylinder to be vented back to the reservoir. As a result, venting the hydraulic fluid back to the reservoir 240 from the neck repositioning hydraulic cylinder 380 is operative to extend (i.e., increase length) the neck repositioning hydraulic cylinder, thereby having the coil spring 378 bias dominate and raise the height of the king pin receiver 400.

Referring now to FIGS. 1-19, an exemplary description of using the exemplary trailer restraint 100 will hereafter be described. As a prefatory matter, it will be presumed that prior to utilizing the exemplary trailer restraint 100, a number of events may have occurred that put the semi-trailer 112 in a ready position for stabilization. By way of example, these events may include having an over-the-road truck or hustler truck position the loaded/unloaded semi-trailer 112 where it will be loaded/unloaded (e.g., backed up against a mezzanine of a loading dock 114). Moreover, it is presumed that the over-the-road truck or hustler truck has been removed from engagement with the parked semi-trailer 112 and that the parked semi-trailer's landing gear 118 is deployed. Additionally, it is presumed that a forward portion underneath the nose of the parked semi-trailer 112 is accessible and that a ground mount 120 has been previously installed.

As an initial matter, a yard worker or other individual (i.e., a "user") may receive a message, signal, or other communication indicating that a parked trailer 112 is ready for restraint. Alternatively, the user may visually perceive that a parked trailer 112 is ready for restraint in a circumstance where no trailer restraint 100 is positioned under a forward portion of the parked trailer. Either way, the user deploys the exemplary trailer restraint 100 underneath the nose of the parked semi-trailer 112 so that the trailer restraint couples to the ground mount 120 and engages the trailer king pin 110 (see FIG. 14). In so doing, the exemplary trailer restraint 100 is operative to retard forward movement of the parked semi-trailer 112 away from the loading dock 114 by way of the king pin stop 230 pushing against the king pin 110, thereby causing a pulling force to be exerted by the ground hook 210 against the ground mount 120.

Initially, after determining the parked semi-trailer 112 is ready for restraint, the user locates an available exemplary trailer restraint 100 and determines whether the ground hook 210 is elevated and in condition for transport. If not, the user repositions the valve handle 510 to open the valves 502, 504 and likewise repositions the two-way valve 500 to the second position to establish fluid communication between the discharge side of the pump and reservoir 240 and the inlet side of the valves 502, 504. Thereafter, the user operates the pump handle 508 associated with the fluid pump and reservoir 240 in order to pump hydraulic fluid from the reservoir to the first hydraulic cylinder 298, thereby causing the cylinder to extend (e.g., increase in overall length). More specifically, one end of the cylinder 298 is coupled to the pin 306 extending through the second parallel plate bracket 308 of the frame, while the other end of the cylinder 298 is mounted to the pin 296 of the first parallel plate bracket 294 of one the cross-members 292 of the ground hook 210. In this fashion, pumping fluid from the fluid pump and reservoir 240 lengthens the first hydraulic cylinder 298, which operates to raise the ground hook 210 above the ground (i.e., namely raising the floating catch 330 with respect to the ground). Eventually, sufficient pumping and lengthening of the first hydraulic cylinder 298 raises the ground hook 210 sufficiently high enough off the ground for transportation. It should be noted that while the valves 502, 504 are open and receiving hydraulic fluid from the discharge of the reservoir 240, the hydraulic cylinder 440 associated with the king pin receiver 400 is extended to a maximum length prior to raising the ground hook 210 given that the weight of the tail hook provides greater resistance to travel. In other words, in order to raise the ground hook 210 off the ground, it may be necessary to first extend the hydraulic cylinder 440 associated with the king pin receiver 400 to its maximum length.

Presuming the ground hook 210 is sufficiently high enough off the ground for transportation, the user repositions the valve handle 510 to the first condition in order to close the valves 502, 504 to lock the position of the ground hook and repositions the two-way valve 500 to the first position in order to reposition the engagement neck 220 downward to clear the height of the underneath front lip of the semi-trailer 112. After repositioning the two-way valve 500 to the first position, the user may manipulate the pump handle 508 to pump fluid from the pump and reservoir 240, through the two-way valve 500, and on to the neck repositioning cylinder 380, thereby causing the neck repositioning cylinder to contract (i.e., shorten its length) and overcome the bias of the coil spring 374 in order to lower the height of the engagement neck prior to repositioning the trailer restraint 100 underneath a forward part of the parked semi-trailer 112.

Figure 15:
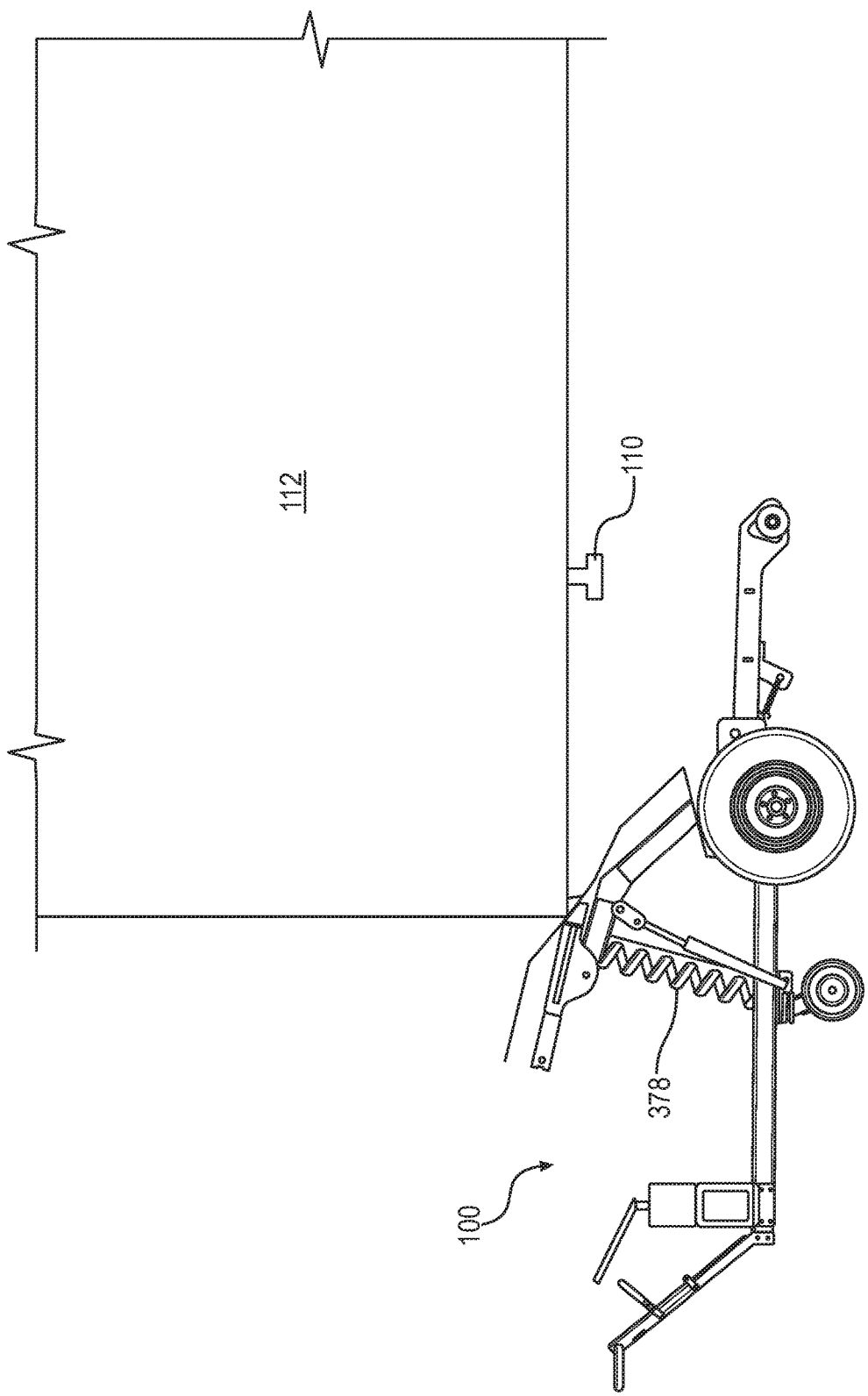
FIG. 15 is a profile view of the first exemplary restraint of FIG. 1 being initially positioned underneath the semi-trailer of FIG. 14.

Referring to FIGS. 1 and 15, after the ground hook 210 and engagement neck 220 are appropriately positioned, the user may grasp the handle bar 160 to reposition the exemplary trailer restraint 100 in proximity to the parked semi-trailer 112. It should be noted that elevation of the ground hook 210 results in the entire weight of the exemplary trailer restraint 100 being borne by the two wheel 130 and tire 140 combinations, as well as the caster 144. Upon reaching the parked semi-trailer 112 to be restrained, the user manipulates the handle bar 160 to push the exemplary trailer restraint 100 underneath the forward nose of the semi-trailer. More specifically, the user introduces the rear of the exemplary trailer restraint 100 underneath the nose of the semi-trailer first, typified by the ground hook 210 (continuing to be in an elevated position) extending under the nose of the semi-trailer first and generally in line with the position of a ground mount 120 (see FIG. 16).

Figure 16:
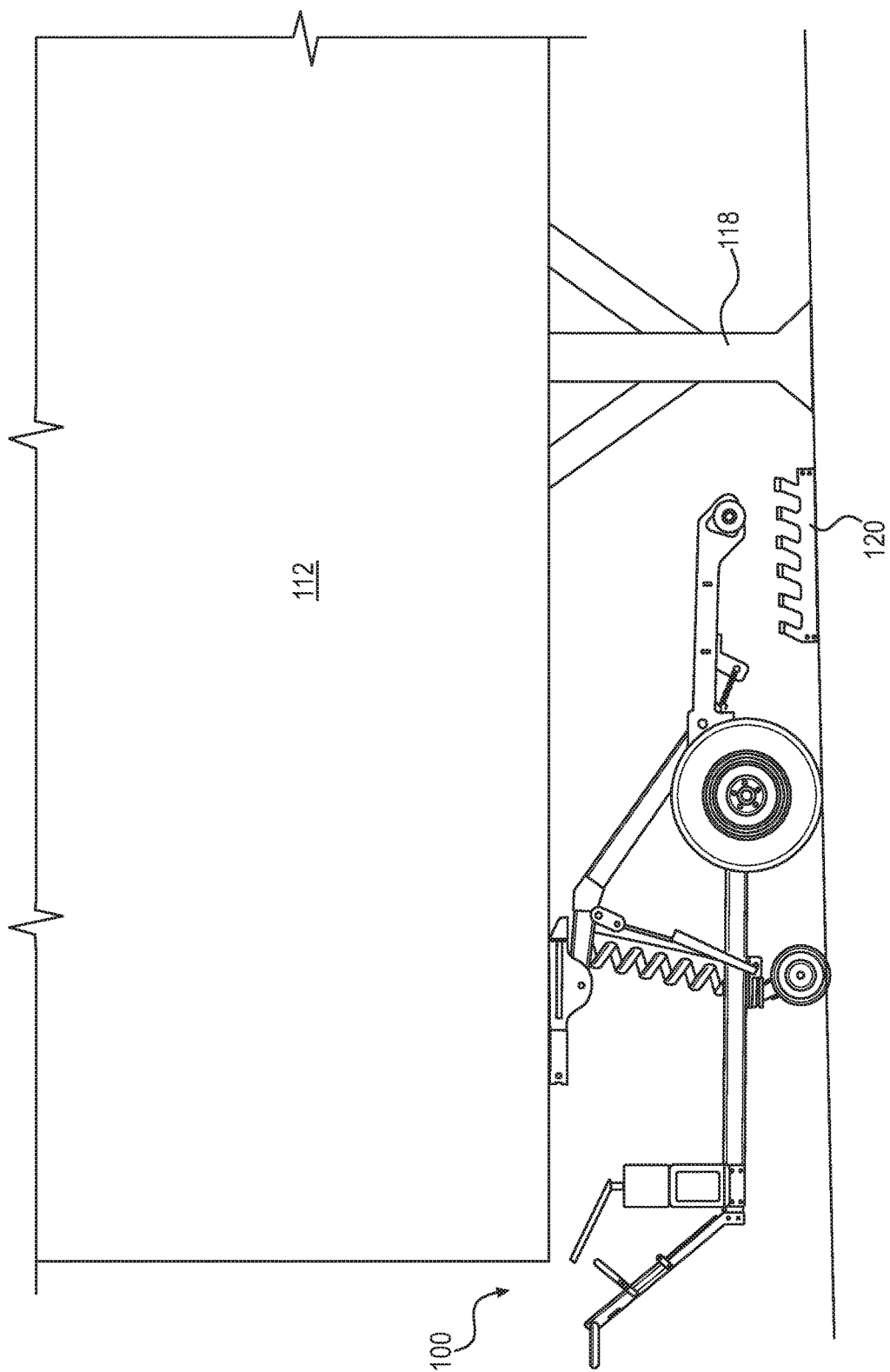
FIG. 16 is a profile view of the first exemplary restraint of FIG. 1 positioned underneath the semi-trailer of FIG. 14 so the king pin receiver receives the king pin of the semi-trailer.
Figure 17:
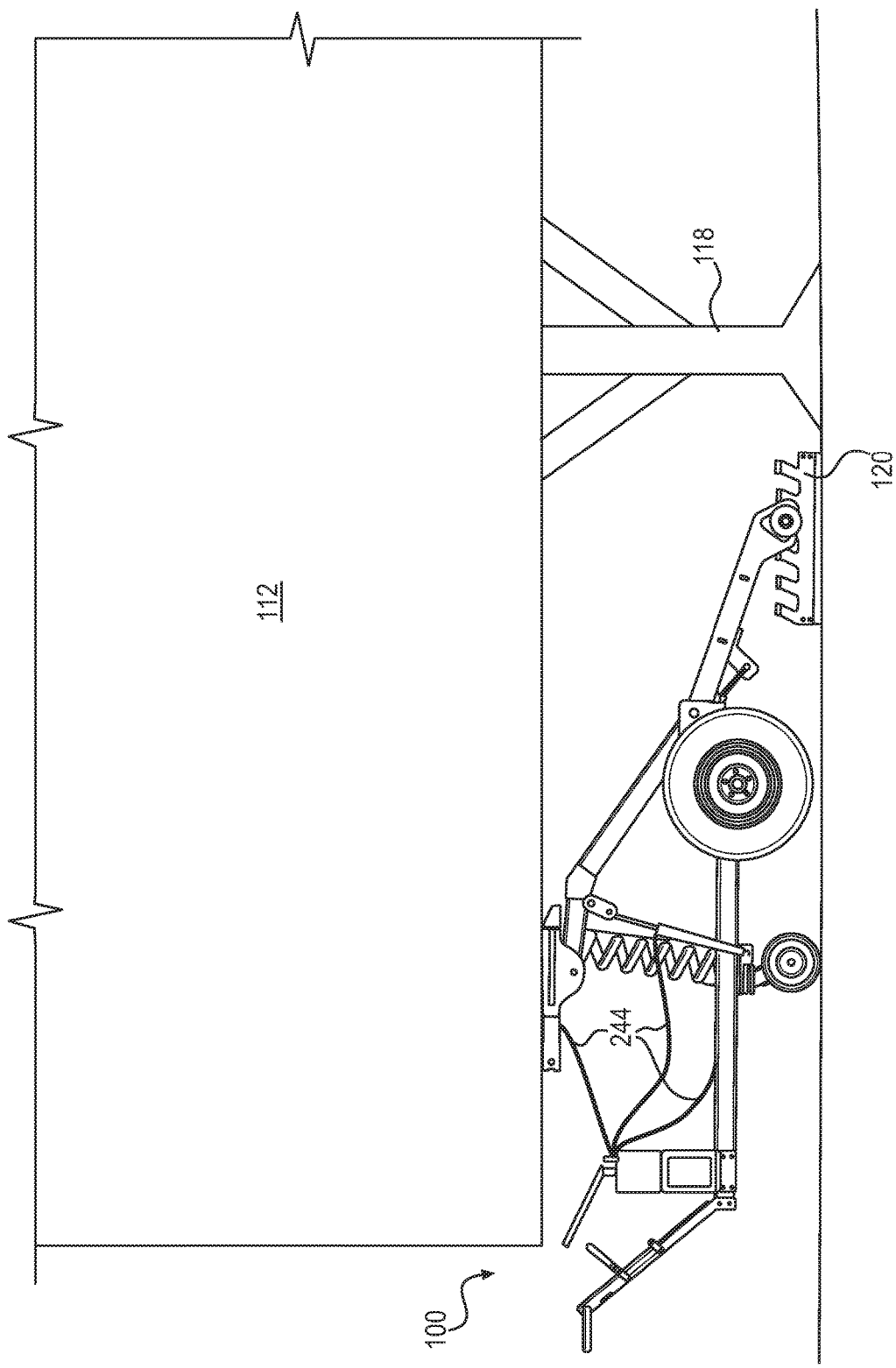
FIG. 17 is a profile view of the first exemplary restraint of FIG. 1 positioned underneath the semi-trailer of FIG. 14 so the king pin receiver receives the king pin of the semi-trailer and the ground hook engages a first exemplary ground mount, where the restraint may in a tension position.

While backing the exemplary trailer restraint 100 underneath the front of the parked semi-trailer 112, it is presumed that the engagement neck 220 is in a raised, floating position. In other words, it is presumed that the engagement neck 220 is floating while the exemplary trailer restraint 100 is pushed underneath the front of the parked trailer 112. In exemplary form, the floating engagement neck 220 causes the trapezoidal extension 484 of the king pin receiver 400 to contact the front of the parked trailer 112 and increase the load applied to the king pin receiver and engagement neck to overcome the bias of the coil spring 374 to vertically lower the king pin receiver underneath the forward portion of the parked trailer. As shown in FIG. 16, the bias of the coil spring 374 maintains contact between the top plate 412 of the king pin receiver 400 and the underside of the trailer king pin plate. It should be noted, however, that the engagement neck 220 may not be floating as a result of the neck repositioning hydraulic cylinder 380 being at least partially contracted so that the engagement neck 220 is in a lowered position to overcome the bias of the coil spring 374.

In either case, as shown in FIGS. 9, 15, 16, and 18, the exemplary trailer restraint 100 is repositioned underneath the front of the parked trailer 112 so that the elongated opening 414 of the engagement neck 220 is longitudinally aligned with the king pin 110. In a circumstance where the engagement neck 220 is lowered via the hydraulic cylinder 380 to clear the front of the parked trailer 112 and thereafter repositioned so that the engagement neck is underneath the forward nose of the parked semi-trailer, the engagement neck may be raised by the user manipulating the two-way valve 500. In particular, the two-way valve 500 may be repositioned from the first position to the second position in order to vent hydraulic pressure associated with the neck repositioning hydraulic cylinder 380 circuit to the pump and reservoir 240. By venting the neck repositioning hydraulic cylinder 380 circuit, the hydraulic cylinder 380 extends (i.e., increasing in length) and the bias of the coil spring 374 is dominant with respect to the hydraulic cylinder 380 in order to raise the vertical position of the engagement neck 220 until contacting the underside of the parked semi-trailer 112 or reaching a maximum vertical height. In this fashion, continued repositioning of the exemplary trailer restraint 100 rearward, ground hook 210 first, causes the king pin 110 of the parked semi-trailer to become seated within the elongated opening 414 (see FIG. 18).

Just prior to, concurrent with, or following seating of the king pin 110 within the elongated opening 414, the user repositions the ground hook 210 to engage the ground mount 120. Specifically, the user repositions the gate valves 502, 504 to be open via actuation of the valve handle 510 and repositions the two-way valve 500 to be in the first position. When the gate valves 502, 504 are open and vented to the reservoir 240, via the two-way valve 500 being in the first position, the weight of the ground hook 210 becomes the dominant force and causes pressurized fluid from the first hydraulic cylinder 298 to flow toward the reservoir 240 vent side, which corresponds with the first hydraulic cylinder retracting (i.e., decreasing in overall length) and the ground hook pivoting toward the ground.

As shown in FIG. 6, the pivoting action of the ground hook 210 ceases when the floating catch 330 comes to rest on top of the ground mount 120. By coming to rest, the cylindrical rod 332 of the floating catch 330 may rest within one of the recesses 324 or may rest on top of one of the raised ribs 326. If the cylindrical rod 332 comes to rest within one of the recesses 324, the restraint 100 need not be further positioned forward or rearward. In contrast, if the cylindrical rod 332 rests on top of one of the raised ribs 326, the restraint 100 is repositioned slightly forward or rearward in order to seat the rod within a corresponding recess 324. It should be noted that while the valves 502, 504 are open and the two-way valve 500 is in the first position, the hydraulic cylinder 440 may be slightly retracted (i.e., decreased in overall length) to accommodate the king pin 110 moving deeper into the elongated opening 414 of the engagement neck 220 (compare FIGS. 18 and 19) so that the ground hook 210 can be repositioned slightly rearward into the next corresponding recess 324 in instances where the floating catch 330 comes to rest on top of one of the raised ribs.

While the foregoing explanation has inherently presumed that the cylindrical rod 332 of the ground hook 210 is parallel with at least one of the recesses 324 when the restraint 100 is initially positioned underneath the forward portion of the parked trailer 112, it may be that the cylindrical rod is angled with respect to at least one of the recesses if the ground hook 210 is angularly offset from the midline of the parked trailer (i.e., the line running longitudinally along the parked trailer and through the king pin 110). In order to accommodate for this angular variance, and seat the cylindrical rod 332 within one of the recesses, the cylindrical rod has built in play with respect to the remainder of the ground hook 210 by way of the enlarged openings 340 through the lateral rails 290. In particular, the enlarged openings 340 may be one or more multiples in width of the diameter of the cylindrical rod 332 to provide for vertical and proximal-to-distal motion between the cylindrical rod and the remainder of the ground hook 210. In this fashion, even if the lateral rails 290 of the ground hook 210 are not parallel to the lateral sides of the ground mount 120, the play between the lateral rails and the cylindrical rod 332 accommodates for a predetermined angular offset that allows for the cylindrical rod 332 to be angled other than perpendicularly with respect to the lateral rails 290 and be received within one of the corresponding recesses 324.

Turning back to FIGS. 9 and 14-18, after the ground hook 210 is received within one of the recesses of the ground mount 120, and the king pin 110 is at least partially received within the elongated opening 414, the user may reposition the valve handle 510 to maintain the respective positions of the hydraulic cylinders 298, 440. At this time, the restraint 100 occupies the restraining position shown in FIGS. 17 and 18 and the parked trailer may be loaded or unloaded.

In particular, the ground hook 210 is positioned in front of the parked trailer's landing gear 118 and retained in relative position via the ground mount 120 and the hydraulic cylinder 298 being locked in an extended position, while the hydraulic cylinder 440 associated with the king pin receiver 400 is also locked in an extended position. In exemplary form, the corresponding openings 324 of the ground mount 120 are vertically angled so that minimal movement of the parked trailer 112 forward (i.e., away from the loading dock 114) causes the cylindrical rod 332 deeper (i.e., closer to the ground) into its corresponding opening 324. Eventually, the cylindrical rod 332 occupies the deepest portion of a corresponding opening 324 so that as the parked trailer attempts to move forward, the restraint 100 precludes any additional forward motion of the parked trailer 112. In particular, as the parked trailer 112 attempts to move forward, the king pin 110 pushes against the sled 450 but, based upon the hydraulic cylinder 440 being locked in its extended position, the king pin is unable to move deeper into the elongated opening 414. Consequently, the force applied to the sled 450 via the king pin 110 attempts to move the entire restraint 100 forward. But this forward motion of the restraint 100 is inhibited once the cylindrical rod 332 occupies the deepest portion of a corresponding opening 324. In other words, any attempt by the parked trailer 112 to move forward is restrained by the restraint 100 given that the restraint is put in tension by a forward portion of the king pin 110 pushing on the sled 450, which is transferred into a pulling force via the ground hook 210 coupled to the ground mount 120. As will be discussed in more detail hereafter, if the restraint 100 occupies a tension position (e.g., king pin 110 against the sled 450 and cylindrical rod 332 in the deepest portion of a corresponding opening 324) post unloading/loading of the parked trailer 112, an accommodation must be made to discontinue this tension position before the restraint may be removed from underneath the parked trailer.

After the parked trailer 112 is loaded/unloaded, the restraint 100 should be removed to allow a yard truck or other truck to couple to and remove the parked trailer from the loading dock 114. Presuming the restraint is in a tension position, removal of the restraint may not be possible without discontinuing this tension position. Specifically, pivoting motion of the ground hook 210 upward and out of a corresponding recess 324 may be precluded by the vertical angle of the recess. In particular, the arcuate motion of the pivoting ground hook 210 may result in contact with one of the raised ribs 322 so that the ground hook cannot be disengaged from the ground mount 120 without first discontinuing the tension position.

In order to discontinue this tension position, a first exemplary sequence involves the user of the exemplary restraint 100 repositioning the valve handle 510 to open the gate valves 502, 504 as well as ensure that the two-way valve 500 is in the first position so that the hydraulic cylinders 298, 440 both vent to the reservoir 240. Thereafter, the user repositions the restraint 100 rearward, toward the rear of the parked trailer 112, and causes the king pin 110 to move deeper into the elongated opening 414 (see FIG. 19). More specifically, rearward motion of the restraint 100 results in the king pin 110 applying a force to the sled 450 that pressurizes the fluid associated with the hydraulic cylinder 440, thereby causing the cylinder to retract as the pressurized fluid is vented to the reservoir 240. This retraction of the cylinder 440 results in the sled 450 reconfiguring and increasing the depth of the opening 414 to accommodate deeper insertion of the king pin 110, thereby allowing the restraint 100 to be repositioned rearward slightly with respect to the parked trailer 112. The slight rearward motion of the restraint 110 with respect to the trailer 112 coincides with rearward motion of the ground hook 210 with respect to the ground mount 120 (see FIG. 19). This slight rearward motion of the ground hook 210 with respect to the ground mount 120 allows the pivoting arc of the ground hook to clear the raised ribs 322 interposed by the cylindrical rod 332.

Figure 18:
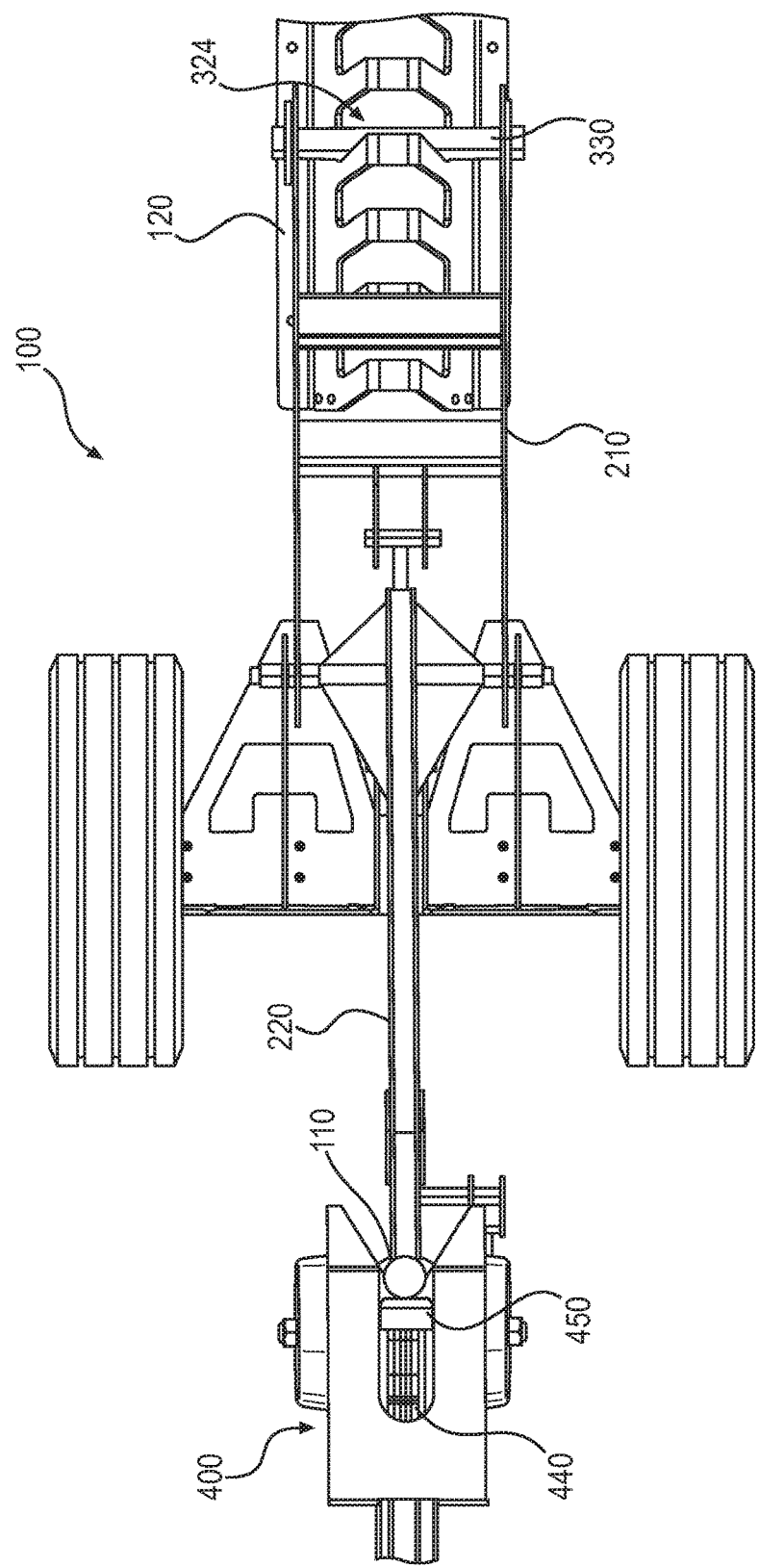
FIG. 18 is an overhead view of the first exemplary restraint of FIG. 1 positioned underneath the semi-trailer of FIG. 14 so the king pin receiver receives the king pin of the semi-trailer and the ground hook engages a first exemplary ground mount, where the restraint is in a tension position.
Figure 19:
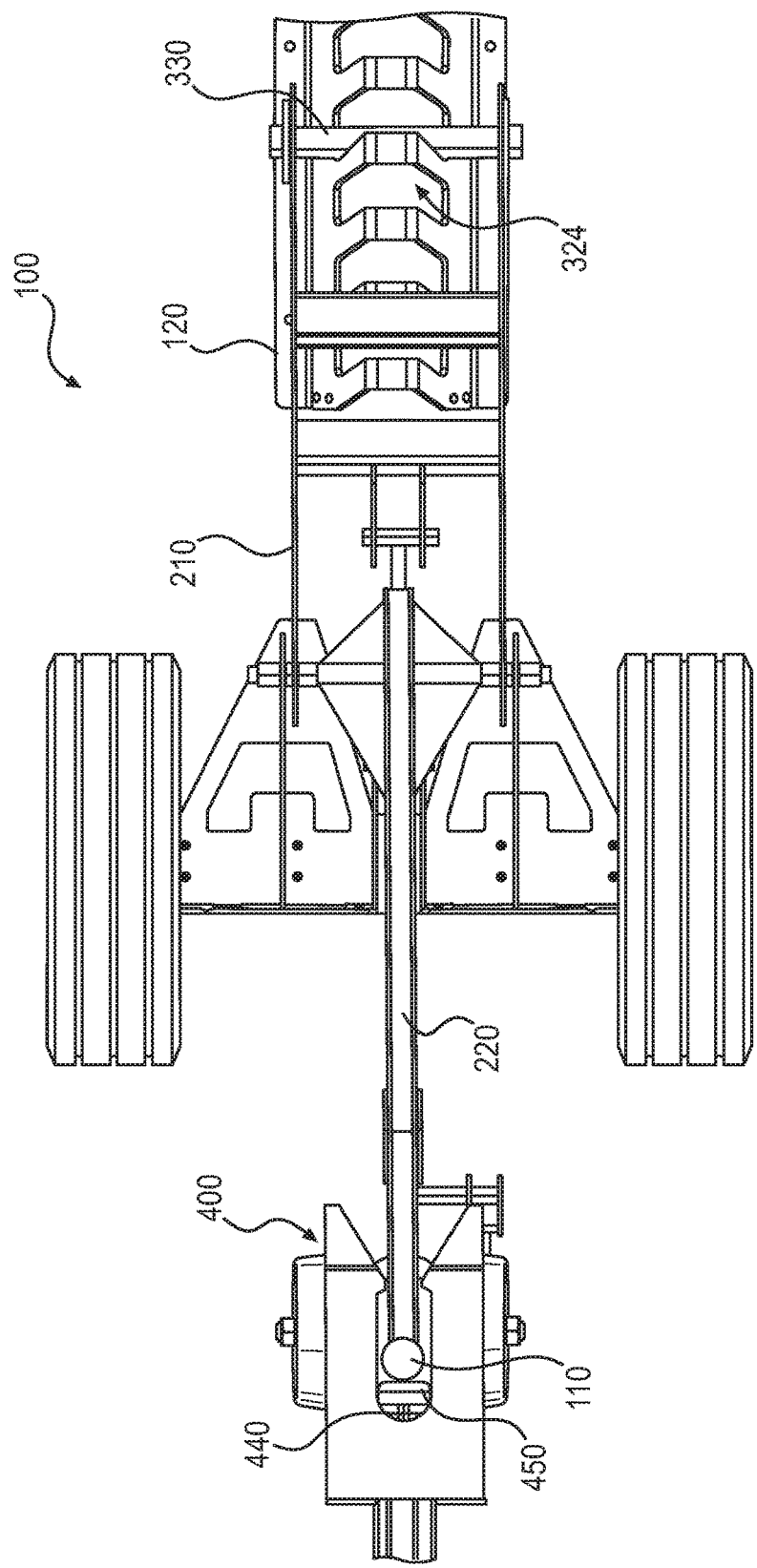
FIG. 19 is an overhead view of the first exemplary restraint of FIG. 1 positioned underneath the semi-trailer of FIG. 14 so the king pin receiver receives the king pin of the semi-trailer and the ground hook engages a ground mount, where the restraint is no longer in a tension position.

After moving the ground hook 210 rearward with respect to the ground mount 120, the user of the restraint 100 repositions the two way valve 500 to the second position and verifies that the valve handle 510 is positioned so that the gate valves 502, 504 are open. Thereafter, the user may grasp the pump handle 508 to cause the pump 240 to discharge pressurized hydraulic fluid to the hydraulic cylinders 440. Given that the weight of the ground hook 210 is less than the entire restraint 100, the pressurized fluid acts to extend the hydraulic cylinder facing the least resistance, which in this case is the hydraulic cylinder 298 mounted to the ground hook 210 to be extended first and operates to raise the ground hook out of a corresponding recess 324 and discontinue engagement between the ground hook and the ground mount 120. After the hydraulic cylinder 298 is fully extended, corresponding to the ground hook 210 being fully raised, the resistance associated with the hydraulic cylinder 298 exceeds that of the hydraulic cylinder 440 of the king pin receiver 400. Consequently, further pumping of hydraulic fluid operates to extend the hydraulic cylinder 440 of the king pin receiver until reaching the fully extended position as shown in FIG. 18. At this point, the user of the restraint may reposition the valve handle 510 in order to close the gate valves 502, 504 in order to fix the extended positions of the hydraulic cylinders 298, 440 for transport.

After the gate valves 502, 504 have been closed, the user may reposition the two-way valve 500 to the first position and thereafter lower the engagement neck 220. In particular, after the two way valve 500 is repositioned to the first position, so that the discharge side of the pump 240 is in communication with the neck repositioning hydraulic cylinder 380, the user may grasp the pump handle 508 and cause the pump 240 to direct higher pressure hydraulic fluid to the neck repositioning hydraulic cylinder. As the higher pressure reaches the neck repositioning hydraulic cylinder 380, this fluid operates to cause the hydraulic cylinder to contract (i.e., shorten in overall length) and overcome the bias of the coil spring 378 so as to pivot the engagement neck 220 around a longitudinal axis extending through the shaft 280 toward the ground and out of engagement with the underside of the parked trailer 112. Upon reaching the desired position of the engagement neck 220, the user may grasp the handle 160 of the restraint 100 and pull the structure out from underneath the parked trailer. Upon removal of the restraint 100, the parked trailer 112 may be coupled to an over-the-road truck or hustler truck in order to remove the parked trailer from the loading dock 114.

While the foregoing restraint 100 incorporates a hydraulic cylinder 440 associated with the king pin receiver 400 to relieve a tension condition between the restraint and the ground mount 120 prior to disengaging the restraint from the ground mount, it is also within the scope of the disclosure to include additional or alternative structures and methods to relieve a tension condition.

Figure 20:
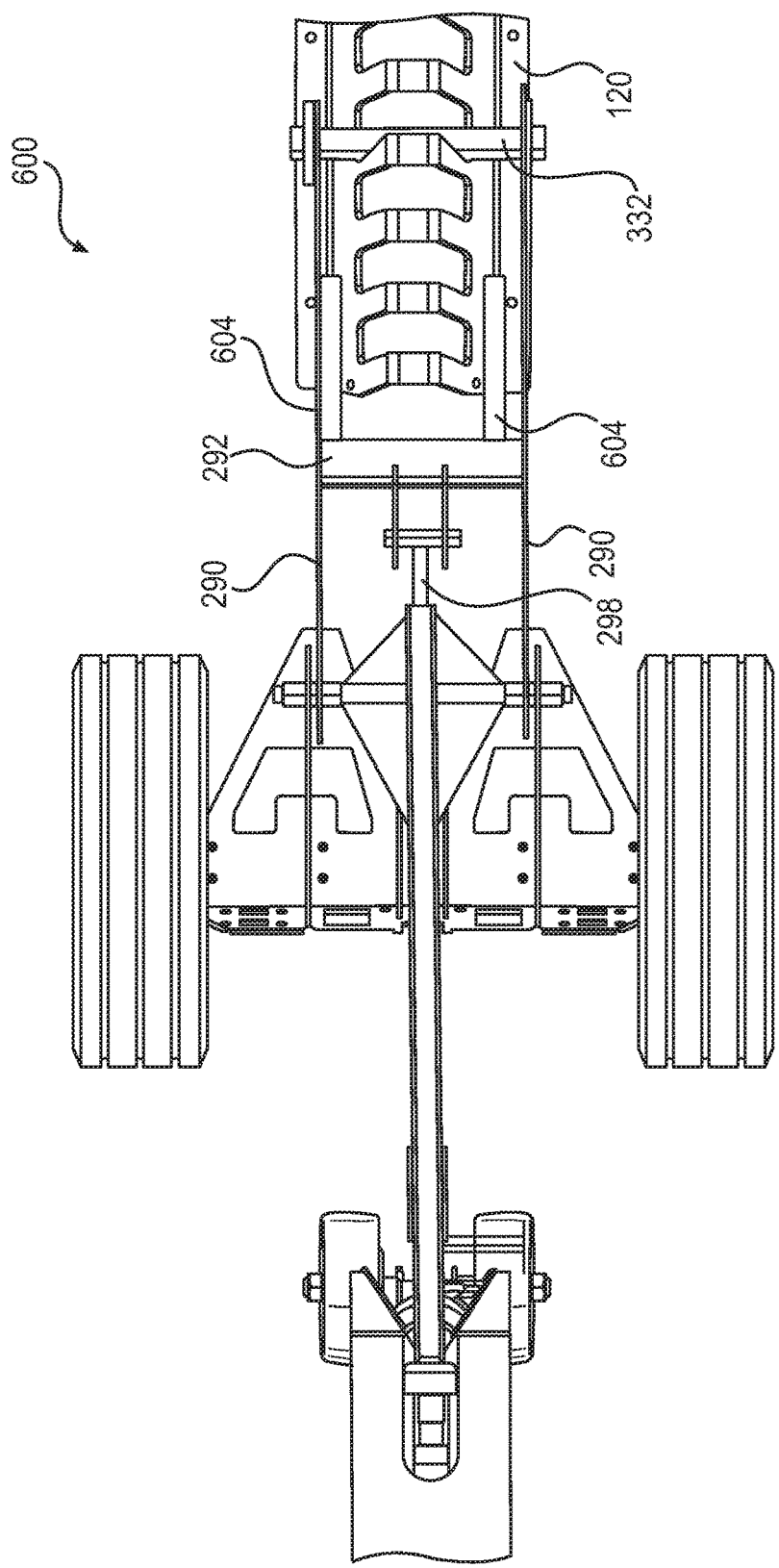
FIG. 20 is an overhead view of a segment of a second exemplary restraint positioned underneath the semi-trailer of FIG. 14 and engaging a first exemplary ground mount, where the ground hook incorporates elongated recesses and hydraulic cylinders mounted to the repositionable cylinder in order to provide for a tension position as well as actuating the hydraulic cylinders to relieve a tension position.
Figure 21:
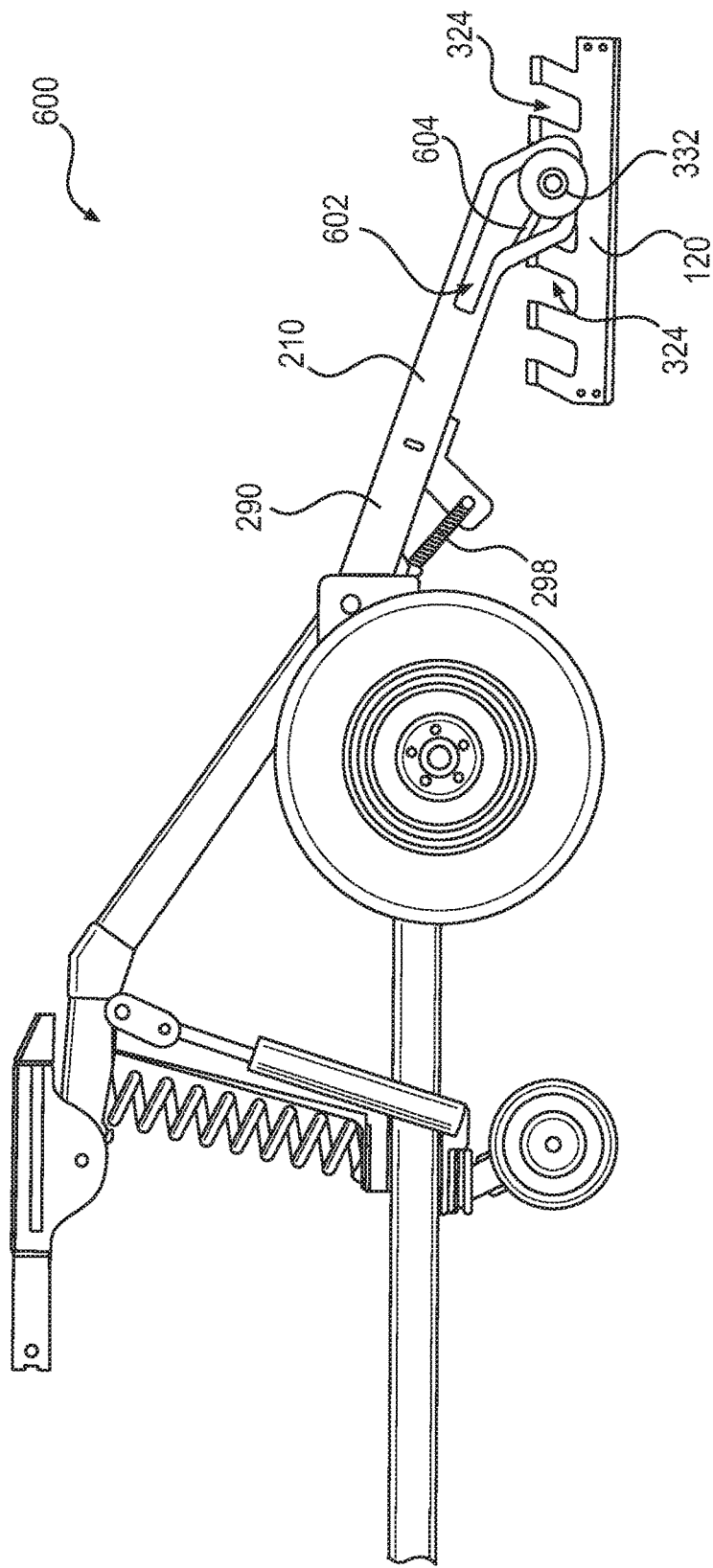
FIG. 21 is a profile view of a segment of the second exemplary restraint of FIG. 20, shown engaging the first exemplary ground mount, where the ground hook incorporates elongated recesses and hydraulic cylinders mounted to the repositionable cylinder in order to provide for a tension position as well as actuating the hydraulic cylinders to relieve a tension position.
Figure 22:
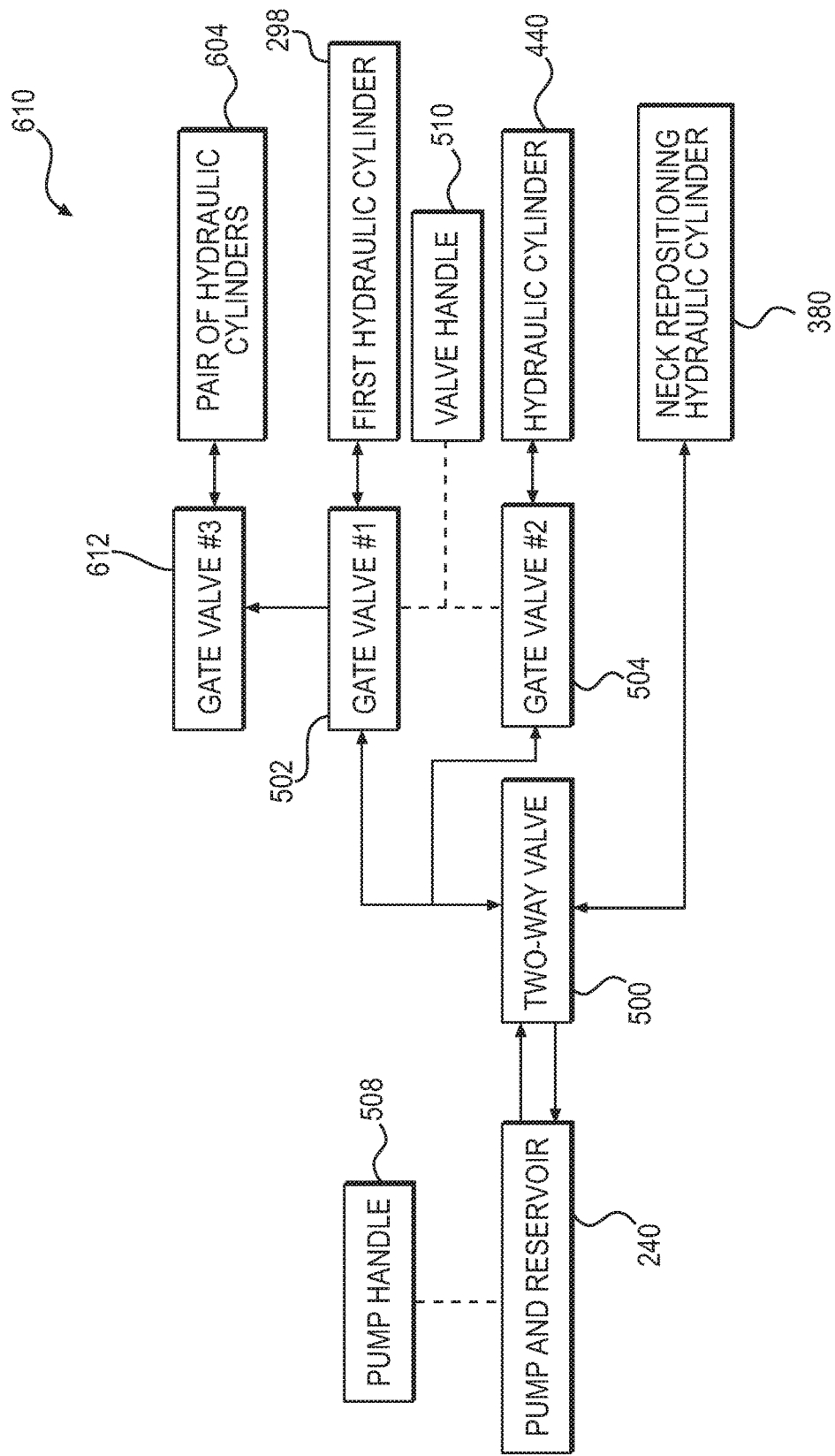
FIG. 22 is a second exemplary schematic diagram of the exemplary hydraulic system comprising part of the second exemplary restraint of FIG. 20.

For example, as shown in FIGS. 20-22, a first alternative exemplary restraint 600 includes the same components as the first exemplary restraint 100 unless otherwise noted. But what is different in this first alternate exemplary restraint is that the lateral rails 290 include an elongated and oversized opening 602 within which the cylindrical rod 332 is able to traverse more so in the proximal-to-distal direction. A pair of hydraulic cylinders 604 are concurrently mounted to the second of the cross-members 292 and to the cylindrical rod 332, where corresponding hydraulic lines (not shown) mounted to the cylinders 604 are in communication with the third gate valve 606 downstream from the first gate valve 502. In this manner, sending positive pressure to the cylinders 604 is operative to reposition the cylinders to take on an extended position and, in turn, reposition the cylindrical rod 332 distally (see FIG. 21) within the opening 602 so that the ground hook 210 can be raised out of engagement with the ground mount 120 as the hydraulic cylinder 298 is operative to raise the ground hook when concurrently pressurized. As a result, the vertical travel associated with the sled 450 of the first exemplary restraint 100, which is operative to change the available opening 414 size available to be occupied by the king pin 110 (see FIG. 15) in order to discontinue a tension position between the restraint 100, king pin 110, and ground mount 120, may be reallocated to the travel in the proximal-to-distal direction of the hydraulic cylinders 602 and the cylindrical rod 332 within the elongated opening 602. In this manner, repositioning the cylindrical rod 332 in the proximal-to-distal direction (via repositioning the hydraulic cylinders 604) may be operative to discontinue the tension position between the restraint 600, the trailer king pin 110, and the ground mount 120. A more detailed process for utilizing the first alternate exemplary restraint 600 and a first alternate exemplary hydraulic circuit 610 follows.

Referring now to FIGS. 1-21, an exemplary description of using the first alternate exemplary trailer restraint 600 will hereafter be described. As a prefatory matter, it will be presumed that prior to utilizing the exemplary trailer restraint 600, a number of events may have occurred that put the semi-trailer 112 in a ready position for stabilization. By way of example, these events may include having an over-the-road truck or hustler truck position the loaded/unloaded semi-trailer 112 where it will be loaded/unloaded (e.g., backed up against a mezzanine of a loading dock 114). Moreover, it is presumed that the over-the-road truck or hustler truck has been removed from engagement with the parked semi-trailer 112 and that the parked semi-trailer's landing gear 118 is deployed. Additionally, it is presumed that a forward portion underneath the nose of the parked semi-trailer 112 is accessible and that a ground mount 120 has been previously installed.

As an initial matter, a yard worker or other individual (i.e., a "user") may receive a message, signal, or other communication indicating that a parked trailer 112 is ready for restraint. Alternatively, the user may visually perceive that a parked trailer 112 is ready for restraint in a circumstance where no trailer restraint 600 is positioned under a forward portion of the parked trailer. Either way, the user deploys the exemplary trailer restraint 600 underneath the nose of the parked semi-trailer 112 so that the trailer restraint couples to the ground mount 120 and engages the trailer king pin 110 (see FIG. 14). In so doing, the exemplary trailer restraint 600 is operative to retard forward movement of the parked semi-trailer 112 away from the loading dock 114 by way of the king pin stop 230 pushing against the king pin 110, thereby causing a pulling force to be exerted by the ground hook 210 against the ground mount 120.

Initially, after determining the parked semi-trailer 112 is ready for restraint, the user locates an available exemplary trailer restraint 600 and determines whether the ground hook 210 is elevated and in condition for transport. If not, the user repositions the valve handle 510 to open the valves 502, 504 (while the third gate valve 612 is closed) and likewise repositions the two-way valve 500 to the second position to establish fluid communication between the discharge side of the pump and reservoir 240 and the inlet side of the valves 502, 504. Thereafter, the user operates the pump handle 508 associated with the fluid pump and reservoir 240 in order to pump hydraulic fluid from the reservoir to the first hydraulic cylinder 298, thereby causing the cylinder to extend (e.g., increase in overall length). More specifically, one end of the cylinder 298 is coupled to the pin 306 extending through the second parallel plate bracket 308 of the frame, while the other end of the cylinder 298 is mounted to the pin 296 of the first parallel plate bracket 294 of one the cross-members 292 of the ground hook 210. In this fashion, pumping fluid from the fluid pump and reservoir 240 lengthens the hydraulic cylinder 298, which operates to raise the ground hook 210 above the ground (i.e., namely raising the floating catch 330 with respect to the ground). Eventually, sufficient pumping and lengthening of the first hydraulic cylinder 298 raises the ground hook 210 sufficiently high enough off the ground for transportation. It should be noted that while the valves 502, 504 are open and receiving hydraulic fluid from the discharge of the reservoir 240, the hydraulic cylinder 440 associated with the king pin receiver 400 is extended to a maximum length prior to raising the ground hook 210 given that the weight of the tail hook provides greater resistance to travel. In other words, in order to raise the ground hook 210 off the ground, it may be necessary to first extend the hydraulic cylinder 440 associated with the king pin receiver 400 to its maximum length.

Presuming the ground hook 210 is sufficiently high enough off the ground for transportation, the user repositions the valve handle 510 to the first condition in order to close the valves 502, 504 to lock the position of the ground hook and repositions the two-way valve 500 to the first position in order to reposition the engagement neck 220 downward to clear the height of the underneath front lip of the semi-trailer 112. After repositioning the two-way valve 500 to the first position, the user may manipulate the pump handle 508 to pump fluid from the pump and reservoir 240, through the two-way valve 500, and on to the neck repositioning cylinder 380, thereby causing the neck repositioning cylinder to contract (i.e., shorten its length) and overcome the bias of the coil spring 374 in order to lower the height of the engagement neck prior to repositioning the trailer restraint 600 underneath a forward part of the parked semi-trailer 112.

Referring to FIGS. 1 and 15, after the ground hook 210 and engagement neck 220 are appropriately positioned, the user may grasp the handle bar 160 to reposition the exemplary trailer restraint 600 in proximity to the parked semi-trailer 112. It should be noted that elevation of the ground hook 210 results in the entire weight of the exemplary trailer restraint 600 being borne by the two wheel 130 and tire 140 combinations, as well as the caster 144. Upon reaching the parked semi-trailer 112 to be restrained, the user manipulates the handle bar 160 to push the exemplary trailer restraint 600 underneath the forward nose of the semi-trailer. More specifically, the user introduces the rear of the exemplary trailer restraint 600 underneath the nose of the semi-trailer first, typified by the ground hook 210 (continuing to be in an elevated position) extending under the nose of the semi-trailer first and generally in line with the position of a ground mount 120 (see FIG. 16).

While backing the exemplary trailer restraint 600 underneath the front of the parked semi-trailer 112, it is presumed that the engagement neck 220 is in a raised, floating position. In other words, it is presumed that the engagement neck 220 is floating while the exemplary trailer restraint 600 is pushed underneath the front of the parked trailer 112. In exemplary form, the floating engagement neck 220 causes the trapezoidal extension 484 of the king pin receiver 400 to contact the front of the parked trailer 112 and increase the load applied to the king pin receiver and engagement neck to overcome the bias of the coil spring 374 to vertically lower the king pin receiver underneath the forward portion of the parked trailer. As shown in FIG. 16, the bias of the coil spring 374 maintains contact between the top plate 412 of the king pin receiver 400 and the underside of the trailer king pin plate. It should be noted, however, that the engagement neck 220 may not be floating as a result of the neck repositioning hydraulic cylinder 380 being at least partially contracted so that the engagement neck 220 is in a lowered position to overcome the bias of the coil spring 374.

In either case, the exemplary trailer restraint 600 is repositioned underneath the front of the parked trailer 112 so that the elongated opening 414 of the engagement neck 220 is longitudinally aligned with the king pin 110. In a circumstance where the engagement neck 220 is lowered via the hydraulic cylinder 380 to clear the front of the parked trailer 112 and thereafter repositioned so that the engagement neck is underneath the forward nose of the parked semi-trailer, the engagement neck may be raised by the user manipulating the two-way valve 500. In particular, the two-way valve 500 may be repositioned from the first position to the second position in order to vent hydraulic pressure associated with the neck repositioning hydraulic cylinder 380 circuit to the pump and reservoir 240. By venting the neck repositioning hydraulic cylinder 380 circuit, the hydraulic cylinder 380 extends (i.e., increasing in length) and the bias of the coil spring 374 is dominant with respect to the hydraulic cylinder 380 in order to raise the vertical position of the engagement neck 220 until contacting the underside of the parked semi-trailer 112 or reaching a maximum vertical height. In this fashion, continued repositioning of the exemplary trailer restraint 600 rearward, ground hook 210 first, causes the king pin 110 of the parked semi-trailer to become seated within the elongated opening 414.

Just prior to, concurrent with, or following seating of the king pin 110 within the elongated opening 414, the user repositions the ground hook 210 to engage the ground mount 120. Specifically, the user repositions the gate valves 502, 504 to be open (while the third gate valve 612 remains closed and the pair of hydraulic cylinders 604 are contracted) via actuation of the valve handle 510 and repositions the two-way valve 500 to be in the first position. When the gate valves 502, 504 are open and vented to the reservoir 240, via the two-way valve 500 being in the first position, the weight of the ground hook 210 becomes the dominant force and causes pressurized fluid from the first hydraulic cylinder 298 to flow toward the reservoir 240 vent side, which corresponds with the first hydraulic cylinder retracting (i.e., decreasing in overall length) and the ground hook pivoting toward the ground.

As shown in FIG. 6, the pivoting action of the ground hook 210 ceases when the floating catch 330 comes to rest on top of the ground mount 120. By coming to rest, the cylindrical rod 332 of the floating catch 330 may rest within one of the recesses 324 or may rest on top of one of the raised ribs 326. If the cylindrical rod 332 comes to rest within one of the recesses 324, the restraint 600 need not be further positioned forward or rearward. In contrast, if the cylindrical rod 332 rests on top of one of the raised ribs 326, the restraint 600 is repositioned slightly forward or rearward in order to seat the rod within a corresponding recess 324. It should be noted that while the valves 502, 504 are open and the two-way valve 500 is in the first position, the hydraulic cylinder 440 may be slightly retracted (i.e., decreased in overall length) to accommodate the king pin 110 moving deeper into the elongated opening 414 of the engagement neck 220 (compare FIGS. 18 and 19) so that the ground hook 210 can be repositioned slightly rearward into the next corresponding recess 324 in instances where the floating catch 330 comes to rest on top of one of the raised ribs.

While the foregoing explanation has inherently presumed that the cylindrical rod 332 of the ground hook 210 is parallel with at least one of the recesses 324 when the restraint 600 is initially positioned underneath the forward portion of the parked trailer 112, it may be that the cylindrical rod is angled with respect to at least one of the recesses if the ground hook 210 is angularly offset from the midline of the parked trailer (i.e., the line running longitudinally along the parked trailer and through the king pin 110). In order to accommodate for this angular variance, and seat the cylindrical rod 332 within one of the recesses, the cylindrical rod has built in play with respect to the remainder of the ground hook 210 by way of the elongated openings 602 through the lateral rails 290. In particular, the elongated openings 602 may be multiples in width of the diameter of the cylindrical rod 332 to provide for vertical and proximal-to-distal motion between the cylindrical rod and the remainder of the ground hook 210. In this fashion, even if the lateral rails 290 of the ground hook 210 are not parallel to the lateral sides of the ground mount 120, the play between the lateral rails and the cylindrical rod 332 accommodates for a predetermined angular offset that allows for the cylindrical rod 332 to be angled other than perpendicularly with respect to the lateral rails 290 and be received within one of the corresponding recesses 324.

Turning back to FIGS. 9 and 14-18, after the ground hook 210 is received within one of the recesses of the ground mount 120, and the king pin 110 is at least partially received within the elongated opening 414, the user may reposition the valve handle 510 to maintain the respective positions of the hydraulic cylinders 298, 440. At this time, the restraint 600 occupies a restraining position (see, e.g., FIGS. 17 and 18) and the parked trailer may be loaded or unloaded.

In particular, the ground hook 210 is positioned in front of the parked trailer's landing gear 118 and retained in relative position via the ground mount 120 and the hydraulic cylinder 298 being locked in an extended position, the hydraulic cylinder 440 associated with the king pin receiver 400 locked in an extended position, and the pair of hydraulic cylinders 604 locked in a retracted position via the third gate valve 612 being closed. In exemplary form, the corresponding openings 324 of the ground mount 120 are vertically angled so that minimal movement of the parked trailer 112 forward (i.e., away from the loading dock 114) causes the cylindrical rod 332 deeper (i.e., closer to the ground) into its corresponding opening 324. Eventually, the cylindrical rod 332 occupies the deepest portion of a corresponding opening 324 so that as the parked trailer attempts to move forward, the restraint 600 precludes any additional forward motion of the parked trailer 112. In particular, as the parked trailer 112 attempts to move forward, the king pin 110 pushes against the sled 450 but, based upon the hydraulic cylinder 440 being locked in its extended position, the king pin is unable to move deeper into the elongated opening 414. Consequently, the force applied to the sled 450 via the king pin 110 attempts to move the entire restraint 600 forward. But this forward motion of the restraint 600 is inhibited once the cylindrical rod 332 occupies the deepest portion of a corresponding opening 324. In other words, any attempt by the parked trailer 112 to move forward is restrained by the restraint 600 given that the restraint is put in tension by a forward portion of the king pin 110 pushing on the sled 450, which is transferred into a pulling force via the ground hook 210 coupled to the ground mount 120. As will be discussed in more detail hereafter, if the restraint 600 occupies a tension position (e.g., king pin 110 against the sled 450 and cylindrical rod 332 in the deepest portion of a corresponding opening 324) post unloading/loading of the parked trailer 112, an accommodation must be made to discontinue this tension position before the restraint may be removed from underneath the parked trailer.

After the parked trailer 112 is loaded/unloaded, the restraint 600 should be removed to allow a yard truck or other truck to couple to and remove the parked trailer from the loading dock 114. Presuming the restraint is in a tension position, removal of the restraint may not be possible without discontinuing this tension position. Specifically, pivoting motion of the ground hook 210 upward and out of a corresponding recess 324 may be precluded by the vertical angle of the recess. In particular, the arcuate motion of the pivoting ground hook 210 may result in contact with one of the raised ribs 322 so that the ground hook cannot be disengaged from the ground mount 120 without first discontinuing the tension position.

In order to discontinue this tension position, an exemplary sequence involves the user of the exemplary restraint 600 repositioning the valve handle 510 to open the gate valves 502, 504 (as well as open the third gate valve 612) as well as ensure that the two-way valve 500 is in the second position so that the hydraulic cylinders 298, 440, 604 are in fluid communication with a discharge side of the pump 240. Thereafter, the user may grasp the pump handle 508 to cause the pump 240 to discharge pressurized hydraulic fluid to the hydraulic cylinders 298, 440, 604. Given that the weight of the cylindrical rod 332 is less than the weight of the ground hook 210, which is less than the weight of the entire restraint 600, the pressurized fluid acts to extend the hydraulic cylinders facing the least resistance first, which in this case is the pair of hydraulic cylinders 604 mounted to the cylindrical rod 332. Consequently, the pair of hydraulic cylinders 604 are extended so that the cylindrical rod 332 rides against the rearward raised rib 322 (partially defining the corresponding opening 324 that the cylindrical rod 332 previously occupied in a tension state) and partially up the incline of the raised rib until the cylinders 604 reach maximum extension. Thereafter, the pressurized hydraulic fluid is directed to the hydraulic cylinder 298, which is extended and causes the ground hook 210 to rise above the ground mount 120 and discontinue engagement between the ground hook and the ground mount 120. After the hydraulic cylinder 298 is fully extended, corresponding to the ground hook 210 being fully raised, the resistance associated with the hydraulic cylinder 298 exceeds that of the hydraulic cylinder 440 of the king pin receiver 400. Consequently, further pumping of hydraulic fluid operates to extend the hydraulic cylinder 440 of the king pin receiver until reaching the fully extended position as shown in FIG. 18. Though not necessary to extend the hydraulic cylinder, the user may nonetheless reposition the valve handle 510 in order to close the gate valves 502, 504 in order to fix the extended positions of the hydraulic cylinders 298, 440, 604 for transport.

After the gate valves 502, 504 have been closed, the user may reposition the two-way valve 500 to the first position and thereafter lower the engagement neck 220. In particular, after the two way valve 500 is repositioned to the first position, so that the discharge side of the pump 240 is in communication with the neck repositioning hydraulic cylinder 380, the user may grasp the pump handle 508 and cause the pump 240 to direct higher pressure hydraulic fluid to the neck repositioning hydraulic cylinder. As the higher pressure reaches the neck repositioning hydraulic cylinder 380, this fluid operates to cause the hydraulic cylinder to contract (i.e., shorten in overall length) and overcome the bias of the coil spring 378 so as to pivot the engagement neck 220 around a longitudinal axis extending through the shaft 280 toward the ground and out of engagement with the underside of the parked trailer 112. Upon reaching the desired position of the engagement neck 220, the user may grasp the handle 160 of the restraint 600 and pull the structure out from underneath the parked trailer. Upon removal of the restraint 600, the parked trailer 112 may be coupled to an over-the-road truck or hustler truck in order to remove the parked trailer from the loading dock 114.

While the foregoing restraint 600 incorporated a hydraulic cylinder 440 associated with the king pin receiver 400 and a pair of hydraulic cylinders 604 associated with the ground hook 210 in order to relieve a tension condition between the restraint and the ground mount 120 prior to disengaging the restraint from the ground mount, it is also within the scope of the disclosure to include additional or alternative structures and methods to relieve a tension condition.

Figure 23:
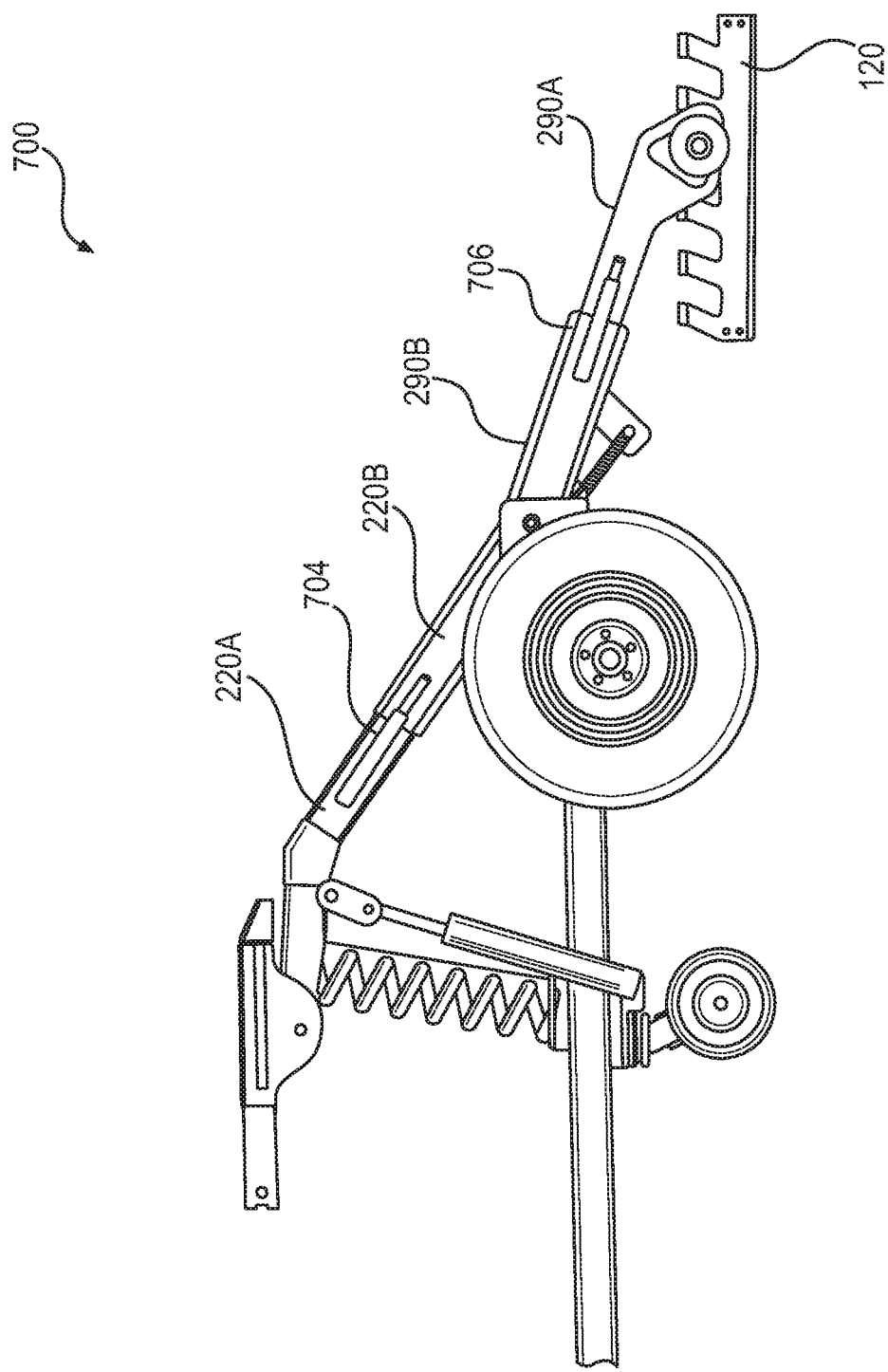
FIG. 23 is a profile view of a segment of a third exemplary restraint shown engaging the first exemplary ground mount, where the ground hook and engagement neck both incorporate hydraulic cylinders in order to provide for a tension position as well as actuating the hydraulic cylinders to relieve a tension position.
Figure 24:
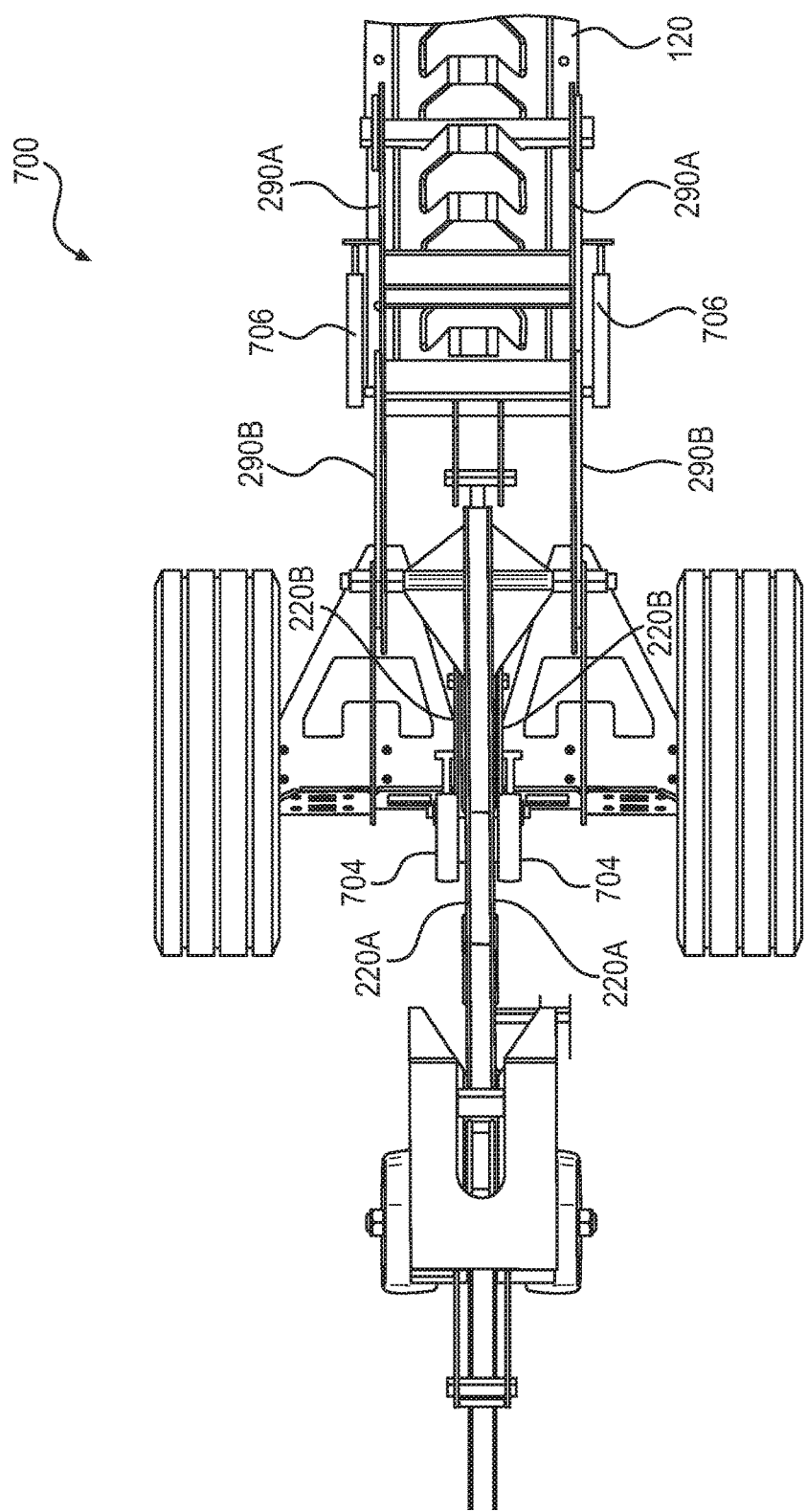
FIG. 24 is an overhead view of the segment of the third exemplary restraint engaging the first exemplary ground mount, where the ground hook and engagement neck incorporate hydraulic cylinders in order to provide for a tension position as well as actuating the hydraulic cylinders to relieve a tension position.
Figure 25:
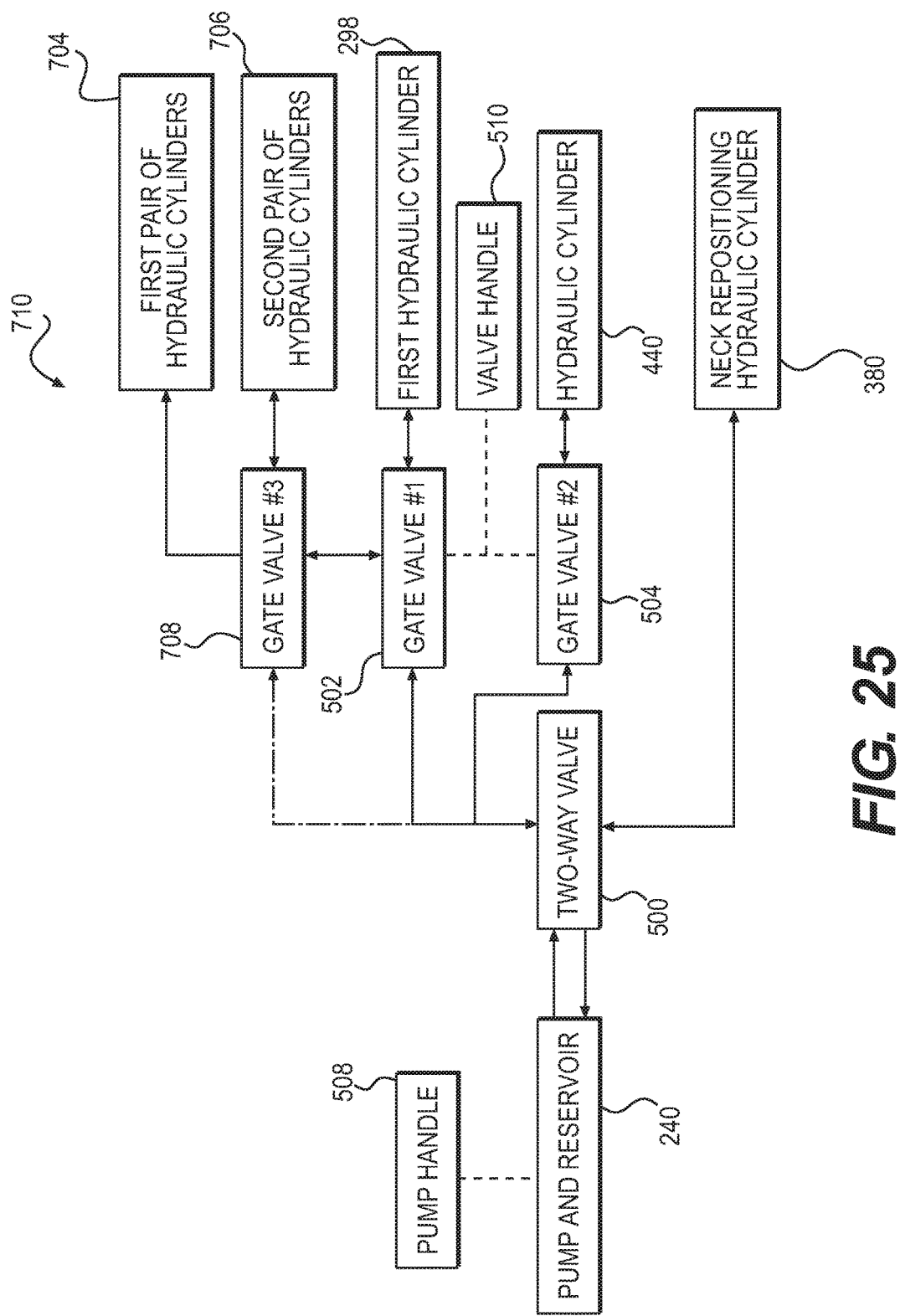
FIG. 25 is a third exemplary schematic diagram of the exemplary hydraulic system comprising part of the third exemplary restraint of FIG. 23.

For example, as shown in FIGS. 23-25, a second alternative exemplary restraint 700 includes the same components as the first exemplary restraint 100 unless otherwise noted. But what is different in this second alternate exemplary restraint is that the lateral rails 290 are telescopic, as is the engagement neck 220, in order to provide longitudinal adjustment between the king pin receiver 400 and the ground mount 120. A first pair of hydraulic cylinders 704 is concurrently mounted to opposing ends of the engagement neck 220A, 220B, whereas a second pair of hydraulic cylinders 706 are concurrently mounted opposing sections of the lateral rails 290A, 290B, with each cylinder including corresponding hydraulic lines (not shown) in communication with the third gate valve 708 downstream from the first gate valve 502 or the two-way valve 500. In this manner, sending positive pressure to the cylinders 704, 706 is operative to reposition the cylinders to take on an extended position and, in turn, reposition either or both the king pin receiver 400 proximally away from the king pin 100 and the cylindrical rod 332 distally so that the ground hook 210 can be raised out of engagement with the ground mount 120 as the hydraulic cylinder 298 is operative to raise the ground hook when concurrently pressurized. As a result, even if the vertical travel associated with the sled 450 fails or is not provided for to change the available opening 414 size occupied by the king pin 110 (see FIG. 15) in order to discontinue a tension position between the restraint 100, king pin 110, and ground mount 120, the second alternate exemplary restraint 700 may nonetheless discontinue the tension position by repositioning the hydraulic cylinders 704, 706. In this manner, repositioning the cylinders 704, 706 is operative to increase the spacing between the sled 450 and the ground mount 120 in the proximal-to-distal direction to discontinue the tension position between the restraint 700, the trailer king pin 110, and the ground mount 120. A more detailed process for utilizing the second exemplary restraint 700 and a second alternate exemplary hydraulic circuit 710 follows.

Referring now to FIGS. 1-19 and 23-25, an exemplary description of using the second alternate exemplary trailer restraint 700 will hereafter be described. As a prefatory matter, it will be presumed that prior to utilizing the exemplary trailer restraint 700, a number of events may have occurred that put the semi-trailer 112 in a ready position for stabilization. By way of example, these events may include having an over-the-road truck or hustler truck position the loaded/unloaded semi-trailer 112 where it will be loaded/unloaded (e.g., backed up against a mezzanine of a loading dock 114). Moreover, it is presumed that the over-the-road truck or hustler truck has been removed from engagement with the parked semi-trailer 112 and that the parked semi-trailer's landing gear 118 is deployed. Additionally, it is presumed that a forward portion underneath the nose of the parked semi-trailer 112 is accessible and that a ground mount 120 has been previously installed.

As an initial matter, a yard worker or other individual (i.e., a "user") may receive a message, signal, or other communication indicating that a parked trailer 112 is ready for restraint. Alternatively, the user may visually perceive that a parked trailer 112 is ready for restraint in a circumstance where no trailer restraint 700 is positioned under a forward portion of the parked trailer. Either way, the user deploys the exemplary trailer restraint 700 underneath the nose of the parked semi-trailer 112 so that the trailer restraint couples to the ground mount 120 and engages the trailer king pin 110 (see FIG. 14). In so doing, the exemplary trailer restraint 700 is operative to retard forward movement of the parked semi-trailer 112 away from the loading dock 114 by way of the king pin stop 230 pushing against the king pin 110, thereby causing a pulling force to be exerted by the ground hook 210 against the ground mount 120.

Initially, after determining the parked semi-trailer 112 is ready for restraint, the user locates an available exemplary trailer restraint 700 and determines whether the ground hook 210 is elevated and in condition for transport. If not, the user repositions the valve handle 510 to open the valves 502, 504 (while the third gate valve 708 is closed) and likewise repositions the two-way valve 500 to the second position to establish fluid communication between the discharge side of the pump and reservoir 240 and the inlet side of the valves 502, 504. Thereafter, the user operates the pump handle 508 associated with the fluid pump and reservoir 240 in order to pump hydraulic fluid from the reservoir to the first hydraulic cylinder 298, thereby causing the cylinder to extend (e.g., increase in overall length). More specifically, one end of the cylinder 298 is coupled to the pin 306 extending through the second parallel plate bracket 308 of the frame, while the other end of the cylinder 298 is mounted to the pin 296 of the first parallel plate bracket 294 of one the cross-members 292 of the ground hook 210. In this fashion, pumping fluid from the fluid pump and reservoir 240 lengthens the hydraulic cylinder 298, which operates to raise the ground hook 210 above the ground (i.e., namely raising the floating catch 330 with respect to the ground). Eventually, sufficient pumping and lengthening of the first hydraulic cylinder 298 raises the ground hook 210 sufficiently high enough off the ground for transportation. It should be noted that while the valves 502, 504 are open and receiving hydraulic fluid from the discharge of the reservoir 240, the hydraulic cylinder 440 associated with the king pin receiver 400 is extended to a maximum length prior to raising the ground hook 210 given that the weight of the tail hook provides greater resistance to travel. In other words, in order to raise the ground hook 210 off the ground, it may be necessary to first extend the hydraulic cylinder 440 associated with the king pin receiver 400 to its maximum length.

Presuming the ground hook 210 is sufficiently high enough off the ground for transportation, the user repositions the valve handle 510 to the first condition in order to close the valves 502, 504 to lock the position of the ground hook and repositions the two-way valve 500 to the first position in order to reposition the engagement neck 220 downward to clear the height of the underneath front lip of the semi-trailer 112. After repositioning the two-way valve 500 to the first position, the user may manipulate the pump handle 508 to pump fluid from the pump and reservoir 240, through the two-way valve 500, and on to the neck repositioning cylinder 380, thereby causing the neck repositioning cylinder to contract (i.e., shorten its length) and overcome the bias of the coil spring 374 in order to lower the height of the engagement neck prior to repositioning the trailer restraint 700 underneath a forward part of the parked semi-trailer 112.

Referring to FIGS. 1, 15, and 23-25, after the ground hook 210 and engagement neck 220 are appropriately positioned, the user may grasp the handle bar 160 to reposition the exemplary trailer restraint 700 in proximity to the parked semi-trailer 112. It should be noted that elevation of the ground hook 210 results in the entire weight of the exemplary trailer restraint 700 being borne by the two wheel 130 and tire 140 combinations, as well as the caster 144. Upon reaching the parked semi-trailer 112 to be restrained, the user manipulates the handle bar 160 to push the exemplary trailer restraint 700 underneath the forward nose of the semi-trailer. More specifically, the user introduces the rear of the exemplary trailer restraint 700 underneath the nose of the semi-trailer 112 first, typified by the ground hook 210 (continuing to be in an elevated position) extending under the nose of the semi-trailer first and generally in line with the position of a ground mount 120 (see FIG. 16).

While repositioning the exemplary trailer restraint 700 underneath the front of the parked semi-trailer 112, it is presumed that the engagement neck 220 is in a raised, floating position. In other words, it is presumed that the engagement neck 220 is floating while the exemplary trailer restraint 700 is pushed underneath the front of the parked trailer 112. In exemplary form, the floating engagement neck 220 causes the trapezoidal extension 484 of the king pin receiver 400 to contact the front of the parked trailer 112 and increase the load applied to the king pin receiver and engagement neck to overcome the bias of the coil spring 374 to vertically lower the king pin receiver underneath the forward portion of the parked trailer. As shown in FIG. 16, the bias of the coil spring 374 maintains contact between the top plate 412 of the king pin receiver 400 and the underside of the trailer king pin plate. It should be noted, however, that the engagement neck 220 may not be floating as a result of the neck repositioning hydraulic cylinder 380 being at least partially contracted so that the engagement neck 220 is in a lowered position to overcome the bias of the coil spring 374.

In either case, the exemplary trailer restraint 700 is repositioned underneath the front of the parked trailer 112 so that the elongated opening 414 of the engagement neck 220 is longitudinally aligned with the king pin 110. In a circumstance where the engagement neck 220 is lowered via the hydraulic cylinder 380 to clear the front of the parked trailer 112 and thereafter repositioned so that the engagement neck is underneath the forward nose of the parked semi-trailer, the engagement neck may be raised by the user manipulating the two-way valve 500. In particular, the two-way valve 500 may be repositioned from the first position to the second position in order to vent hydraulic pressure associated with the neck repositioning hydraulic cylinder 380 circuit to the pump and reservoir 240. By venting the neck repositioning hydraulic cylinder 380 circuit, the hydraulic cylinder 380 extends (i.e., increasing in length) and the bias of the coil spring 374 is dominant with respect to the hydraulic cylinder 380 in order to raise the vertical position of the engagement neck 220 until contacting the underside of the parked semi-trailer 112 or reaching a maximum vertical height. In this fashion, continued repositioning of the exemplary trailer restraint 700 rearward, ground hook 210 first, causes the king pin 110 of the parked semi-trailer to become seated within the elongated opening 414.

Just prior to, concurrent with, or following seating of the king pin 110 within the elongated opening 414, the user repositions the ground hook 210 to engage the ground mount 120. Specifically, the user repositions the gate valves 502, 504 to be open (while the third gate valve 708 remains closed) via actuation of the valve handle 510 and repositions the two-way valve 500 to be in the first position. When the gate valves 502, 504 are open and vented to the reservoir 240, via the two-way valve 500 being in the first position, the weight of the ground hook 210 becomes the dominant force and causes pressurized fluid from the first hydraulic cylinder 298 to flow toward the reservoir 240 vent side, which corresponds with the first hydraulic cylinder retracting (i.e., decreasing in overall length) and the ground hook pivoting toward the ground.

As shown in FIG. 6, the pivoting action of the ground hook 210 ceases when the floating catch 330 comes to rest on top of the ground mount 120. By coming to rest, the cylindrical rod 332 of the floating catch 330 may rest within one of the recesses 324 or may rest on top of one of the raised ribs 326. If the cylindrical rod 332 comes to rest within one of the recesses 324, the restraint 700 need not be further positioned forward or rearward. In contrast, if the cylindrical rod 332 rests on top of one of the raised ribs 326, the restraint 700 may be repositioned slightly forward or rearward in order to seat the rod within a corresponding recess 324. It should be noted that while the valves 502, 504 are open and the two-way valve 500 is in the first position, the hydraulic cylinder 440 may be slightly retracted (i.e., decreased in overall length) to accommodate the king pin 110 moving deeper into the elongated opening 414 of the engagement neck 220 (compare FIGS. 18 and 19) so that the ground hook 210 can be repositioned slightly rearward into the next corresponding recess 324 in instances where the floating catch 330 comes to rest on top of one of the raised ribs.

While the foregoing explanation has inherently presumed that the cylindrical rod 332 of the ground hook 210 is parallel with at least one of the recesses 324 when the restraint 700 is initially positioned underneath the forward portion of the parked trailer 112, it may be that the cylindrical rod is angled with respect to at least one of the recesses if the ground hook 210 is angularly offset from the midline of the parked trailer (i.e., the line running longitudinally along the parked trailer and through the king pin 110). In order to accommodate for this angular variance, and seat the cylindrical rod 332 within one of the recesses, the cylindrical rod has built in play with respect to the remainder of the ground hook 210 by way of the corresponding openings 340 through the lateral rails 290. In this fashion, even if the lateral rails 290 of the ground hook 210 are not parallel to the lateral sides of the ground mount 120, the play between the lateral rails and the cylindrical rod 332 accommodates for a predetermined angular offset that allows for the cylindrical rod 332 to be angled other than perpendicularly with respect to the lateral rails 290 and be received within one of the corresponding recesses 324.

Turning back to FIGS. 9, 14-18, and 23-25, after the ground hook 210 is received within one of the recesses of the ground mount 120, and the king pin 110 is at least partially received within the elongated opening 414, the user may reposition the valve handle 510 to close the gate valves 502, 504 and maintain the respective positions of the hydraulic cylinders 298, 440. Likewise, the third gate valve 708 being in a closed position maintains the respective lengths of the hydraulic cylinder pairs 704, 706 and correspondingly maintains the overall length of the engagement neck 220 and the lateral rails 290. At this time, the restraint 700 occupies a restraining position (see, e.g., FIGS. 17 and 18) and the parked trailer 112 may be loaded or unloaded.

In particular, the ground hook 210 is positioned in front of the parked trailer's landing gear 118 and retained in relative position via the ground mount 120 and the hydraulic cylinder 298 being locked in an extended position, the hydraulic cylinder 440 associated with the king pin receiver 400 locked in an extended position, and the two pairs of hydraulic cylinders 704, 706 are locked in position via the third gate valve 708 being closed. In exemplary form, the corresponding openings 324 of the ground mount 120 are vertically angled so that minimal movement of the parked trailer 112 forward (i.e., away from the loading dock 114) causes the cylindrical rod 332 deeper (i.e., closer to the ground) into its corresponding opening 324. Eventually, based upon minimal forward movement of the parked trailer 112, the cylindrical rod 332 may occupy the deepest portion of a corresponding opening 324 so that as the parked trailer attempts to move forward, the restraint 700 precludes any additional forward motion of the parked trailer 112. In particular, as the parked trailer 112 attempts to move forward, the king pin 110 pushes against the sled 450 but, based upon the hydraulic cylinder 440 being locked in position (i.e., in an extended position), the king pin is unable to move deeper into the elongated opening 414. Consequently, the force applied to the sled 450 via the king pin 110 attempts to move the entire restraint 700 forward. But this forward motion of the restraint 700 is inhibited once the cylindrical rod 332 occupies the deepest portion of a corresponding opening 324. In other words, any attempt by the parked trailer 112 to move forward is restrained by the restraint 700 given that the restraint is put in tension by a forward portion of the king pin 110 pushing on the sled 450, which is transferred into a pulling force via the ground hook 210 coupled to the ground mount 120. At this time, the parked trailer 112 may be loaded or unloaded. As will be discussed in more detail hereafter, if the restraint 700 occupies a tension position (e.g., king pin 110 against the sled 450 and cylindrical rod 332 in the deepest portion of a corresponding opening 324) post unloading/loading of the parked trailer 112, an accommodation must be made to discontinue this tension position before the restraint may be removed from underneath the parked trailer.

After the parked trailer 112 is loaded/unloaded, the restraint 700 should be removed to allow a yard truck or other truck to couple to and remove the parked trailer from the loading dock 114. Presuming the restraint 700 is in a tension position (i.e., forward motion of the restraint 700 is not possible because of the position of the ground hook 210, whereas rearward repositioning of the restraint is not possible because of the position of the sled 450 against the king pin 110), removal of the restraint may not be possible without discontinuing this tension position. Specifically, pivoting motion of the ground hook 210 upward and out of a corresponding recess 324 may be precluded by the vertical angle of the recess. In particular, the arcuate motion of the pivoting ground hook 210 may result in contact with one of the raised ribs 322 so that the ground hook cannot be disengaged from the ground mount 120 without first discontinuing the tension position in order to reposition the restraint 700 forward (away from the rear of the parked trailer) and remove the restraint from underneath the parked trailer 112.

In order to discontinue this tension position, an exemplary sequence involves the user of the exemplary restraint 700 repositioning the gate valves 502, 708 as well as ensuring that the two-way valve 500 is in the second position so that the hydraulic cylinders 298, 704, 706 are in fluid communication with a discharge side of the pump 240. Thereafter, the user may grasp the pump handle 508 to cause the pump 240 to discharge pressurized hydraulic fluid to the hydraulic cylinders 298, 704, 706. Given that the weight of the cylindrical rod 332 is less than the weight of the ground hook 210, which is less than the weight of the entire restraint 700, the pressurized fluid acts first to extend the hydraulic cylinders facing the least resistance first, which in this case is the pair of hydraulic cylinders 706 mounted to the rail segments 290A, 290B. Consequently, the pair of hydraulic cylinders 706 are extended so that the cylindrical rod 332 rides against the rearward raised rib 322 (partially defining the corresponding opening 324 that the cylindrical rod 332 previously occupied in a tension state) and partially up the incline of the raised rib until the cylinders 706 reach maximum extension. Thereafter or concurrent with the repositioning of the cylinders 706, pressurized hydraulic fluid is directed to the second pair of hydraulic cylinders 704 where the pressurized fluid acts to extend the hydraulic cylinders mounted to the engagement neck sections 220A, 220B. Extension of the second pair of hydraulic cylinders 704 is operative to push the king pin receiver 400 away from the king pin 110, thereby providing spacing between the sled 450 and the king pin. This spacing is sufficient to allow rearward motion (toward the rear of the parked trailer) of the restraint 700 so that if the maximum travel of the first pair of cylinders 706 is reached, but the ground hook 210 cannot be disengaged from the ground mount 120 (e.g., the arcuate motion of the pivoting ground hook 210 may result in contact with one of the raised ribs 322 that precludes further arcuate, upward motion of the ground hook with respect to the ground mount), the restraint may nonetheless be repositioned rearward to reposition the cylindrical rod 332 so the ground hook 210 can be disengaged from the ground mount 120. After repositioning the cylindrical 332 rod to clear the ground mount 120 and allow the ground hook 210 to be raised, further movement of the pump handle 508 causes the pump 240 to discharge pressurized hydraulic fluid to the hydraulic cylinder 298. This hydraulic fluid is operative to extend the hydraulic cylinder and pivot the ground hook 210 upward and out of engagement with the ground mount 120. Post upward pivoting of the ground hook 210, the user may reposition the valve handle 510 in order to close the gate valves 502, 504 and close the third gate valve 708 in order to fix the positions of the hydraulic cylinders 298, 440, 704, 706 for transport.

After the gate valves 502, 504, 708 have been closed, the user may reposition the two-way valve 500 to the first position and thereafter lower the engagement neck 220. In particular, after the two way valve 500 is repositioned to the first position, so that the discharge side of the pump 240 is in communication with the neck repositioning hydraulic cylinder 380, the user may grasp the pump handle 508 and cause the pump 240 to direct higher pressure hydraulic fluid to the neck repositioning hydraulic cylinder. As the higher pressure reaches the neck repositioning hydraulic cylinder 380, this fluid operates to cause the hydraulic cylinder to contract (i.e., shorten in overall length) and overcome the bias of the coil spring 378 so as to pivot the engagement neck 220 around a longitudinal axis extending through the shaft 280 toward the ground and out of engagement with the underside of the parked trailer 112. Upon reaching the desired position of the engagement neck 220, the user may grasp the handle 160 of the restraint 700 and pull the structure out from underneath the parked trailer. Upon removal of the restraint 700, the parked trailer 112 may be coupled to an over-the-road truck or hustler truck in order to remove the parked trailer from the loading dock 114.

While the foregoing restraint 700 incorporated a hydraulic cylinder 440 associated with the king pin receiver 400 that may be used in order to relieve a tension condition between the restraint and the ground mount 120 prior to disengaging the restraint from the ground mount, one need not reposition the hydraulic cylinder 440 to relieve a tension position if the either or both pairs of hydraulic cylinders 704, 706 are repositioned.

Referring to FIGS. 26-29, it is also within the scope of the disclosure to provide a modified ground mount 720, 730 that may be used in lieu of or in addition to the ground mount 120. More specifically, each modified ground mount 720, 730 includes a repositionable carriage 732 that slides along a track with respect to a chassis 734 firmly mounted to the ground.

The first alternate exemplary modified ground mount 720 includes a dual action hydraulic cylinder 736 concurrently mounted to the chassis 734 and the repositionable carriage 732. More specifically, the hydraulic cylinder 736 includes a hollow barrel 738 fixedly mounted to the chassis 734, as well as a piston and rod assembly 740 that is repositionably mounted to the hollow barrel. The piston and rod assembly 740 is mounted to the repositionable carriage 732 so that movement of the piston and rod assembly with respect to the barrel 738 results in corresponding movement of the carriage with respect to the chassis 734. In this alternate exemplary embodiment, the hydraulic cylinder 736 is in fluid communication with a pump (not shown) that may be actuated by a user repositioning a restraint 100, 600, 700 in order to change the position of a repositionable rib 744 with respect to a ground hook 210. A more detailed discussion of using the first alternate exemplary modified ground mount 720 will be discussed in more detail hereafter.

By way of discussion, when a user repositions a restraint 100, 600, 700 underneath a forward portion of a parked trailer 112, the first alternate exemplary modified ground mount 720 may be utilized in lieu of or in addition to the ground mount 120 previously discussed to secure the ground hook 210 to the ground. In exemplary form, the following explanation incorporates by reference the discussions of deploying and removing the exemplary restraints 100, 600, 700 from underneath a parked trailer 112 and replaces the ground mount 120 with the first alternate exemplary modified ground mount 720.

Referring to FIGS. 1, 6, 26 and 27, initially, prior to lowering the ground hook 210 to engage the ground mount 720, the user verifies that the carriage is in its forward most position (see FIG. 27). Thereafter, the ground hook 210 is lowered so that the cylindrical rod 332 is seated upon the chassis 734 between the repositionable rib 744 and a rear, fixed position rib 746. After the ground hook 210 is lowered, the user may direct hydraulic fluid to the dual action hydraulic cylinder 736 in order to increase the overall length of the cylinder and push the repositionable rib 744 against the cylindrical rod 322, thereby causing a tension position to exist between the king pin receiver 400, the trailer king pin 110, the ground hook 210, and the ground mount 720. In this manner, forward motion of the parked trailer 112 with respect to the restraint 100, 600, 700 and ground mount 720 is inhibited. Thereafter, presuming the king pin receiver 400 is properly positioned, the parked trailer 112 may be loaded or unloaded.

Post loading or unloading, the user may need to discontinue the tension position in order to remove the restraint 100, 600, 700 from underneath the parked trailer 112. In order to relieve the tension position, the user may simply direct hydraulic fluid to the dual action hydraulic cylinder 736 in order to decrease the overall length of the cylinder and push the repositionable rib 744 away from the cylindrical rod 322, thereby creating spacing between the repositionable rib and the cylindrical rod causing the tension position to be discontinued between the king pin receiver 400, the trailer king pin 110, the ground hook 210, and the ground mount 720.

Figure 28:
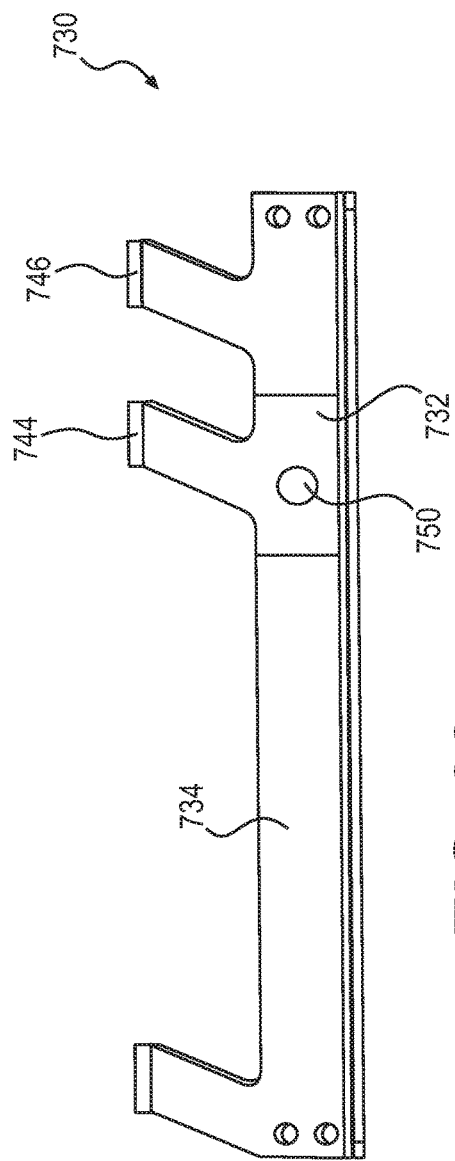
FIG. 28 is a profile view of a second alternate exemplary embodiment of a ground mount, shown with the repositionable carriage in the most rearward position.
Figure 29:
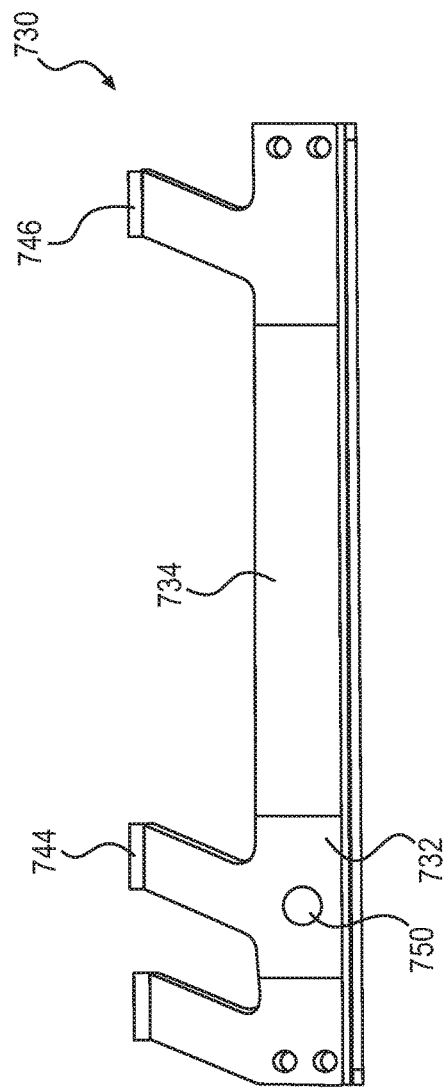
FIG. 29 is a profile view of the second alternate exemplary ground mount of FIG. 28, shown with the repositionable carriage in the most forward position.

Turning specifically to FIGS. 28 and 29, the second alternate exemplary modified ground mount 730 includes a ratchet bar 750 mounted to the repositionable carriage 732. More specifically, the ratchet bar 750 is pivotally mounted to the carriage 732 and operatively coupled to a spring loaded pawl (not shown) to selectively disengage the pawl (which is mounted to the carriage 732) from a one of a series of ratchet teeth (not shown) associated with the chassis 734. By disengaging the pawl from the ratchet teeth, the carriage 732 is able to be freely repositioned with respect to the chassis 734 along the length of the chassis track. Conversely, when the pawl is engaged with respect to the ratchet teeth, the carriage 732 is able to be freely repositioned with respect to the chassis 734 in a first direction, but inhibited from being repositioned with respect to the chassis in a second direction (opposite the first direction). A more detailed discussion of using the second alternate exemplary modified ground mount 730 will be discussed in more detail hereafter.

Referring to FIGS. 1, 6, 28 and 29, initially, prior to lowering the ground hook 210 to engage the ground mount 730, the user verifies that the carriage 732 is in its forward most position (see FIG. 29). Thereafter, the ground hook 210 is lowered so that the cylindrical rod 332 is seated upon the chassis 734 between the repositionable rib 744 and a rear, fixed position rib 746. After the ground hook 210 is lowered, the user may reposition the carriage 732 rearward, toward the fixed position rib 746, by pushing the ratchet bar 750 rearward so that the pawl contacts, but rides over a series of ratchet teeth, in order to seat the cylindrical rod 332 against the repositionable rib 744, thereby causing a tension position to exist between the king pin receiver 400, the trailer king pin 110, the ground hook 210, and the ground mount 730. In this manner, forward motion of the parked trailer 112 with respect to the restraint 100, 600, 700 and ground mount 730 is inhibited. Thereafter, presuming the king pin receiver 400 is properly positioned, the parked trailer 112 may be loaded or unloaded.

Post loading or unloading, the user may need to discontinue the tension position in order to remove the restraint 100, 600, 700 from underneath the parked trailer 112. In order to relieve the tension position, the user may reposition the ratchet bar 750 in order to discontinue engagement between the pawl and the ratchet teeth so as to allow the carriage 732 forward, away from the fixed position rib 746, by pushing the ratchet bar 750 forward so that the pawl no longer contacts any of the series of ratchet teeth, until reaching the intended, ultimate forward position of the carriage when the ratchet bar is no longer moved forward, thereby allowing the pawl to engage one of the series of ratchet teeth seat (see FIG. 29). By moving the carriage 732 forward, spacing between the repositionable rib 744 away and the cylindrical rod 322 is created, thereby discontinuing the tension position between the king pin receiver 400, the trailer king pin 110, the ground hook 210, and the ground mount 730.

Referring to FIGS. 30-38, an exemplary stabilizing device 800 may be used to stabilize and leveling a parked semi-trailer. In exemplary form, it is envisioned that the stabilizing device 800 is repositioned underneath a parked semi-trailer to provide stabilization and possibly ground retention to the forward portion of the semi-trailer in the absence of a tractor, hustler truck, or other removable vehicle, whether or not the semi-trailer's landing gear are deployed or not. More specifically, as will be discussed in further detail hereafter, the stabilizing device 800 may be deployed without having to reposition the landing gear of the semi-trailer. Nevertheless, the stabilizing device 800 may be specifically utilized in circumstances where the landing gear of the semi-trailer needs to be repositioned but is unable to be repositioned until the forward weight of the semi-trailer is at least partially taken off of the landing gear.

The exemplary stabilizing device 800 includes a frame 802 mounted to a torsion axle assembly 804 having mounted thereto at opposing ends a respective wheel assembly 806. By way of example, the torsion axle assembly 804 may be a Torflex axle 808, a pair of torsion arms 810, and corresponding spindle pairs 812 commercially available from Dexter Axle Company (2900 Industrial Parkway East, Elkhart, Ind. 86516). The spindles 812 may or may not be removable from a respective torsion arm 810. In exemplary fashion, the wheel assembly 806 includes a wheel hub 814, a wheel 816, and a tire 818. It should be noted that various numbered hub bolt patterns may be utilized such as, without limitation, four, six, eight, and greater number of bolts to mount the wheel hub 814 a corresponding wheel 816. The torsion axle assembly 804, by way of the wheel assemblies 806, bears the majority of the weight of the stabilizing device 800 when repositioned. But a portion of the weight of the stabilizing device is borne by a repositioning assembly 824 mounted to the axle assembly 804 and the frame 802 when the stabilizing device is free standing as shown in FIG. 1.

In exemplary form, the repositioning assembly 824 includes a T-shaped handle 826 mounted to a steering shaft 828 that is operatively coupled to a pair of metal hub wheels 830. More specifically, an axle 834 is mounted transversely to the sheering shaft 828 by extending through the hollow cylindrical steering shaft 828 by way of a pair of longitudinally aligned holes. The exterior tube of the axle 834 is, in exemplary form, welded to the steering shaft 828, while an internal bold is rotationally repositionable with respect to the exterior tube and is mounted to the metal hub wheels 830 to allow free rotation of the wheels. Those skilled the art will understand that whenever exemplary fasteners or fastening techniques are disclosed as part of the exemplary stabilizing device 800, any and all variants of the disclosed fasteners and fastening techniques shall comprise a part of the instant disclosure. For example, welding may be interchanged with adhesives and vice versa.

Rotation of the T-shaped handle 826 is operative to cause pivoting of the metal hub wheels 830 about the longitudinal axis of the steering shaft 828. In exemplary form, the T-shaped handle 826 includes a hollow cylindrical tube 838 that is transversely mounted to a rectangular down tube 840 by extending through the hollow rectangular down tube 840 by way of a pair of longitudinally aligned holes. The cylindrical tube 838 is welded to the down tube 840 so that roughly equal lengths of the cylindrical tube 838 extend on opposite sides of the down tube 840. Though not shown, the terminal ends of the cylindrical tube 838 may include hand grips (rubber, plastic, etc.) to facilitate grasping of the cylindrical tube and repositioning of the T-shaped handle 826 by a dock worker or other user. In order to convert motion of the cylindrical tube 838 and down tube 840 into pivoting motion of the metal hub wheels 830, a distal end of the down tube is welded to a cylindrical collar 844, which is mounted to the steering shaft 828 that includes a top cap 848 to inhibit objects from becoming lodged within the steering shaft. By way of example, the cylindrical collar 844 includes two pairs of through holes 842 that are configured to receive a respective bolt that concurrently extends through corresponding through holes 846 of the steering shaft 828. In this manner, if damage occurs to the T-shaped handle 826, the damaged T-shaped handle can be easily removed from the steering shaft 828 and fixed or replaced. Alternatively, the cylindrical collar 844 may be welded to the steering shaft 828. In either instance, rotation of the T-shaped handle 826 results in rotation of the steering shaft 828. But there are limits on the amount of rotation possible between the T-shaped handle 826 and the steering shaft 828.

In this exemplary embodiment, the steering shaft 828 is partially housed within a cylindrical casing 850. A steering stop 854 is mounted at the base of the cylindrical casing 850 and interfaces with the steering shaft 828 to limit the rotational travel of the steering shaft. A distal end of the steering shaft 828 includes a pair of through openings 856 sized to receive an axle shaft 858, which is mounted to the pair of metal hub wheels 830. In this fashion, the pair of metal hub wheels 830 are rotationally repositionable with respect to the axle shaft 858, and repositioning of the T-shaped handle 826 (within its rotational constraints) is transformed into rotational repositioning of the pair of metal hub wheels via the steering shaft 828 and axle shaft 858. A pair of parallel plates 860 is mounted to the cylindrical casing 850 and to a draw tube 864 in order to inhibit rotational repositioning of the cylindrical casing 850 as the steering shaft 828 is rotated therein. In this exemplary embodiment, the parallel plates 860 are mirror images of one another and are welded to opposing exterior edges of the cylindrical casing 850 along a longitudinal edge of each plate.

Each plate 860 includes three through openings so that the plates cooperate to include three pairs of openings that are aligned with one another. A first of the three openings 868 is configured to receive a bolt (not shown) that concurrently extends through a cylindrical sleeve 870 of a brake lever 872. In this exemplary embodiment, the brake lever 872 comprises three sections of hollow metal tubing 874 angled approximately 135 degrees with respect to the nearest section, with a proximal tubing section having mounted transversely thereto a tube segment 878 that operates as a handle. In this fashion, movement of the handle 878 forward and rearward is operative to cause the sleeve 870 to rotate about the bolt and correspondingly pivot a tension arm 880 radially mounted to the exterior of the sleeve. The tension arm is coupled to a wire or cable 884 that is concurrently coupled to a brake assembly 890 (see FIG. 30) in order to selectively apply a retarding or stopping force to the wheel assemblies 806. A brake lock 892, comprising a L-shaped bracket, is mounted to an interior side of the plate 860 to which the sleeve 870 is adjacent, and includes a semi-circular cut-out 893 into which the brake lever 872 may be received. When received within this semi-circular cut-out, the brake lever 872 is operative to tension the cable 884 and cause the brake assembly 890 to apply a retarding or stopping force to the wheel assemblies 806. In contrast, repositioning the brake lever 872 forward so its range of motion is unencumbered by the brake lock 892 (toward the jacks 960) is operative to lessen or outright release the retarding or stopping force to the wheel assemblies 806.

The draw tube 864 is concurrently mounted to the repositioning assembly 824 and a dampening assembly 900. In exemplary form, corresponding openings 894 extending through each of the plates 860 are configured to align with corresponding openings 896 of the draw tube 864 in order to receive nut and bolt fasteners (not shown) in order to removably mount the repositioning assembly 824 to a proximal end of the draw tube. In this exemplary embodiment, the draw tube 864 comprises a hollow rectangular tube to which the dampening assembly 900 is mounted proximate a distal end.

The dampening assembly 900 is repositionably mounted to the torsion axle assembly 804 in order to allow the repositioning assembly 824 to pivot with respect to the torsion axle assembly. A pair of upright mounting plates 902, which are identical in shape and shape each include a rectangular cut-out that is configured to receive the torsion axle 808, are mounted to the torsion axle and to the draw tube 864. Specifically, a pair of flat plates 906, having identical size and shape, are mounted to opposing side surfaces of the draw tube 864 and are pivotally mounted to the mounting plates 902. Each plate 906 includes a through hole 908 that is sized to receive a nut and bolt fastener (not shown) that is concurrently received through holes 910 in each upright plate 902. In this exemplary embodiment, the nut and bolt fastener is not tightened to the extent that it would preclude rotation of the plates 906 around the bolt fastener. Accordingly, the plates 906, which are coupled to the draw tube 864, are rotationally repositionable about the bolt with respect to the upright plates 902 (and torsion axle 808). In order to regulate the pivotal motion between the draw tube 864 and the upright plates 902, the dampening assembly includes a pair of coil-over shocks 910 biased toward and extended position (see FIG. 30).

In this exemplary embodiment, each shock 910 includes an upper and lower spring stops 912 that are interposed by a coil spring 914. In this exemplary embodiment, the coil spring in its fully extended position has a 100 pounds spring compression. Each upper and lower spring stop 912 is integrally formed with a knuckle connector that includes a through hole 913 configured to receive a nut and bolt fastener. A distal knuckle associated with each shock 910 is mounted to a respective upright plate 902 using the nut and bolt fasteners that concurrently extend through a counterpart hole 918. a proximal knuckle associated with each shock 910 is mounted to a respective tab 920 extending perpendicularly from a mounting plate 922 using nut and bolt fasteners that concurrently extend through a respective hole 924 of each tab. More specifically the tabs 920 are mounted to proximate terminal ends of the mounting plate 92 and extend generally parallel to respective side walls of the draw tube 864, but outset therefrom. The mounting plate 922 sits flush on top of the draw tube 864 and is mounted thereto so that the lengthwise, dominant edges of the plate are perpendicular to a dominant longitudinal axis of the draw tube.

A piece of angle iron 930 is mounted to a side surface of one of the upright plates 902 in order to complete a perimeter that captures the torsion axle 808. A proximal end of the angle iron 930 includes a pair of holes 932 that are configured to receive nut and bolt fasteners in order to mount the angle iron to a first brake axle guide 936. The first brake axle guide 936 includes corresponding slots 938 that are configured to receive nut and bolt fasteners, as well as a enlarged opening extending therethrough that is sized to receive the brake axle 940 of the brake assembly 890. Second and third brake axle guides 936', 936", which are copies of the first brake axle guide 936, correspondingly receive the brake axle 940. However, the second and third brake axle guides 936', 936" are mounted to the frame assembly 802. In this exemplary embodiment, the brake axle 940 extends outward past the second and third brake axle guides 936', 936" and has mounted to respective ends of the brake axle mirror image brake shoes 942, 944 that each include a cup 946 formed on a surface facing the tread portion of a respective tire 818. Mounted to the cup 946 is a replaceable brake pad that is configured to contact the tread portion of a respective tire 818 when the brake axle 940 is sufficiently rotated.

In order to cause rotation of the brake axle 940 to selectively engage the brake pads 948 and the tire 818 treads, the brake assembly 890 includes a lever arm 952 that is rigidly mounted to the brake axle. The lever arm 952 is operatively coupled to the tension arm 880 via a wire or cable 884. Consequently, movement of the handle 878 of the brake lever 872 causes rotation of the cylindrical sleeve 870 and corresponding motion of the tension arm 880. Movement of the tension arm 880 may be transferred to the lever arm 952 presuming the wire or cable 884 is not slack.

Figure 30:
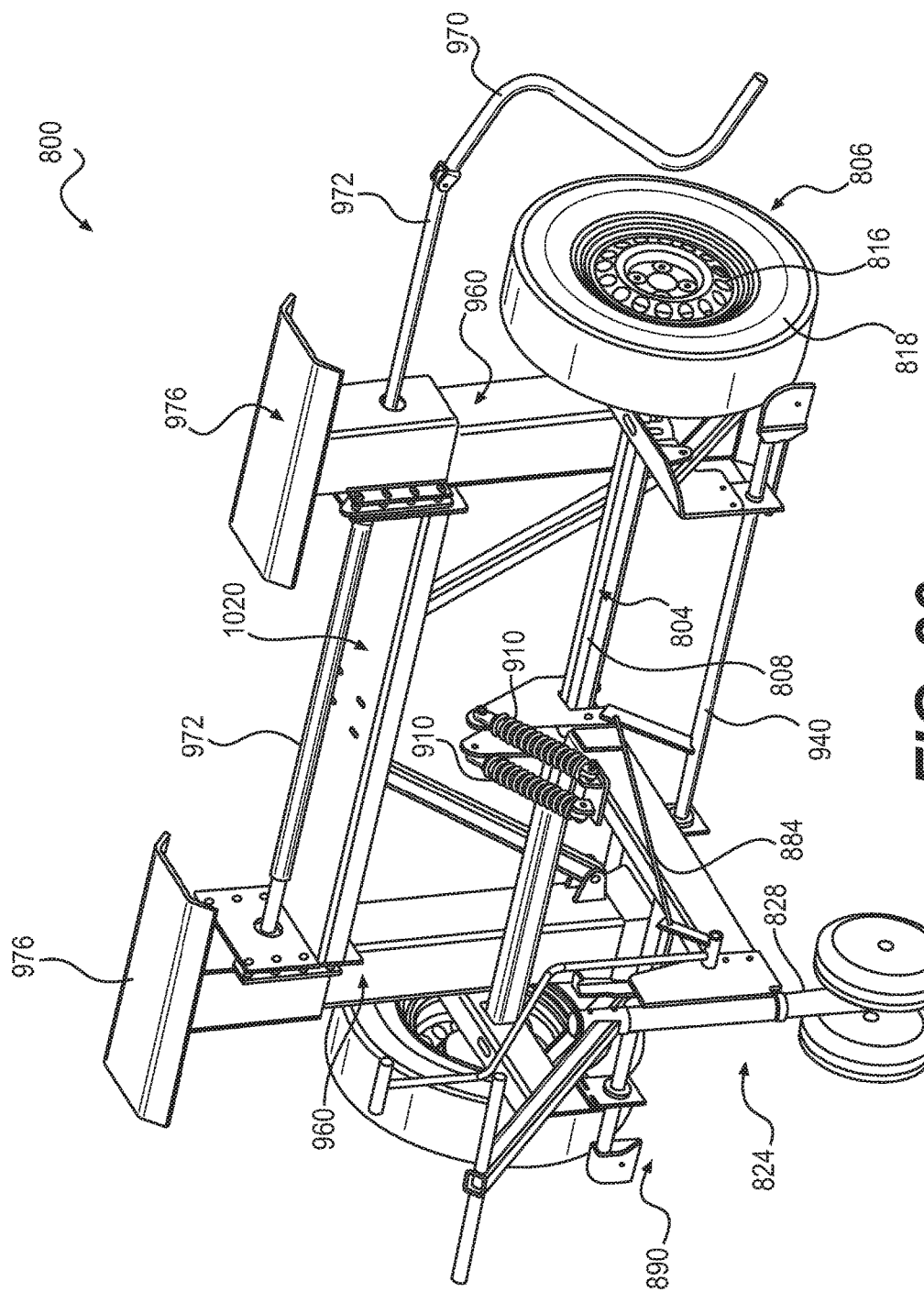
FIG. 30 is an elevated perspective view of a first exemplary stabilizer embodiment in accordance with the present disclosure.
Figure 31:
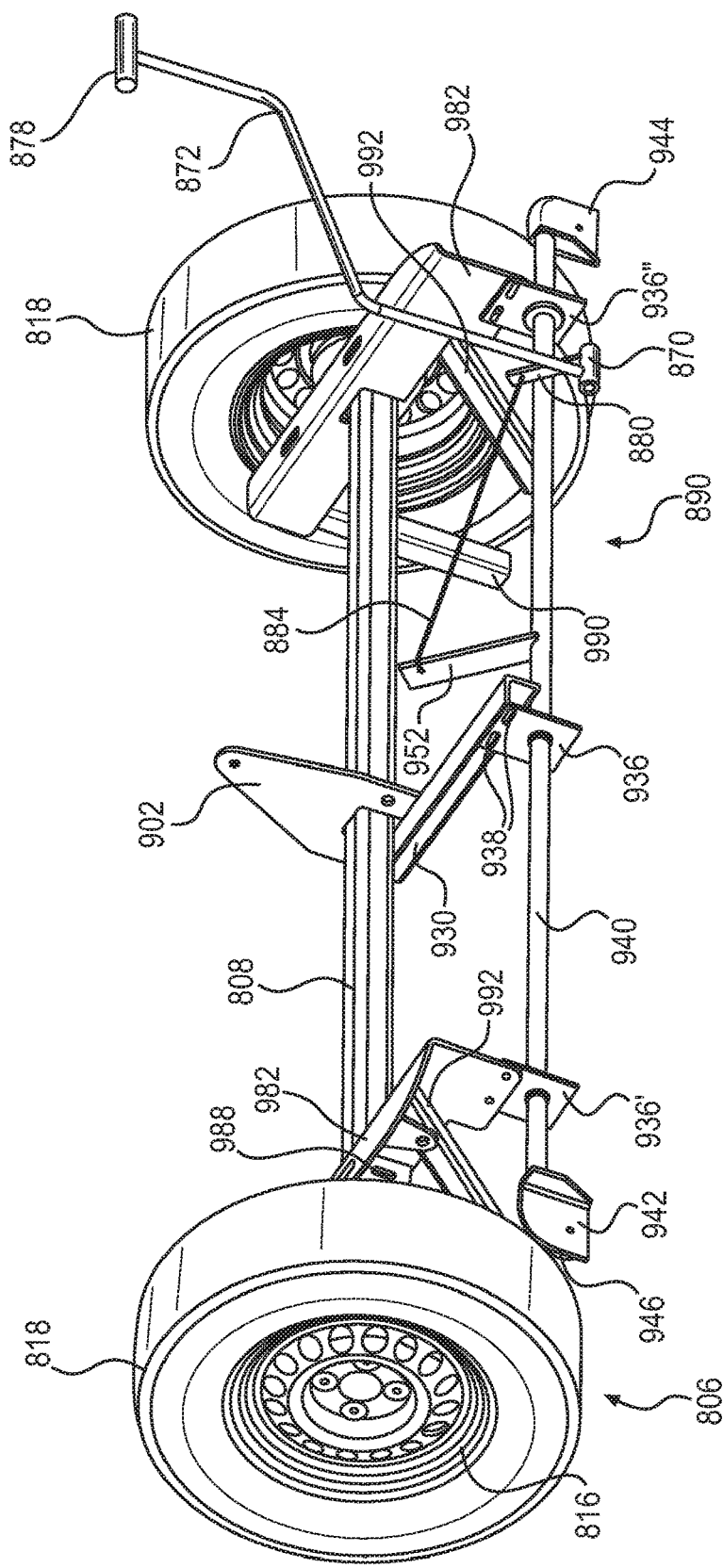
FIG. 31 is an elevated perspective view of the torsion axle assembly, the wheel assembly, and the brake assembly of the first exemplary stabilizer embodiment of FIG. 30.
Figure 32:
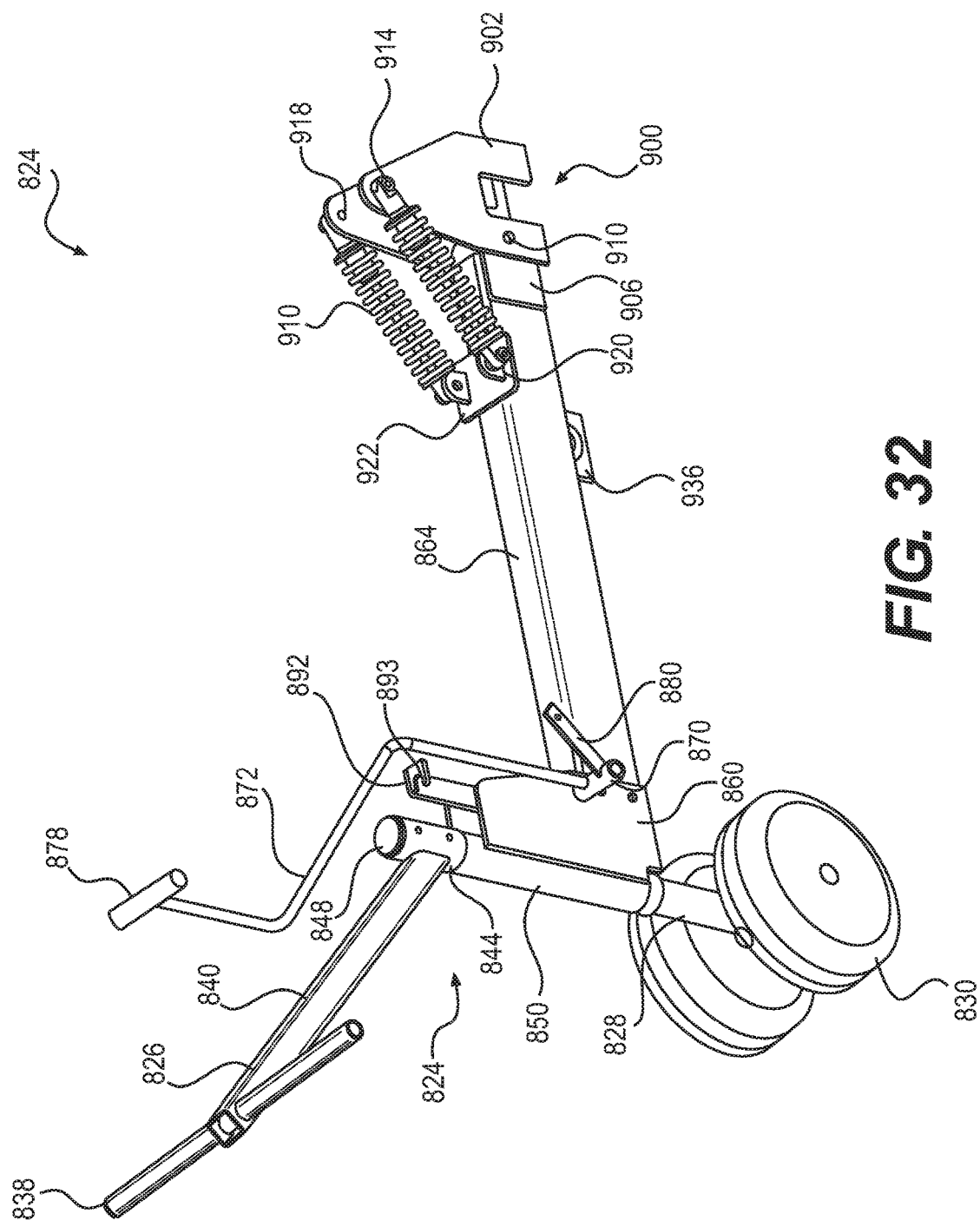
FIG. 32 is an elevated perspective view of the repositioning assembly, the dampening assembly, and a portion of the brake assembly of the first exemplary stabilizer embodiment of FIG. 30.
Figure 33:
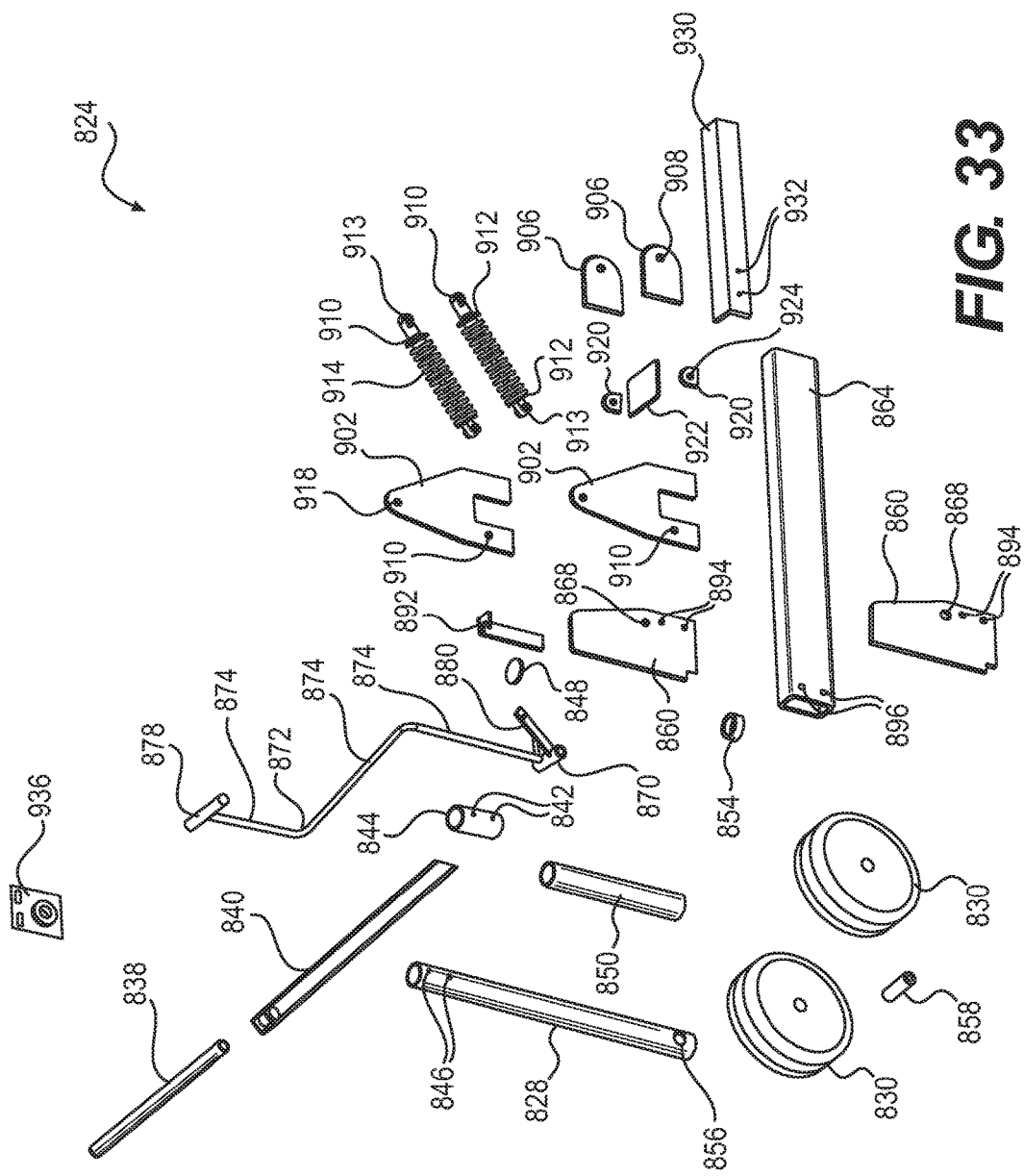
FIG. 33 is an exploded view of assembled components of FIG. 32.

FIG. 30 reflects the default position of the brake assembly 890 when no brake is applied to either tire 818. In this position, movement of the handle 878 toward the torsion axle 808 would cause the wire or cable 884 to go slack so that movement of the tension arm 880 (from counterclockwise rotation of the cylindrical sleeve 870) would not cause any resulting motion of the lever arm 952. Conversely, movement of the handle 878 away from the torsion axle 808 results in the wire or cable 884 being in tension so that movement of the tension arm 880 (from clockwise rotation of the cylindrical sleeve 870) causes resulting motion of the lever arm 952, thereby rotating the brake axle 940 clockwise to rotate the brake shoes 942, 944 and force the brake pads 948 against the tire 818 treads. At the point where the brake pads 948 are forced against the tire 818 treads, further movement of the handle 878 away from the torsion axle 808 results in increasing force applied by the brake pads 948 against the tire 818 treads. In other words, the stopping power applied by the brake pads 948 against the tire 818 treads may be changed depending upon the input force applied by an operator of the brake lever 872.

Figure 34:
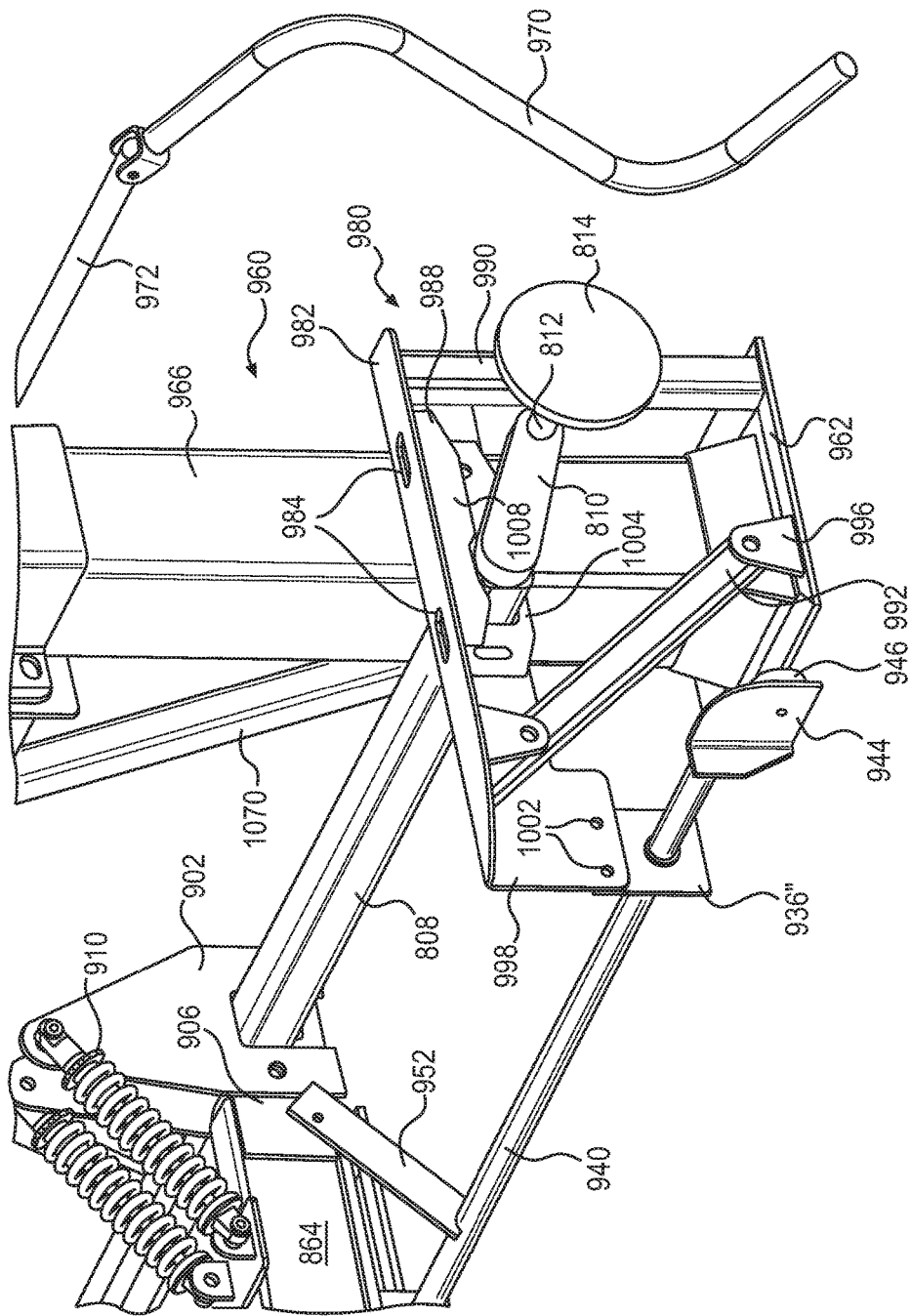
FIG. 34 is a magnified view of an exemplary jack assembly in the context of the brake assembly and the axle assembly.
Figure 35:
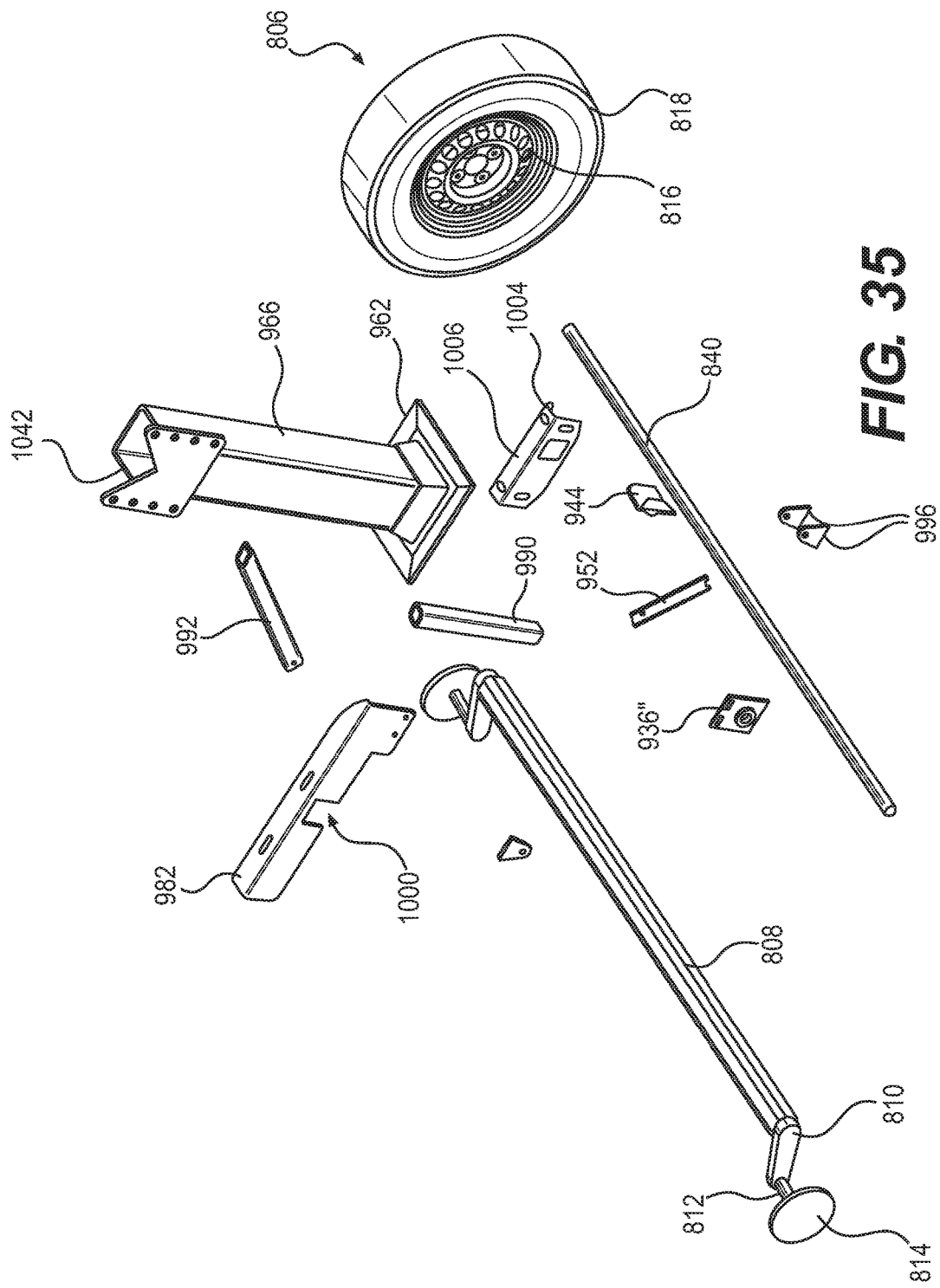
FIG. 35 is an exploded view of certain components depicted in FIG. 34.

Referring to FIG. 34, the exemplary frame 802 is operative to connect the torsion axle 808 to a pair of repositionable jacks 960, as well as connect the repositionable jacks to one another, so that the axle assembly 804 and wheel assemblies 806 cooperate to support a majority of the weight of the stabilizing device 800 during transportation thereof. In exemplary form, each repositionable jack 960 comprises a screw jack and includes a rectangular ground boot 962 that is mounted to a distal end of a first telescopic tube (not shown) that is inset with respect to a second telescopic tube 966. Rotation of a crank handle 970, which is rotationally coupled to a jack drive shaft 972, is operative to cause repositioning of the first telescopic tube with respect to the second telescopic tube 966. More specifically, the jack drive shaft 972 includes a pair of gears (not shown), with a respective gear housed within a respective extension pad 976, that engages with a screw (not shown) concurrently mounted to the first and second telescopic tubes 966. In this fashion, rotation of the jack drive shaft 972 is transformed into rotational motion of the screw, which is in turn transformed into longitudinal motion of the second telescopic tube 966 with respect to the first telescopic tube.

In exemplary form, each ground boot 962 is mounted to an axle chassis 980, which comprises part of the frame 802. By way of example, each axle chassis 980 includes an angle iron backbone 982 having a top flange with a pair of elongated through holes 984 that are configured to align with corresponding through holes 986 of an axle support 988. A pair of down tubes 990, 992, comprising rectangular tubular steel, is concurrently mounted to the underside of the top flange and a top surface of the rectangular ground boot 962 proximate the two outermost corners. Specifically, a first of the down tubes 990 is oriented generally perpendicular to the underside of the top flange 982 and the top surface of the ground boot 962, whereas a second of the down tubes 992 is angled at approximately sixty-five degrees with respect to the underside of the top flange and the top surface of the ground boot. The down tubes 990, 992 may be secured directly to the top flange 982 and the top surface of the ground boot 962 such as by welding, and/or may be secured to the top flange and ground boot using rounded gusset brackets 996. When using the rounded gusset brackets 996, the down tubes 990, 992 may be welded to the gusset brackets or may be fastened thereto using nut and bolt fasteners, presuming the presence of complementary holes through the down tube and applicable gusset bracket.

The angle iron backbone 982 also includes a vertical flange 998 to which the down tubes 990, 992 may be secured. In exemplary form, the down tubes 990, 992 are welded to the vertical flange 998. The vertical flange 998 includes a rectangular cut-out 1000 sized to accommodate insertion of the torsion axle 808. In addition, an elongated portion of the flange 998 includes a pair of holes 1002 that are configured to align with the corresponding slots 938 of respective brake axle guides 936', 936". In this fashion, conventional nut and bolt fasteners are received through the holes 1002 and slots 938 in order to mount a respective brake axle guide 936', 936" to a respective vertical flange 998.

Interposing the down tubes 990, 992, the axle support 988 is mounted to the angle iron backbone 982 in exemplary form by welding the axle support to both the top and vertical flanges 982, 998. More specifically, the axle support 988 comprises a C-shaped bracket with a vertical flange 1004, a top flange 1006, and an overhanging flange 1008 oriented in parallel to the vertical flange 1004, but having a shorter vertical length than the vertical flange. As discussed previously, the axle support 988 includes holes 986 extending through the top flange 1004 that are configured to align with corresponding through holes 984 of the angle iron backbone 982, in order to secure the axle support to the backbone using conventional nut and bolt fasteners. The vertical flange 1004 includes a rounded rectangular cut-out 1010 sized to accommodate throughput of the torsion axle 808. It should be noted that a top edge of the rectangular cut-out 1010 is vertically spaced from top flange 1004 the approximate vertical length of the overhanging flange 1008 so that the axle support 988 has two flange edges that sit upon the torsion axle 808. Ancillary, elongated openings 1012 are located on both sides of the rectangular cut-out 1010 and extend through the vertical flange 1004. These vertical openings may be used to receive welding material or may be utilized to receive conventional nut and bolt fasteners in order to mount the axle support 988 to the angle iron backbone 982.

Figure 36:
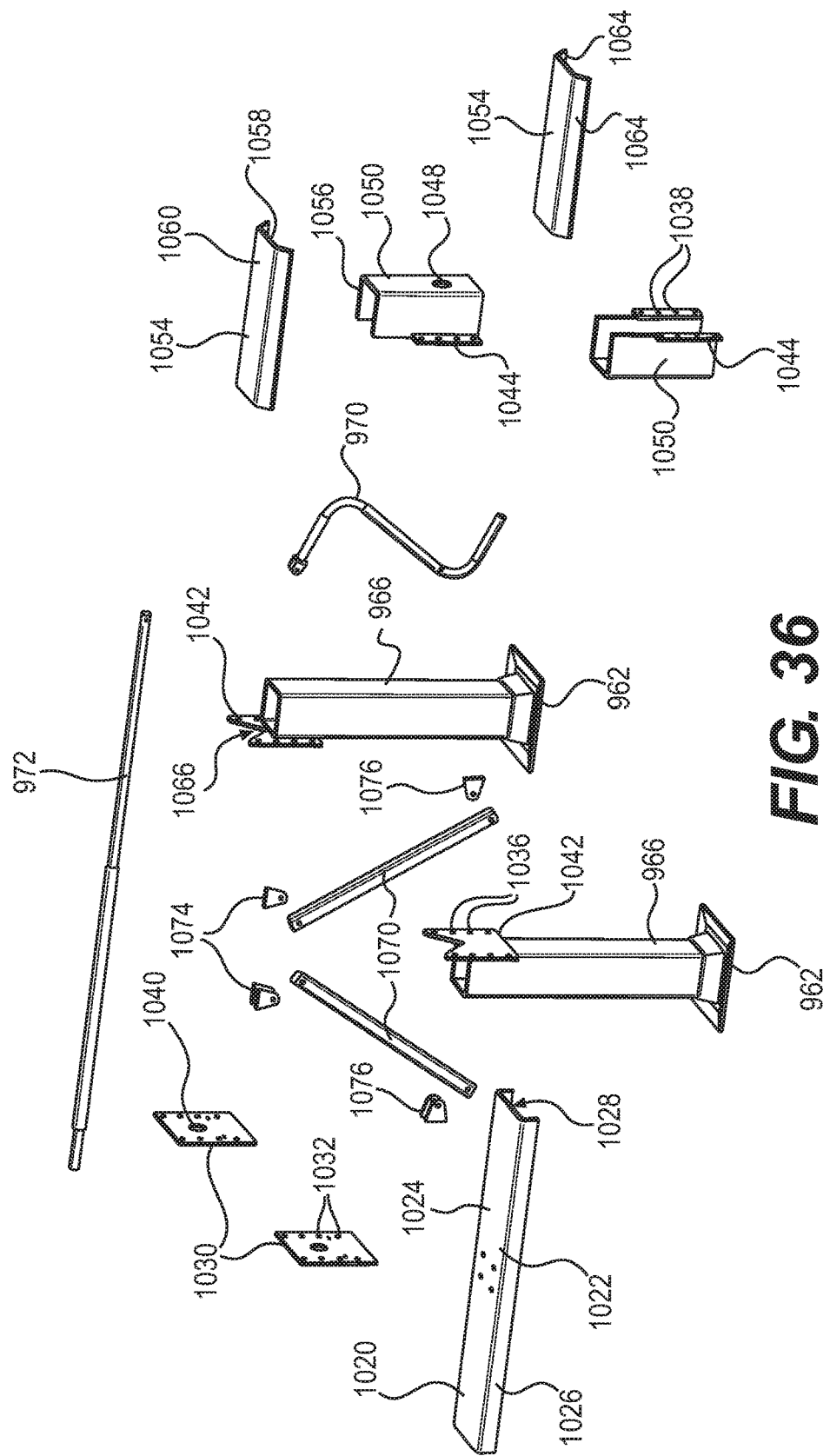
FIG. 36 is an exploded view of certain components depicted in FIG. 30.
Figure 37:
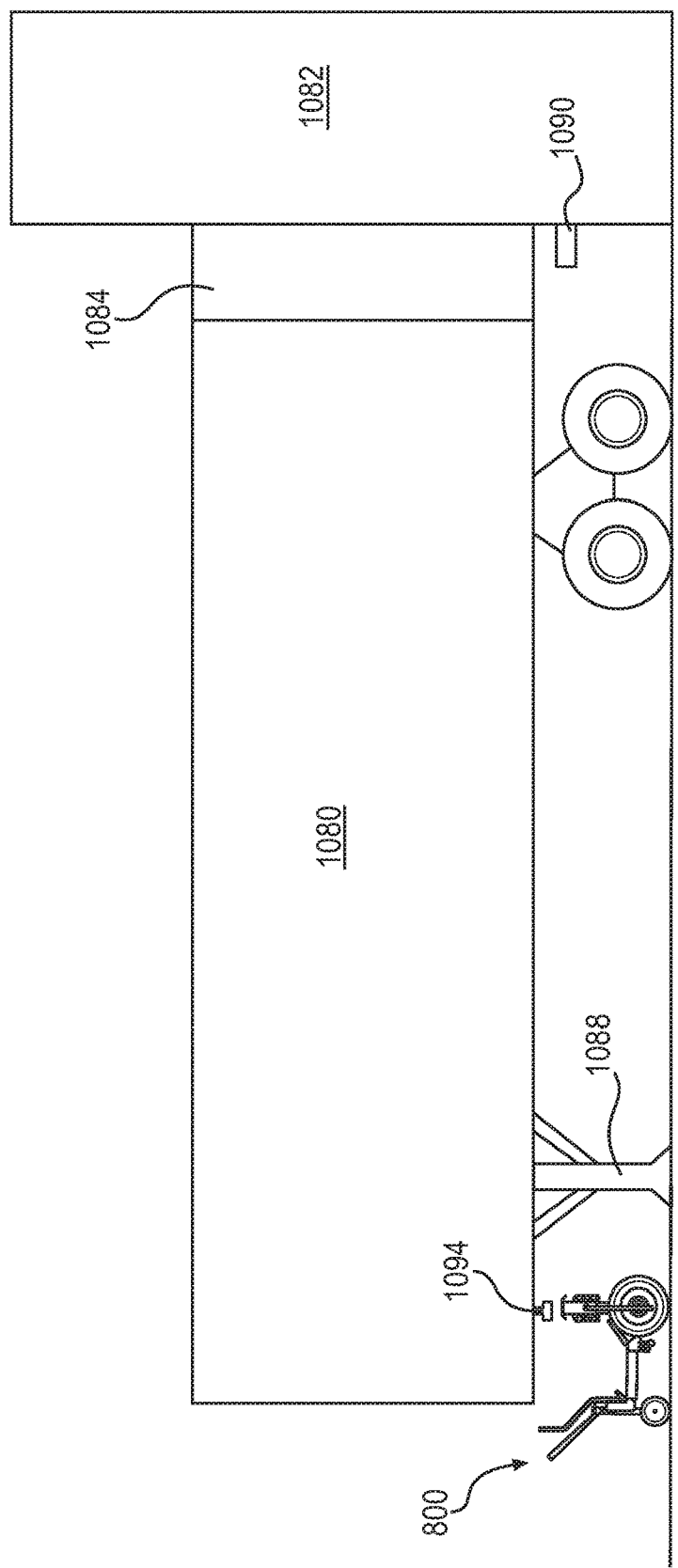
FIG. 37 is a profile view showing the exemplary stabilizer of FIG. 30 positioned underneath a parked semi-trailer, while the semi-trailer abuts a loading dock, prior to repositioning the jack assemblies into one of a reserve position, a shared weight bearing position, or an exclusive weight bearing position.
Figure 38:
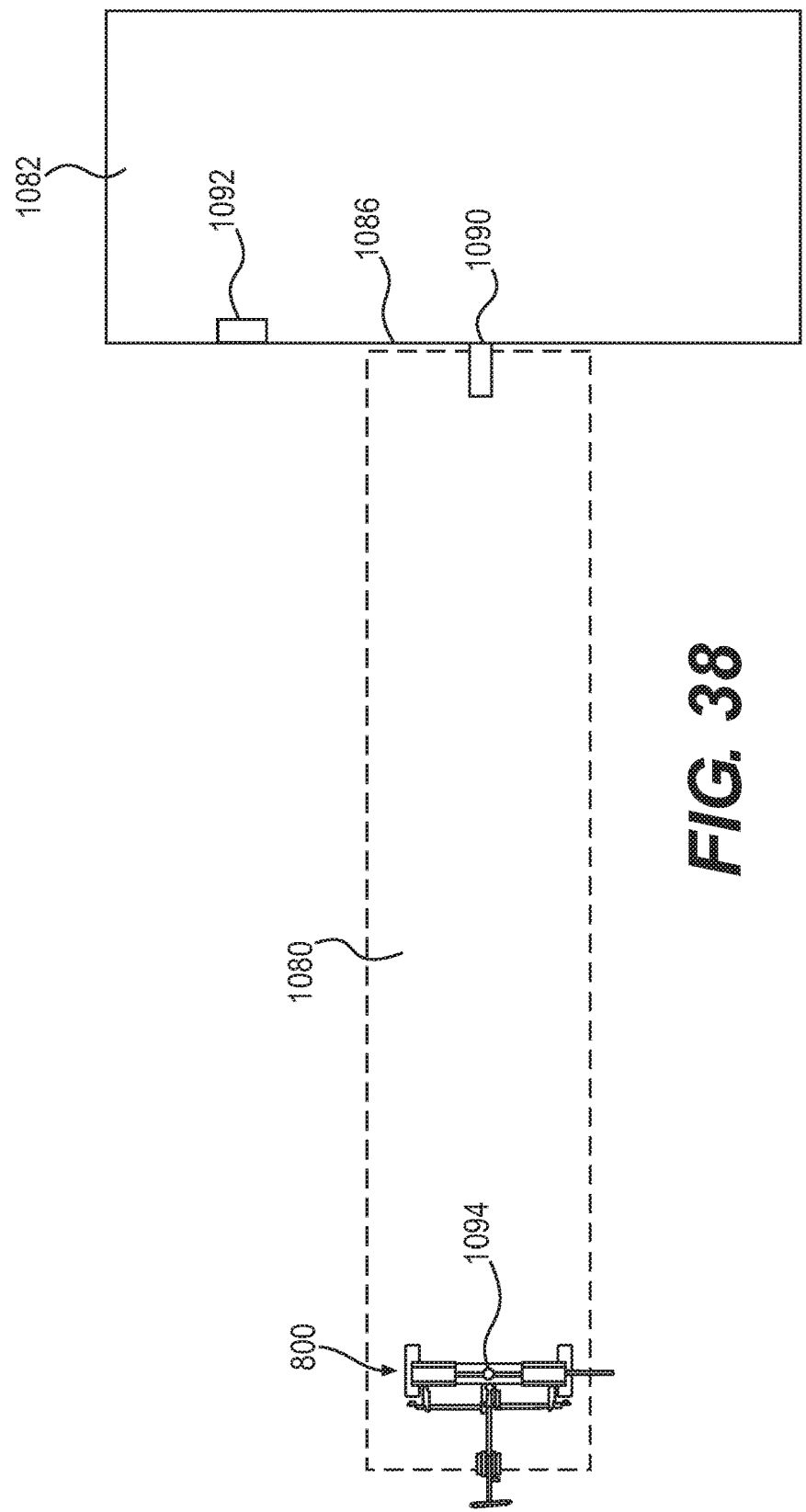
FIG. 38 is an overhead view of the structures of FIG. 37, with the semi-trailer shown in phantom so structures positioned underneath the parked semi-trailer are visible.
Figure 39:
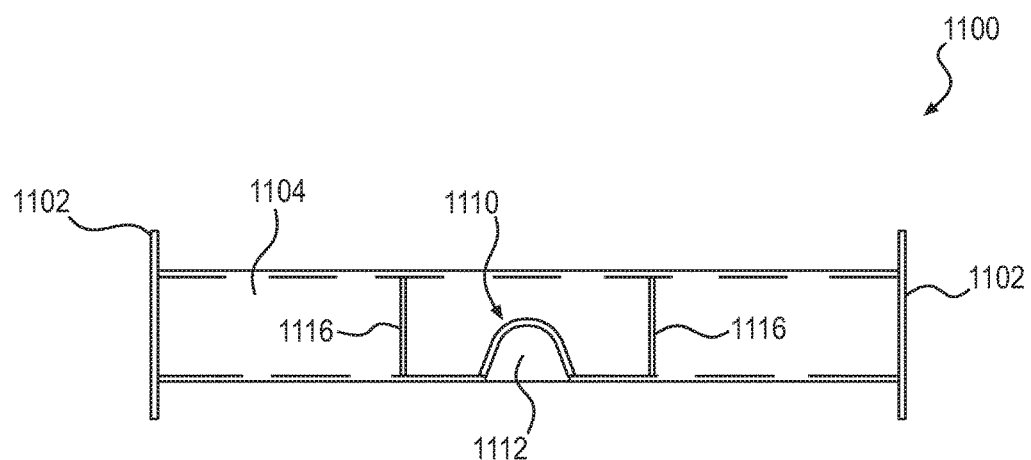
FIG. 39 is a top view of a contact plate for use with a first alternate exemplary trailer stabilizer.
Figure 40:
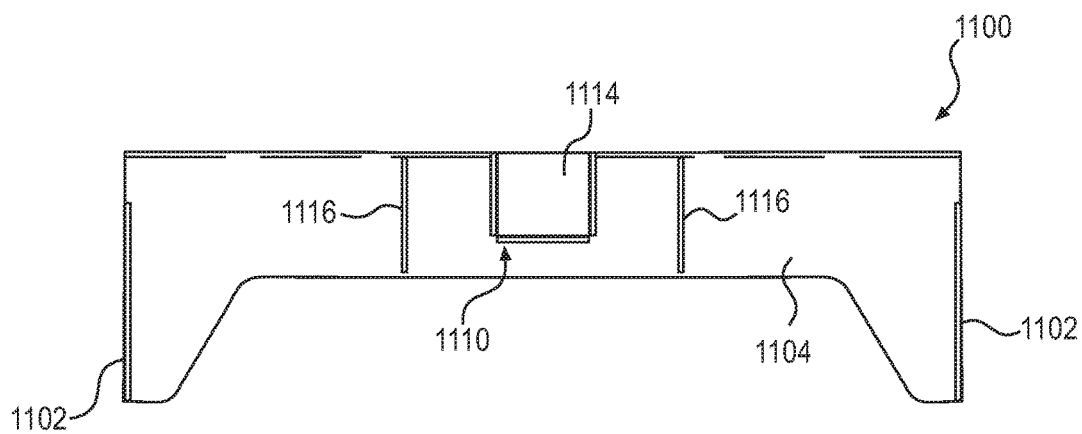
FIG. 40 is a rear view of the contact plate of FIG. 39.
Figure 41:
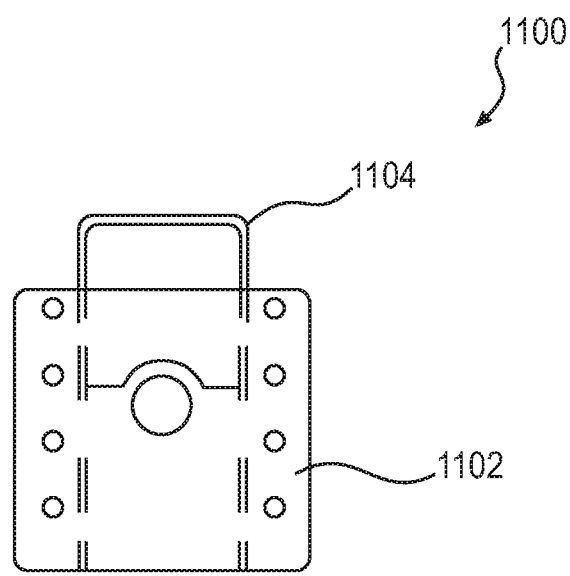
FIG. 41 is a side profile view of the contact plate of FIG. 39.
Figure 42:
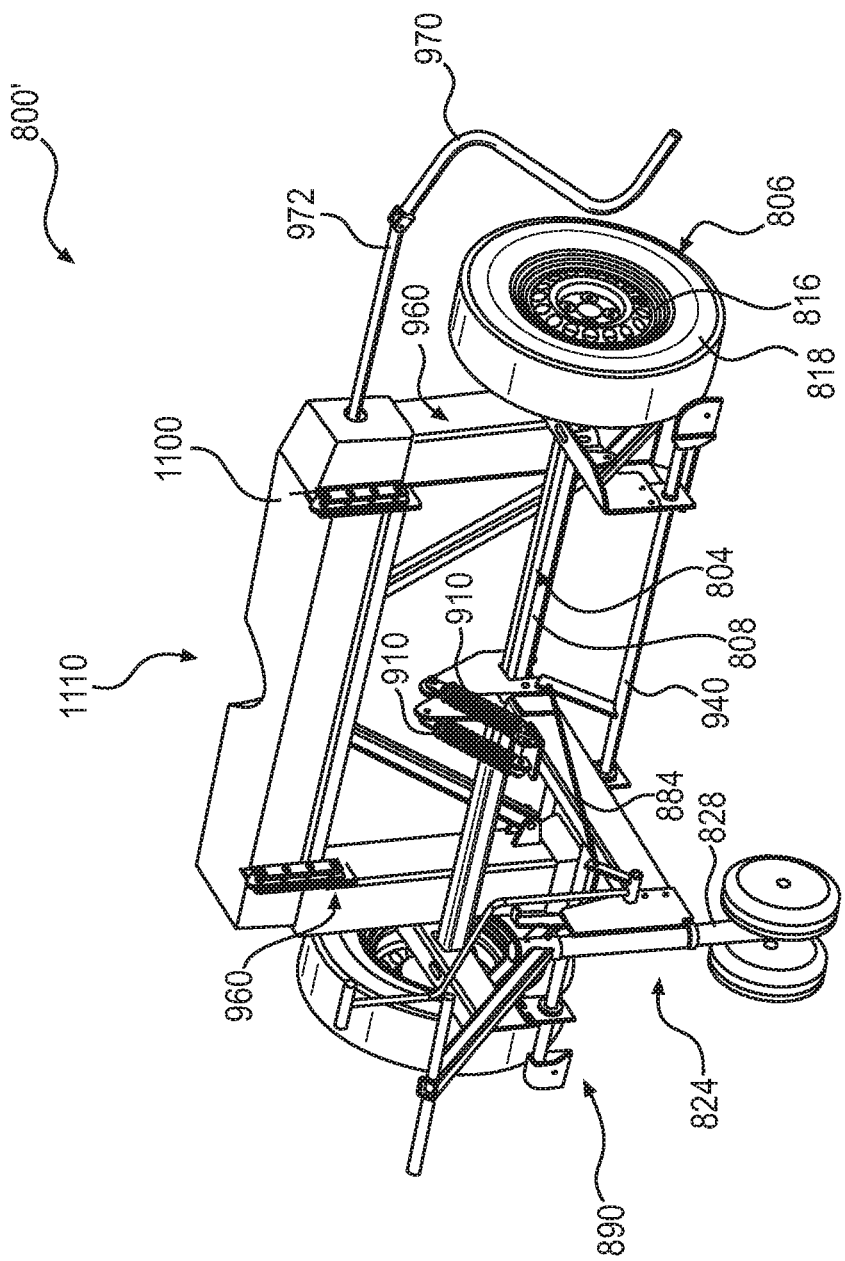
FIG. 42 is an elevated perspective view of a first alternate exemplary trailer restraint in accordance with the instant disclosure.

Referring to FIG. 36, the exemplary frame 802 includes a cross-brace 1020 that extends between and connects to the repositionable jacks 960 and the extension pads 976. More specifically, the cross-brace 1020 comprises a longitudinal C-shaped panel 1022 having a planar wall 1024 and perpendicular side walls 1026 extending parallel to one another to delineate an underside cavity 1028. Terminal ends of the panel 1022 are oriented perpendicular to a pair of flat mounting plates 1030 and mounted thereto via, in exemplary form, welding. Each mounting plate 1030 includes a plurality of through holes 1032 that are aligned with corresponding holes 1036, 1038 extending through corresponding jack mounting plates 1042 and extension pad flanges 1044. Upon alignment of the holes 1032, 1036, 1038, conventional nut and bolt fasteners are received within the holes in order to removable couple the cross-brace 1020, the repositionable jacks 960, and the extension pads 976 to one another. In addition to the nut and bolt fastener holes 1032, each mounting plate 1030 includes a centered opening 1040 sized to accommodate throughput of the jack drive shaft 972.

The jack drive shaft 972, as discussed previously, is repositionably mounted to the crank handle 970 so that rotation of the crank handle is transformed into rotation of the jack drive shaft. More specifically, the jack drive shaft 972 extends through corresponding openings 1048 of a jack casing 1050. Each jack casing 1050 is mounted to a corresponding stop plate 1054 that is configured to contact an underside of a parked semi-trailer when the alternate exemplary stabilizing device 800 is wedged between the ground and the parked semi-trailer. More specifically, a respective jack casing 1050 and stop plate 1054 comprise each extension pad 976. In exemplary form, each jack casing 1050 and stop plate 1054 is fabricated from a metal or metal alloy (e.g., steel) and welded to one another so that a top rim 1056 of each jack casing 1050 is approximately centered with respect to, and abuts, an underside 1058 of the stop plate 1054. In this exemplary embodiment, the stop plate 1054 includes a planar horizontal wall 1060 from which extend ramps 1064 on opposing lateral sides of the horizontal wall. Each ramp is inclined and angled at approximately 45 degrees, though other angles larger or smaller than 45 degrees may be utilized. These ramps 1064 are designed to direct any contacted objects during lateral movement up and over the horizontal wall 1060 in light of the fixed position of each extension pad 976 with respect to its associated second telescopic tube 966. In particular, each jack casing 1050 is sized (with a block C-shape that matches the rectangular shape of the tube 966) to partially circumscribe the second telescopic tube 966 and be mounted thereto using nut and bolt fasteners. In order to do so, each jack casing 1050 includes a pair of side flanges 1044 and corresponding holes 1038 that extend through the corresponding holes 1036 of a respective jack mounting plate 1042. Though not shown in FIG. 36, the jack drive shaft 972 includes a gear that engages a corresponding gear of the first telescopic tube so that rotation of the jack drive shaft will cause the first telescopic tube to be longitudinally repositioned with respect to the second telescopic tube 966. Each jack mounting plate 1042 includes a V-shape cut-out 1066 that accommodates throughput of the jack drive shaft 972 when the jack casings 1050 and mounting plates 1030 sandwich the jack mounting plates. In addition to the jack assemblies 960 being mounted to the cross-brace 1020 via nut and bolt fasteners coupling the jack mounting plate 1042, the jack casings 1050, and mounting plates 1030, the jack assemblies are also mounted to other aspects of the frame assembly 802.

A pair of angled rectangular tubing braces 1070 is concurrently mounted to an underside of the C-shaped panel 1022 and to an interior vertical wall of the second telescopic tube 966. More specifically, complementary rounded gusset brackets 1074 are welded to an underside of the C-shaped panel 1022 at approximately the ⅓ and ⅔ of the longitudinal length of the panel. Corresponding holes extending through the gusset brackets 1074 are configured to align with a corresponding hole extending through one end of each brace 1070. The opposing end of each brace 1070 is mounted to another set of gusset brackets 1076 via nut and bolt fasteners. Specifically, the gusset brackets 1076 are mounted to a side of the second telescopic tube 966 proximate the ground boot 962. In this fashion, the frame assembly 802 forms a pair of right triangles that couple the jack assemblies 960 to one another. In light of the foregoing discussion of structural components of the exemplary stabilizing device 800, the following includes a more detailed discussion of methods of using the stabilizing device to stabilize a parked semi-trailer.

Referring back to FIGS. 30-38, the exemplary stabilizing device 800 is configured to be manually repositionable across a loading dock yard. More specifically the stabilizing device 800 is repositionable via the two wheel assemblies 806 and the repositioning assembly 824. By way of example, as an initial starting point, it is presumed that the stabilizing device is positioned at a remote location from a parked semi-trailer 1080 at a loading dock 1082.

The parked semi-trailer 1080 is presumed to be parked adjacent the loading dock so that its rear doors 1084 are open and an interior of the semi-trailer is accessible via a bay 1086 at the loading dock 1082. In certain instances, the loading dock bay 1086 may include a dock leveler (not shown), that those skilled in the art will understand is utilized to create a bridge between an interior floor of the trailer 1080 and a floor of the loading dock 1082. It should be noted that when the trailer 1080 is parked adjacent the loading dock 1082, an outline of the trailer normally covers the opening of the bay 1086 so that interior workers at the loading dock cannot see via direct sight the exterior of the parked trailer. Consequently, the exemplary stabilizing device 800 may be accompanied by a signaling device 1090 that, in exemplary form, includes a video camera on the exterior of the loading dock 1082 having direct line of sight to underneath a forward portion of the parked trailer 1080, where the camera is communicatively coupled to a display 1092 on the interior of the loading dock to indicate visually whether or not the exemplary stabilizing device is positioned underneath the parked trailer as a requisite for loading/unloading the trailer.

Upon parking the semi-trailer adjacent the loading dock bay 1086, an exterior dock worker retrieves the stabilizing device 800 to position it underneath a forward portion of the trailer 1080. In exemplary form, the exterior dock worker locates and then repositions the stabilizing device 800 by grasping the T-shaped handle 826 of the repositioning assembly 824 while in the transport position shown in FIG. 30. The dock worker can either pull or push the stabilizing device 800 using the handle 826 so that the stabilizing device rolls with respect to the ground via the two wheel assemblies 806 and the repositioning assembly 824. More specifically, the two tires 818 and wheels 816 are freely rotatable, presuming the brake assembly 890 is not engaged, as are the metal hub wheels 830. Turning and/or pivoting of the stabilizing device 800 is accomplished by repositioning the T-shaped handle 826 to cause the steering shaft 828 to pivot with respect to the cylindrical casing 850, thereby causing the metal hub wheels 830 to rotate and pivot in order to effectuate a turn. Given that the steering shaft 828 can pivot ±90 degrees from a straight line orientation (straight line orientation shown in FIG. 30), the metal hub wheels 830 are correspondingly able to pivot ±90 degrees from a straight line orientation to facilitate full right and left turns.

Upon reaching a forward vicinity of the parking the semi-trailer 1080, the exterior dock worker repositions the stabilizing device 800 underneath a forward portion of the trailer, in front of the landing gear 1088. In particular, the exterior dock worker grasps the T-shaped handle 826 of the repositioning assembly 824 to push the stabilizing device 800, using the handle 826, underneath the semi-trailer 1080. More specifically, the dock worker pushes the handle 826 to cause a rearward aspect of the stabilizer 800 (extension pads 976, repositionable jacks 960, wheel assemblies 806, torsion axle assembly 804) to pass underneath the forward edge of the trailer 1080. In particular, the dock worker aligns the stabilizer 800 with respect to a king pin 1094 of the trailer 1080 so that the draw tube 864 is in line with the king pin. Continued pushing of the stabilizer under the semi-trailer 1080 eventually orients the extension pads 976 to be generally centered with respect to the king pin (i.e., on opposing lateral sides of the king pin). At the same time, the handle 826 is not underneath the semi-trailer 1080. In other words, the stabilizer 800 is long enough to allow the exterior dock worker to reposition the stabilizer under the forward portion of the semi-trailer 1080 without requiring the dock worker at any time to be located under the parked semi-trailer. Though not required, this centering position of the stabilizer 800 is configured to allow the extension pads 976 to contact a king pin plate (no shown), mounted to the underside of the semi-trailer 1080, when the stabilizer is wedged between the ground and the semi-trailer in its stabilizing position.

After positioning the stabilizer 800 underneath the forward portion of the semi-trailer 1080, the dock worker repositions the brake assembly 890 to retard motion of stabilizer with respect to the ground. Specifically, the dock worker grasps the handle 828 of the brake lever 872 and pulls it forward, toward the T-shaped handle 826. While pulling the brake lever 872 forward, the dock worker ensures that the lever is laterally outward from the brake lock 892 so that continued forward pulling on the brake lever will reposition the lever forward of the brake lock. When this forward position is achieved, the dock worker repositions the lever 872 laterally toward the brake lock 89 to that rearward motion of the lever will eventually become seated within the semi-circular cut-out 893, thereby retarding further rearward motion of the lever, and effectively locking the brake lever in a "brake on" orientation. This "brake on" orientation is operative to apply continued braking to the wheel assemblies 806.

In order to provide continued braking, the lever 872 is operatively coupled to the cable 884, via the tension arm 880, which in turn is operatively coupled to the brake pads 948 contacting a tread portion of each tire 818. More specifically, the "brake on" position has the cable 884 in tension, which is operative to pull on the lever arm 952 and cause rotation of the brake axle 940. This rotation of the brake axle 940 forces the brake shoes 942, 944 to pivot and correspondingly push the brake pads 948 into contact with the tread portion of each tire 818. The amount of force applied to the tire tread various depending upon any number of factors that may include, without limitation, the size and composition of the brake pads 948, the distance between the tire 818 treads and the brake axle 940, and the tension applied to the cable 884. In any event, the "brake on" position is operative to retard repositioning of the stabilizer 800 up to a predetermined maximum force. After application of the brake assembly 890 to the "brake on" position, the stabilizer 800 may be repositioned to assume a trailer stabilized position. It should be noted, however, that application of the brake assembly is not a prerequisite to repositioning the stabilizer 800 to a trailer stabilized position.

The exemplary trailer stabilized position corresponds to the stabilizer 800 being wedged between the ground and the underside of the semi-trailer 1080 so that the stabilizer assumes at least a portion of the load associated with a forward portion of the semi-trailer, whether loaded or unloaded. In exemplary form, the dock worker grasps the crank handle 970 and repositions the crank handle to longitudinally reposition the first telescopic tube (not shown) with respect to the second telescopic tube 966. More specifically, the crank handle 970 is rotated, which correspondingly causes rotation of the attached jack drive shaft 972. A gear (not shown) mounted to the jack drive shaft 972 is correspondingly rotated when the jack drive shaft 972 is rotated via the handle 970. This gear engages a counterpart gear (not shown) associated with at least one of the telescopic tubes 966 in order to cause longitudinal repositioning between the tubes. Longitudinal repositioning of the first tube with respect to the second tube 966 causes the vertical spacing between the ground boots 962 and the extension pads 976 to change. In particular, contraction between the first tube and the second tube 966 causes the vertical spacing between the ground boots 962 and the extension pads 976 to decrease, whereas extension between the first tube and the second tube causes the vertical spacing between the ground boots and the extension pads to increase. In order to wedge the stabilizer 800 between the ground and the underside of the semi-trailer 1080, the first tube is extended with respect to the second tube 966 until both extension pads 976 contact the underside of the parked semi-trailer and the ground boots 962 contact the ground so that the stabilizer assumes at least a portion of the load associated with a forward portion of the semi-trailer, whether loaded or unloaded.

Prior to repositioning the first tube with respect to the second tube 966, the stabilizer 800 assumes a transport position having the jack assemblies 960 elevated above the ground. In sum, a bias associated with the torsion axle 808 allows the rectangular ground boots 962 of the jack assemblies 960 to be elevated above the ground when the first tube is fully retracted with respect to the second tube 966 (indicative of the transport position). Specifically, the torsion axle 808 has an integrated spring bias that creates an active suspension between the axle itself and the torsion arms 810, spindle pairs 812, and wheel assemblies 806. In other words, the spring bias of the torsion axle 808 operates to resist upward movement of the wheel assemblies 806 with respect to the axle. The majority of the weight of the stabilizer 800 is ultimately borne by the wheel assemblies 806 (as part of a downward force in the direction of gravity) when in the transport position, but this weight is not enough in the downward direction to overcome the spring bias of the axle 808, thus leading to the jack assemblies 960 being elevated above the ground. But when the stabilizer 800 is repositioned underneath the forward portion of the parked semi-trailer to a stabilized position, the weight of the stabilizer is borne by the jack assemblies 960 so that the full bias of the axle 808 is applied to the wheel assemblies 806. In other words, when in a transport position, the load on the axle 808 is greater than when the stabilizer 800 is in a stabilized position.

As the first tube is extended with respect to the second tube 966 of each jack assembly 960 where the ground boots eventually contact the ground, two biases associated with the stabilizer 800 are no longer partially counteracted by the weight of the stabilizer given that the entire weight of the stabilizer is carried by the two jack assemblies. First, the spring bias associated with the torsion axle 808, when not counteracted by bearing the entire weight of the stabilizer 800, causes the torsion arms 810 to pivot so that the respective end connected to the spindle 812 swings down toward the ground as more of the weight of the stabilizer is borne by the jack assemblies 960. Eventually, the jack assemblies 960 bear the entire weight of the stabilizer 800 and the spindles 812 reach a static position where the weight of the wheel assemblies 806 is balanced by the spring bias of the torsion axle 808. In this position, the wheel assemblies 806 are lifted off the ground. Second, the spring bias associated with the pair of shocks 910, when not counteracted by the draw tube 864 position attempting to compress the shocks (when the wheels 830 bear at least a portion of the weight of the stabilizer 800), causes the shocks to extend to a maximum length. This maximum length results in the wheels 830 being lifted off the ground as the jack assemblies assume the entire weight of the stabilizer 800. The shocks 910 restrict the pivoting motion between the draw tube 864 and the torsion axle 808 given that the distance between the underside of the draw tube and the bottom of the wheels is always the same, whereas the same cannot be said for the distance between the bottom of the torsion axle and the bottom of the tire 818.

As discussed previously, after the stabilizer 800 is wedged between the ground and the underside of the semi-trailer 1080, the stabilizer bears at least a portion of the forward weight of the parked semi-trailer. In instances where the parked semi-trailer has landing gear down, the jack assemblies 960 may be repositioned to bear all (e.g., landing gear 1088 lifted off the ground), none of the weight (e.g., when in the transport position), or a portion of the forward weight of the parked semi-trailer (e.g., landing gear 1088 and stabilizer 800 cooperating to bear the weight). In exemplary form, the jack assemblies 960 may be repositioned to bear anywhere from zero to one hundred percent of the forward weight of the trailer 1080. In a circumstance where the stabilizer 800 is started off to bear none of the forward weight of the trailer, but rather be positioned as a back-up in case of landing gear failure, the jack assemblies 960 may be repositioned so that the extension pads 976 almost contact the underside of the trailer. In this fashion, the stabilizer 800 is in position to bear all or a portion of the weight of the forward part of the trailer 1080 should the landing gear 1088 experience a failure. Alternatively, in a circumstance where the trailer 1080 is loaded, compression of the landing gear 1088 may occur and result in a slight decrease in the height between the underside of the trailer and the ground. In this loading scenario, the stabilizer 800 may start out with the extension pads 976 not in contact with the semi-trailer, but as the weight of the forward portion of the semi-trailer increases and causes a slight decrease in the height between the underside of the trailer and the ground, the semi-trailer underside ultimately contacts the extension pads so the stabilizer bears at least a portion of the forward weight of the semi-trailer. Alternatively, in exemplary form, the jack assemblies 960 may be repositioned to initially bear some or all of the weight of the forward portion of the trailer 1080.

By rotating the crank handle 970, the jack assemblies 960 may be repositioned so that the extension pads 976 contact the underside of the trailer 1080 and the stabilizer 800 bears some or all of the weight of the forward portion of the parked semi-trailer. As will be understood by those skilled in the art, extending the first tube with respect to the second tube 966 (after the extension pads 976 have contacted the underside of the trailer) and continuing to do so operates to shift some, and potentially all, of the weight bearing responsibility from the landing gear to the stabilizer 800 so that the landing gear may remain on the ground or elevated above the ground (in a case where the stabilizer bears all of the weight of the forward portion of the semi-trailer). Accordingly, the exterior dock worker is able to manipulate the jack assemblies 960 via the crank handle 970 to position the jack assemblies in one of three positions: (1) a reserve position, where the jack assemblies are initially positioned not to bear the weight of the parked trailer 1080; (2) a sharing position, where the jack assemblies share the weight bearing responsibility with the landing gear 1088 of the semi-trailer; and, (3) an exclusive position, where the jack assemblies are solely responsible for supporting the forward weight of the parked semi-trailer (e.g., the landing gear are not in contact with the ground).

Post positing the stabilizer 800 in one of the three positions, the parked semi-trailer 1080 may be loaded or unloaded by internal dock personnel. In order to confirm that the parked semi-trailer 1080 is ready to be loaded/unloaded, the internal dock personnel may view one or more images on a display 1092 showing the forward portion of the parked semi-trailer and whether a stabilizer 800 is positioned thereunder. In order to accomplish this visual verification as to the presence or absence of a stabilizer 800 underneath a parked semi-trailer 1080, the loading dock is equipped with one or more cameras 1090 aimed at a area where the forward portion of a parked semi-trailer would reside. Each of the cameras 1090 is communicatively coupled to at least one display 1092 mounted on the interior of the loading dock 1082 and viewable by internal dock personnel. In exemplary form, the cameras 1090 may comprise video cameras capable of generating video data and/or still image data. Moreover, exemplary displays 1092 in accordance with the present disclosure include televisions, computer monitors, and projection screens. Based upon the visual images available for viewing by the internal dock personnel, the internal dock personnel may authorize loading or unloading of the parked semi-trailer after the stabilizer assumes one of the three positions. After completion of the loading/unloading of the parked semi-trailer 1080, the internal dock personnel notifies the exterior dock worker that the semi-trailer has been loaded or unloaded so that no further entry into the semi-trailer will occur. Exemplary forms of notification include, without limitation, colored and/or multiple lights on the loading dock exterior, radio signals, and mechanical signals (e.g., a mechanical flag).

Upon receiving notification that loading/unloading of the parked semi-trailer 1080 is complete, the exterior dock worker removes the stabilizer 800 from underneath the forward portion of the parked semi-trailer. As part of the exemplary discussion of removal of the stabilizer 800 post loading/unloading of the parked semi-trailer 1080, it is presumed that the stabilizer is in an exclusive position where the jack assemblies 960 bear the entire weight of the forward portion of the parked semi-trailer. As will be appreciated by those skilled in the art, the exemplary discussion of removing the stabilizer 800 from underneath the parked semi-trailer 1080 will necessarily encompass those circumstances where the stabilizer is positioned in either the sharing position or a reserve position.

As an initial matter, the exterior dock worker 1086 repositions the jack assemblies 960 to decrease their overall longitudinal length and ultimately cause the stabilizer 800 to contact the ground as a rolling chassis. As part of this process, the exterior dock worker turns the crank handle 970 to cause the first tube to be retracted into the second tube 966. This retraction, in turn, results in the extension pads 976 no longer contacting the underside of the semi-trailer 1080, which means that the parked semi-trailer's landing gear 1088 assumes exclusive responsibility for bearing the weight of the forward portion of the semi-trailer. Continued retraction of the first tube into the second tube 966 eventually results in the wheel assemblies 806 and the metal hub wheels 830 contacting the ground. In particular, as the first tube is further retracted into the second tube 966, the wheel assemblies 806 and the metal hub wheels 830 act to share weight bearing responsibility with the jack assemblies 960.

In the case of the wheel assemblies 806, as more weight is borne by the wheel assemblies, the weight borne operates to counteract the spring bias of the torsion axle 808. Specifically, as more weight is born by the wheel assemblies 806, the spring bias associated with the torsion axle 808 increases and is accompanied by rotation of the torsion arms 810 so that the respective end of the torsion arm connected to the spindle 812 swings up away from the ground as less weight of the stabilizer is borne by the jack assemblies 960. Eventually, the jack assemblies 960 bear none of the weight of the stabilizer 800 (because the ground mounts 962 are no longer in contact with the ground) and the spindles 812 reach a static position where the weight of the stabilizer is balanced by the spring bias of the torsion axle 808.

As more weight is borne by the wheel assemblies 806 and the jack assemblies 960 are repositioned, the metal hub wheels eventually contact the ground. Given that the distance between the underside of the draw tube 864 and the bottom of the wheels 830 is always the same, whereas the same cannot be said for the distance between the bottom of the torsion axle 808 and the bottom of the tire 818, the draw tube may pivot with respect to the torsion axle as the wheel assemblies 806 are repositioned with respect to the torsion axle. In such a case, the pivoting motion of the draw tube 864 is retarded by the shocks 910 so that pivoting motion occurs when the upward force acting on the draw tube overcomes the downward force applied to the draw tube via the shocks. This pivoting motion between the draw tube 864 and the torsion axle 808 generally reaches a maximum when a maximum travel endpoint is reached between the wheel assemblies 806 and the torsion axle. In other words, as the load borne by the wheel assemblies 806 increases (including instances of an active suspension where forces are not static) and the torsion arms 810 pivot upward with respect to the torsion axle 808, away from the ground, the distance between the bottom of the tires 818 and the underside of the torsion axle 808 decreases, which can operate to increase the upward force on the draw tube 864 so that pivoting motion occurs as a result of the shocks 910 compressing to compensate for the increased forces exerted by the draw tube. When the jack assemblies 960 are fully retracted so that the ground boots 962 no longer contact the ground and the stabilizer is in a static position, the forces between the wheel assemblies 806 and the torsion axle 808 are balanced, as are the forces between the draw tube 864 and the torsion axle. At this time, the brake assembly 890 may be disengaged.

To disengage the brake assembly 890, the exterior dock worker repositions the brake lever 872 out of engagement with the brake lock 892 so that the brake lever may move toward the jack assemblies 960 and past the brake lock. By repositioning the brake lever 872 toward the jack assemblies 960, the tension on the cable 884 is decreased and allows the brake axle 940 to rotate. More specifically, this rotation of the brake axle 940 causes the brake shoes 942, 944 to pivot away from the tires 818 to a point where the brake pads 948 no longer contact the tread of the tires. Upon disengaging the brake assembly 890, the stabilizer 800 may be repositioned by rolling it out from underneath the parked semi-trailer 1080.

In order to reposition the stabilizer 800 out from underneath the parked semi-trailer 1080, the exterior dock worker grasps the T-shaped handle 826 of the repositioning assembly 824 (while the stabilizer is in the transport position shown in FIG. 30) and pulls the stabilizing device 800 from underneath the parked semi-trailer 1080 by rolling the stabilizer with respect to the ground on its tires 818 and wheels 830. More specifically, the two tires 818 and wheels 816 are freely rotatable, which allows ground repositioning of the stabilizer by pulling on the T-shaped handle 826 or rotating the T-shaped handle to cause the steering shaft 828 to pivot in order to effectuate a turn. The exterior dock worker may then reposition the stabilizer 800 underneath a different parked semi-trailer (to restart the deployment positioning process) or may locate the stabilizer to a stand-by position awaiting parking of another semi-trailer. Either way, the stabilizer 800 is removed from underneath the parked semi-trailer to allow the trailer to be repositioned away from the loading dock.

Referring to FIGS. 39-42, a first alternate exemplary trailer stabilizer 800' differs from the exemplary trailer stabilizer 800 only in that the extension pads 976 are replaced with a single, integral contact plate 1100; otherwise, the use and operability of the first alternate exemplary trailer stabilizer 800' is the same as the exemplary trailer stabilizer 800. In exemplary form, the first alternate exemplary trailer stabilizer 800' includes the contact plate 1100, which is operative to replace the stop plates 1054 and the jack casings 1050 of the exemplary stabilizer 800. More specifically, the contact plate 1100 includes a pair of bolting flanges 1102 that are connected to one another via a block U-shaped channel member 1104. In this alternate exemplary embodiment, the bolting flanges 1102 are wedged in between the mounting plates 1030 and corresponding jack mounting plates 1042 so that holes through the flange and plates are aligned with one another to receive nut and bolt fasteners.

In this first alternate exemplary trailer stabilizer 800', the contact plate 1100 includes a contoured cup 1110 configured to receive a trailer kingpin (not shown). By way of example, the trailer may be a fluid tanker needing to be loaded or unloaded. More specifically, the contoured cup 1110 faces away from the repositioning assembly 824 and fits within a cavity formed within the channel member 1104. Specifically, the cup 1110 comprises a flat bottom plate 1112 and a curved peripheral wall plate 1114 that are mounted to the channel member 1104 and reinforced using a pair of cross-braces 1116 that extend from the front of the channel member to the rear of the channel member. In this fashion, as the trailer stabilizer 800' is repositioned underneath a trailer with a kingpin, the contoured cup 1110 is sized to receive the kingpin upon proper alignment of the stabilizer that provides a stop in the context of the peripheral wall plate 1114 that retards further motion of the stabilizer underneath the trailer. In this manner, the contoured cup 1110 can act as an alignment device to ensure the stabilizer 800' is centered.

In addition, the stabilizer 800' may include the ground hook 210 so that the stabilizer may provide both stabilization and restraint of a parked trailer. In this fashion, the ground hook 210 would engage a ground cleat and the kingpin would ride against the curved peripheral wall in order to restrain the trailer from moving away from a loading dock or other loading/unloading position. Those skilled in the art will understand the exemplary use of this revised stabilizer 800' in view of the foregoing exemplary embodiments.

Figure 43:
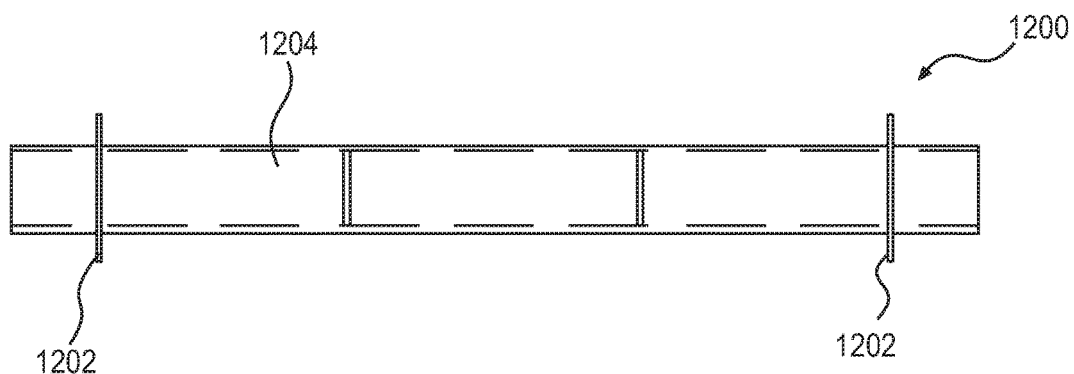
FIG. 43 is a top view of another contact plate for use with a second alternate exemplary trailer stabilizer.
Figure 44:
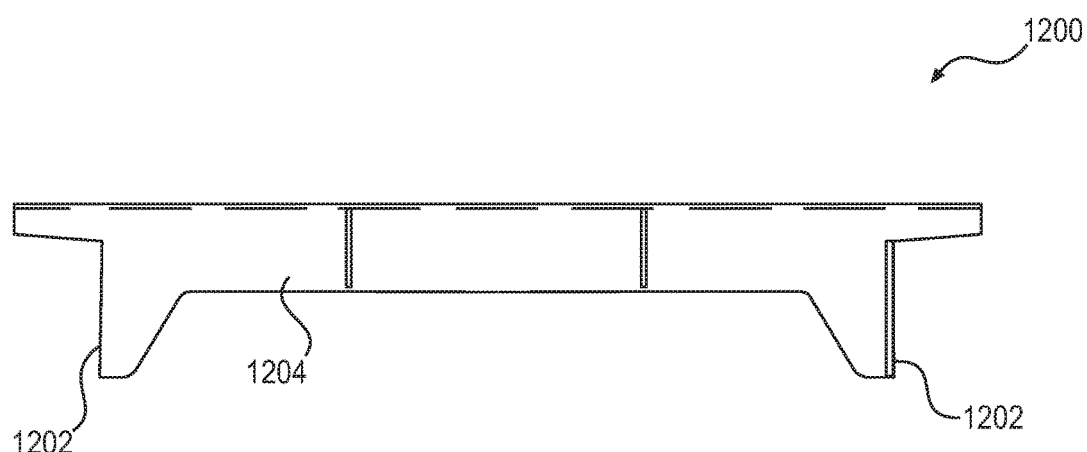
FIG. 44 is a rear view of the contact plate of FIG. 43.
Figure 45:
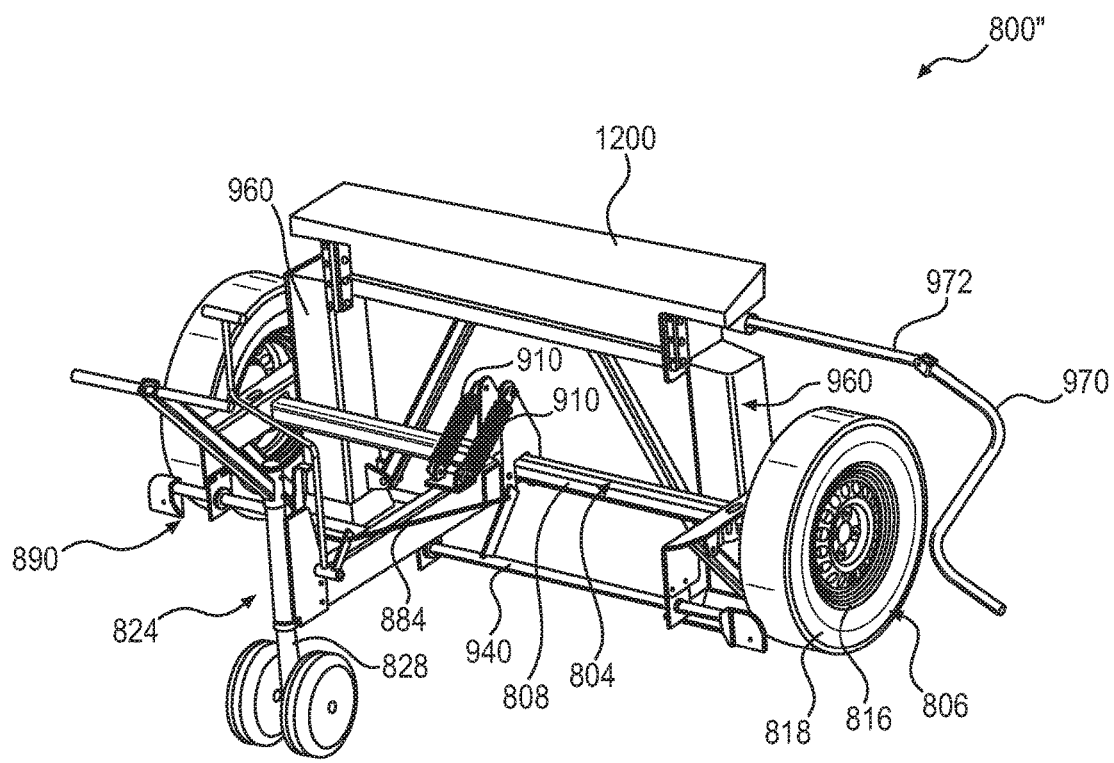
FIG. 45 is an elevated perspective view of a second alternate exemplary trailer restraint in accordance with the instant disclosure.

Referring to FIGS. 43-45, a second alternate exemplary trailer stabilizer 800" differs from the exemplary trailer stabilizer 800 only in that the extension pads 976 are replaced with a single, integral contact plate 1200; otherwise, the use and operability of the second alternate exemplary trailer stabilizer 800" is the same as the exemplary trailer stabilizer 800. In exemplary form, the second alternate exemplary trailer stabilizer 800" includes the contact plate 1200, which is operative to replace the stop plates 1054 and the jack casings 1050 of the exemplary stabilizer 800. More specifically, the contact plate 1200 includes a pair of bolting flanges 1202 that are connected to one another via a block U-shaped channel member 1204. In this alternate exemplary embodiment, the bolting flanges 1202 are wedged in between the mounting plates 1030 and corresponding jack mounting plates 1042 so that holes through the flange and plates are aligned with one another to receive nut and bolt fasteners. Consequently, the contact plate 1200 is operative to engage an underside of a parked trailer in order to stabilize it upon deployment of the jacks. Consequently, reference is had to the foregoing exemplary stabilizer 800 for a more detailed exemplary discussion of the use of this second alternate exemplary stabilizer 800".

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of restraining a parked semi-trailer, the method comprising:
   positioning a semi-trailer restraint underneath the parked semi-trailer;
   tensioning at least a portion of the semi-trailer restraint by concurrently engaging the parked semi-trailer and a fixed position ground anchor at least one of prior to and during moving contents between the parked semi-trailer and a dock facility; and,
   discontinuing tension of at least the portion of the semi-trailer restraint without repositioning the parked semi-trailer post moving contents between the parked semi-trailer and the dock facility.

2. The method of claim 1, wherein positioning the semi-trailer restraint underneath the parked semi-trailer includes repositioning the semi-trailer restraint against at least one of the fixed position ground anchor and a forward stop of the semi-trailer.

3. The method of claim 1, wherein the act of positioning the semi-trailer restraint underneath the parked semi-trailer includes deploying a repositionable connector of the semi-trailer restraint to engage the fixed position ground anchor.

4. The method of claim 1, wherein discontinuing tension of at least the portion of the semi-trailer restraint includes repositioning a cylinder to provide play allowing the restraint to disengage the ground anchor.

5. The method of claim 1, wherein tensioning at least a portion of the semi-trailer restraint occurs as a result of the parked semi-trailer pushing against the semi-trailer restraint responsive to moving contents between the parked semi-trailer and the dock facility.

6. A method of verifying stabilization of a parked semi-trailer, the method comprising:
   positioning a semi-trailer stabilizer underneath a forward portion of the parked semi-trailer, and toward a rear end of the parked semi-trailer, while at least two repositionable jacks of the semi-trailer stabilizer are elevated above the ground, where positioning the semi-trailer stabilizer includes positioning each of the at least two repositionable jacks to be located on an opposing side of a longitudinal center plane of the parked semi-trailer;
   manually cranking a handle operatively coupled to the at least two repositionable jacks and causing the at least two repositionable jacks to extend, thereby wedging the semi-trailer stabilizer between the ground and an undersurface of the parked semi-trailer so that the semi-trailer stabilizer bears at least a portion of the weight of the parked semi-trailer, where the handle extends beyond a footprint of the parked semi-trailer, and where wheels associated with the semi-trailer stabilizer are lifted off of the ground when the semi-trailer stabilizer is wedged between the ground and the undersurface of the parked semi-trailer; and,
   displaying a camera image, of a relative position of the semi-trailer stabilizer and the parked semi-trailer, on a visual display within an interior of a loading dock adjacent to the parked semi-trailer.

7. The method of claim 6, further comprising:
   mounting a camera to an exterior portion of the loading dock; and,
   orienting the mounted camera to allow capture of a camera image of the relative position of the semi-trailer stabilizer and the parked semi-trailer.

8. The method of claim 7, further comprising:
   mounting the visual display within an interior of the loading dock, the visual display communicatively coupled to the camera to display the camera image.

9. The method of claim 7, wherein mounting the camera to the exterior portion of the loading dock includes positioning the camera to extend into a footprint of the parked semi-trailer when the parked semi-trailer is adjacent the loading dock.

10. The method of claim 7, wherein mounting the camera to the exterior portion of the loading dock includes positioning the camera to extend underneath the parked semi-trailer when the parked semi-trailer is adjacent the loading dock.

11. The method of claim 6, wherein positioning the semi-trailer stabilizer underneath the parked semi-trailer includes repositioning at least a portion of the semi-trailer stabilizer to contact with a forward facing surface, facing away from the rear end, of the parked semi-trailer to inhibit further movement of the semi-trailer stabilizer toward the rear end of the parked semi-trailer.

12. The method of claim 11, wherein:
   the forward facing surface comprises a portion of a kingpin of the parked semi-trailer; and,
   a kingpin receiver of the semi-trailer stabilizer contacts the kingpin to inhibit further movement of the semi-trailer stabilizer toward the rear end of the parked semi-trailer.

13. The method of claim 6, further comprising the semi-trailer stabilizer concurrently engaging a kingpin of the parked semi-trailer and a ground anchor, where engaging the ground anchor includes repositioning a tailhook of the semi-trailer restraint from a stowed position, disengaged from the ground anchor, to an deployed position, engaged with the ground anchor.

14. The method of claim 6, further comprising:
   at least one of loading contents onto and unloading contents from the parked semi-trailer post visual verification that the semi-trailer stabilizer is wedged between the ground and the parked semi-trailer; and,
   communicating between the interior of the loading dock and an exterior of the loading dock, where communicating includes notifying personnel in the exterior of the loading dock that the parked semi-trailer has been at least one of loaded or unloaded.

15. The method of claim 6, wherein the camera image comprises a video camera image.

16. The method of claim 6, wherein wedging the semi-trailer stabilizer between the ground and the undersurface of the parked semi-trailer includes raising wheels, associated with the semi-trailer stabilizer, off the ground.

17. The method of claim 16, wherein the camera image comprises a video camera image depicting at least one of the wheels off the ground.

18. A method of verifying stabilization of a parked semi-trailer at a loading facility, the method comprising:
   positioning a semi-trailer stabilizer, including at least two repositionable jacks, underneath the parked semi-trailer so that the at least two repositionable jacks bear at least a portion of the weight of the parked semi-trailer before loading or unloading of the parked semi-trailer; and, displaying, on a visual display within a loading facility, a camera image of a relative position of the semi-trailer stabilizer and the parked semi-trailer.

19. The method of claim 18, further comprising:

mounting a camera to an exterior of the loading facility where the parked semi-trailer is intended to be located; and, orienting the mounted camera to allow capture of the camera image of the relative position of the semi-trailer stabilizer and the parked semi-trailer.

20. The method of claim 18, further comprising:

mounting the visual display within an interior of the loading facility so that when the parked semi-trailer is at least one of loaded and unloaded, the visual display is unobstructed.

* * * * *